United States Patent
Nelson et al.

(10) Patent No.: US 11,178,973 B2
(45) Date of Patent: Nov. 23, 2021

(54) FURNITURE SPRING SYSTEM

(71) Applicant: The Lovesac Company, Stamford, CT (US)

(72) Inventors: Shawn D. Nelson, Washington, UT (US); David M. Underwood, Hurricane, UT (US); Brian Kuchler, Hurricane, UT (US); Clint Gibson, St. George, UT (US)

(73) Assignee: THE LOVESAC COMPANY, Stamford, CT (US)

( * ) Notice: Subject to any disclaimer, the term of this patent is extended or adjusted under 35 U.S.C. 154(b) by 0 days.

(21) Appl. No.: 16/707,574

(22) Filed: Dec. 9, 2019

(65) Prior Publication Data
US 2020/0260875 A1 Aug. 20, 2020

Related U.S. Application Data

(60) Provisional application No. 62/806,516, filed on Feb. 15, 2019.

(51) Int. Cl.
*A47C 4/02* (2006.01)
*A47C 7/30* (2006.01)
(Continued)

(52) U.S. Cl.
CPC .............. *A47C 13/005* (2013.01); *A47C 5/12* (2013.01); *A47C 7/18* (2013.01); *A47C 7/24* (2013.01);
(Continued)

(58) Field of Classification Search
CPC .......... A47C 13/005; A47C 5/12; A47C 7/18; A47C 7/24; A47C 7/28; A47C 7/35;
(Continued)

(56) References Cited

U.S. PATENT DOCUMENTS

| 746,211 A | 4/1903 | Webb |
| 1,459,540 A | 6/1923 | Labenz |

(Continued)

FOREIGN PATENT DOCUMENTS

| CH | 710418 | 5/2016 |
| CN | 2040337 U | 7/1989 |

(Continued)

OTHER PUBLICATIONS

International Search Report and Written Opinion dated Jul. 16, 2020 from International Patent Application No. PCT/US2020/018105 filed Feb. 13, 2020.

(Continued)

*Primary Examiner* — Rodney B White
(74) *Attorney, Agent, or Firm* — Workman Nydegger

(57) ABSTRACT

A furniture spring system, configured to provide a seating surface. The furniture spring system comprising a lid comprising a frame. The frame comprising two opposing frame members and a retention member associated with at least one of the two opposing frame members, a slat extending between the two opposing frame members, the slat comprising an elongate body having a first end and a second end and a catch disposed at the first end or second end, wherein the catch engages the retention member to retain the slat to the frame and the catch is configured to slide back-and-forth relative to the retention member as a portion of the elongate body between the first end and the second end elastically flexes downward and upward in response to forces intermittently pushing downward on the slat during use.

22 Claims, 39 Drawing Sheets

(51) Int. Cl.
   *A47C 7/62* (2006.01)
   *A47C 13/00* (2006.01)
   *A47C 17/86* (2006.01)
   *A47C 17/04* (2006.01)
   *A47C 5/12* (2006.01)
   *A47C 7/18* (2006.01)
   *A47C 7/24* (2006.01)
   *A47C 7/28* (2006.01)
   *B68G 5/00* (2006.01)
   *B68G 7/05* (2006.01)
   *A47C 7/35* (2006.01)
   *B29C 45/14* (2006.01)
   *B29L 31/58* (2006.01)

(52) U.S. Cl.
   CPC .......... *A47C 7/28* (2013.01); *A47C 7/35* (2013.01); *A47C 7/628* (2018.08); *A47C 17/04* (2013.01); *A47C 17/86* (2013.01); *B29C 45/14* (2013.01); *B68G 5/00* (2013.01); *B68G 7/05* (2013.01); *A47C 7/622* (2018.08); *B29L 2031/58* (2013.01)

(58) Field of Classification Search
   CPC ......... A47C 7/622; A47C 7/628; A47C 17/04; A47C 17/86
   USPC .......... 297/188.08, 188.09, 188.1, 188.11, 297/188.12, 188.13, 440.1, 440.14, 297/452.63, 452.52
   See application file for complete search history.

(56) References Cited

U.S. PATENT DOCUMENTS

| | | | |
|---|---|---|---|
| 1,915,674 A | 6/1933 | Jones | |
| 2,216,991 A | 10/1940 | Trovillo | |
| 2,249,266 A | 7/1941 | Bell | |
| 2,446,775 A | 8/1948 | Marsack | |
| 2,466,204 A * | 4/1949 | Brown | A47C 3/029 297/440.16 X |
| 2,547,840 A | 4/1951 | Smith | |
| 2,793,685 A * | 5/1957 | Spitz | A47C 17/34 297/440.23 X |
| 3,030,146 A * | 4/1962 | Faxon | A47C 4/02 297/440.1 X |
| 3,114,578 A * | 12/1963 | Hamilton | A47C 7/40 297/452.63 X |
| 3,117,775 A * | 1/1964 | Hamilton | A47C 7/285 297/452.63 X |
| 4,032,188 A * | 6/1977 | Jones | A47C 11/00 297/232 |
| 4,077,666 A * | 3/1978 | Heumann | A47C 13/005 297/440.14 X |
| 4,523,787 A * | 6/1985 | Robinson | A47C 4/028 297/440.1 |
| 4,602,817 A * | 7/1986 | Raftery | A47C 4/02 297/440.1 X |
| 4,711,495 A * | 12/1987 | Magder | A47C 4/028 297/452.52 |
| 4,868,941 A | 9/1989 | Tai | |
| 4,932,720 A * | 6/1990 | Sherman | A47C 4/02 297/440.16 |
| 4,956,884 A | 9/1990 | Hwang | |
| 5,040,255 A | 8/1991 | Barber, Jr. | |
| 5,214,809 A | 6/1993 | Stuart | |
| 5,316,371 A * | 5/1994 | Bishai | B60N 2/7094 297/452.63 X |
| 5,435,026 A | 7/1995 | Cavazos | |
| 5,471,688 A | 12/1995 | Cavazos | |
| 5,485,639 A | 1/1996 | Cavazos | |
| 5,700,060 A * | 12/1997 | Bullard | A47C 7/24 297/452.63 X |
| 5,890,767 A * | 4/1999 | Chang | A47C 4/02 297/440.14 X |
| 6,050,638 A * | 4/2000 | West, III | A47C 7/62 297/188.09 X |
| 6,055,689 A | 5/2000 | Cavazos | |
| 6,082,825 A * | 7/2000 | Simon | A47C 7/35 297/452.63 X |
| 6,116,694 A * | 9/2000 | Bullard | A47C 7/287 297/452.52 X |
| 6,241,317 B1 * | 6/2001 | Wu | A47C 4/02 297/440.1 |
| 6,367,880 B1 * | 4/2002 | Niederman | A47C 4/02 297/440.14 |
| 6,595,592 B1 * | 7/2003 | Wieland | A47C 4/024 297/440.15 |
| 6,715,837 B2 * | 4/2004 | Niederman | A47C 4/02 297/440.14 |
| 6,796,614 B1 * | 9/2004 | Paul | A47C 7/42 297/440.14 X |
| 6,942,298 B2 * | 9/2005 | Harrison | A47C 4/02 297/440.1 |
| 6,952,906 B2 | 10/2005 | Nelson | |
| 7,028,859 B2 * | 4/2006 | Moon | B65D 11/1873 297/440.1 X |
| 7,066,548 B2 * | 6/2006 | Butler | B63B 29/04 297/440.1 X |
| 7,066,553 B2 | 6/2006 | Maloney | |
| 7,213,885 B2 | 5/2007 | Nelson | |
| 7,255,403 B2 * | 8/2007 | Butler | B63B 29/04 297/440.1 X |
| 7,322,642 B2 * | 1/2008 | BoJack | A47B 83/001 297/188.08 X |
| 7,419,220 B2 | 9/2008 | Nelson | |
| 7,434,304 B2 * | 10/2008 | Owens | A47C 4/02 29/428 |
| 7,480,947 B2 * | 1/2009 | Patella | A47C 13/005 297/440.23 |
| 7,493,668 B2 | 2/2009 | Piraino | |
| 7,494,182 B2 * | 2/2009 | Westendorf | A47C 17/86 297/452.63 X |
| 7,547,073 B2 | 6/2009 | White | |
| 7,568,767 B2 * | 8/2009 | Richardson | A47C 4/02 297/440.1 X |
| 7,581,786 B1 * | 9/2009 | Wang | A47B 83/00 297/188.11 |
| 7,744,162 B2 * | 6/2010 | Griggs, Jr. | A47C 17/00 297/440.14 |
| 7,757,322 B2 | 7/2010 | An | |
| 7,861,333 B2 | 1/2011 | Grossman et al. | |
| 7,963,612 B2 | 6/2011 | Nelson | |
| 8,375,483 B2 | 2/2013 | Ray et al. | |
| 8,621,685 B2 | 1/2014 | Jin | |
| 8,689,992 B2 * | 4/2014 | Anderson | A47C 1/14 220/4.01 |
| 8,764,114 B1 * | 7/2014 | Frank | A47C 13/005 297/440.14 X |
| 8,777,319 B2 * | 7/2014 | Brandtner | A47C 4/02 297/440.15 |
| 8,783,778 B2 | 7/2014 | Nelson | |
| 8,904,578 B2 | 12/2014 | Saunders | |
| 8,919,885 B2 * | 12/2014 | Han | A47C 3/00 297/440.1 X |
| 9,131,782 B1 | 9/2015 | Baker | |
| 9,277,813 B2 | 3/2016 | Nelson | |
| 9,277,826 B2 | 3/2016 | Nelson | |
| 9,420,892 B2 * | 8/2016 | Lejcher | A47C 7/22 |
| 9,526,342 B2 * | 12/2016 | Thuma | A47C 7/626 |
| 9,596,937 B2 * | 3/2017 | Ng | A47C 4/024 |
| 9,603,448 B2 | 3/2017 | Nelson | |
| 9,668,581 B1 * | 6/2017 | Hill | A47C 4/02 |
| 9,839,295 B2 * | 12/2017 | Robinson | A47C 3/00 |
| 9,936,800 B2 | 4/2018 | Nelson | |
| 10,070,725 B2 | 9/2018 | Nelson | |
| 10,123,621 B2 | 11/2018 | Nelson | |
| 10,123,623 B2 | 11/2018 | Nelson | |
| 10,143,307 B2 | 12/2018 | Nelson | |
| 10,154,733 B2 | 12/2018 | Nelson | |

(56) References Cited

U.S. PATENT DOCUMENTS

| | | | |
|---|---|---|---|
| 10,212,519 B2 | 2/2019 | Nelson | |
| 10,236,643 B2 | 3/2019 | Nelson | |
| 10,390,610 B2 | 8/2019 | Nelson | |
| 10,512,338 B1* | 12/2019 | Hawkins | A47C 19/02 |
| 2001/0013147 A1 | 8/2001 | Fogel | |
| 2002/0017814 A1* | 2/2002 | Niederman | A47C 4/02 |
| | | | 297/440.16 |
| 2003/0151295 A1 | 8/2003 | Nelson | |
| 2004/0021359 A1* | 2/2004 | Chang | A47C 4/024 |
| | | | 297/440.23 |
| 2005/0067876 A1* | 3/2005 | Dortch | A47C 3/00 |
| | | | 297/440.1 |
| 2005/0179303 A1* | 8/2005 | Owens | A47C 4/02 |
| | | | 297/440.1 |
| 2005/0225153 A1* | 10/2005 | Ou | A47C 17/00 |
| | | | 297/440.1 |
| 2007/0001494 A1 | 1/2007 | Hoover | |
| 2008/0098533 A1 | 5/2008 | Erdman | |
| 2009/0235451 A1* | 9/2009 | Gorkin | A47C 4/022 |
| | | | 297/440.14 X |
| 2010/0093257 A1* | 4/2010 | Elliott | A47C 4/03 |
| | | | 297/440.14 X |
| 2010/0264715 A1* | 10/2010 | Griggs, Jr. | A47C 4/02 |
| | | | 297/440.1 |
| 2012/0146382 A1* | 6/2012 | Griggs, Jr. | A47C 4/028 |
| | | | 297/440.1 |
| 2012/0217784 A1* | 8/2012 | Griggs, Jr. | A47C 4/08 |
| | | | 297/440.1 |
| 2013/0269114 A1 | 10/2013 | Wu | |
| 2013/0320741 A1* | 12/2013 | Brandtner | A47C 4/028 |
| | | | 297/440.1 |
| 2014/0139000 A1* | 5/2014 | Ogg | A47C 7/546 |
| | | | 297/440.1 X |
| 2014/0375103 A1* | 12/2014 | Lejcher | A47C 7/22 |
| | | | 297/440.1 |
| 2016/0174715 A1 | 6/2016 | Nelson | |
| 2017/0007035 A1 | 1/2017 | Shi | |
| 2017/0119168 A1 | 5/2017 | Al-Hazeem | |
| 2017/0367486 A1 | 12/2017 | Nelson | |
| 2018/0041354 A1 | 2/2018 | Nelson | |
| 2019/0142165 A1 | 5/2019 | Nelson | |
| 2019/0222935 A1 | 7/2019 | Nelson | |
| 2020/0100030 A1 | 3/2020 | Nelson | |
| 2020/0100031 A1 | 3/2020 | Nelson | |
| 2020/0221877 A1* | 7/2020 | Hirschhaut | A47C 17/04 |
| 2020/0237098 A1* | 7/2020 | VandenBos | A47C 9/00 |
| 2020/0260880 A1 | 8/2020 | Nelson et al. | |
| 2021/0093087 A1* | 4/2021 | Zei | A47C 17/04 |
| 2021/0112341 A1* | 4/2021 | Nelson | A61H 23/0236 |

FOREIGN PATENT DOCUMENTS

| | | |
|---|---|---|
| CN | 207011997 | 2/2018 |
| CN | 108324004 | 7/2018 |
| DE | 20207959 | 11/2002 |
| DE | 202014104327 | 11/2014 |
| DE | 102014105015 | 6/2015 |
| RU | 2335223 | 10/2008 |
| WO | 2017202488 | 11/2017 |

OTHER PUBLICATIONS

Website pages from www.westelm.com, "West Elm," printed Jun. 2, 2016 (4 pgs).

* cited by examiner

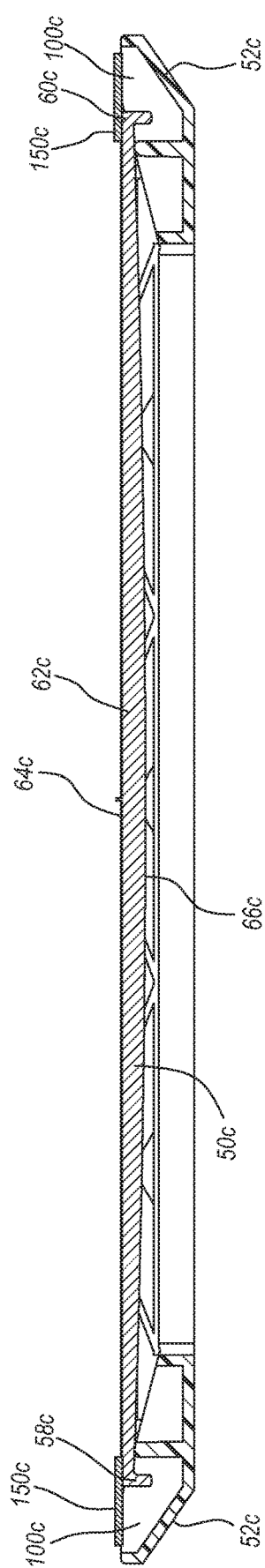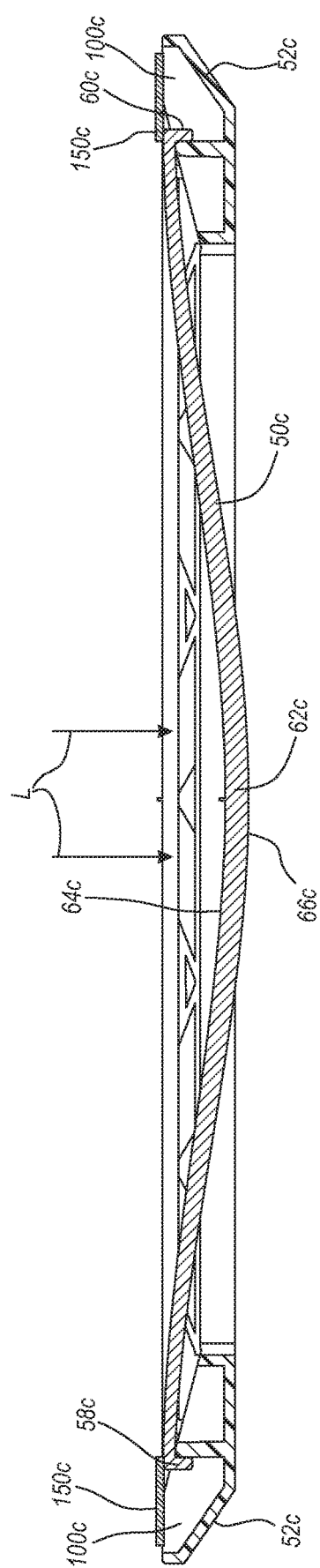
FIG. 15A
FIG. 15B

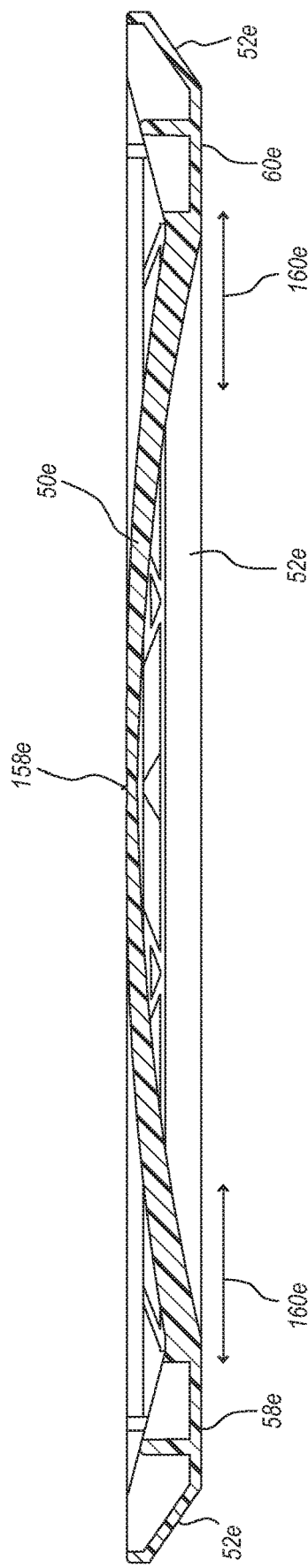
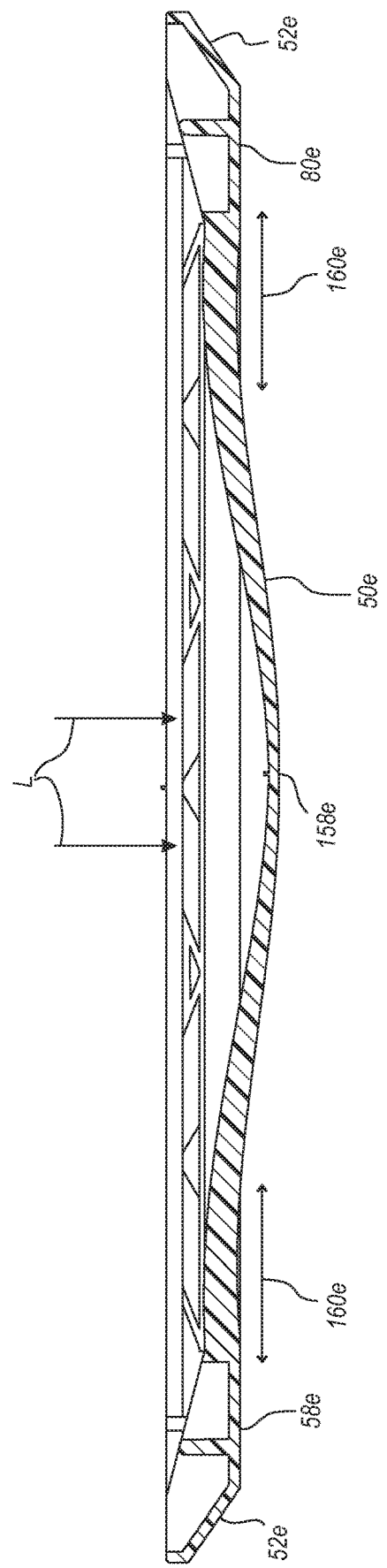
FIG. 21A
FIG. 21B

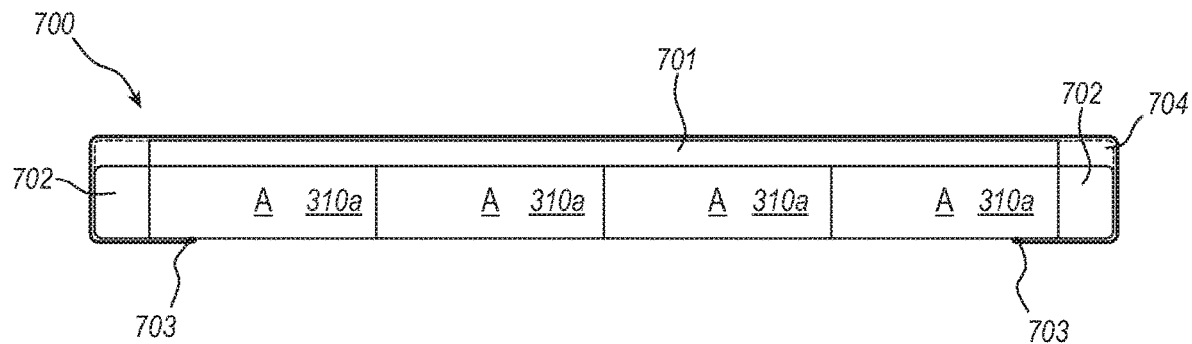
FIG. 33A
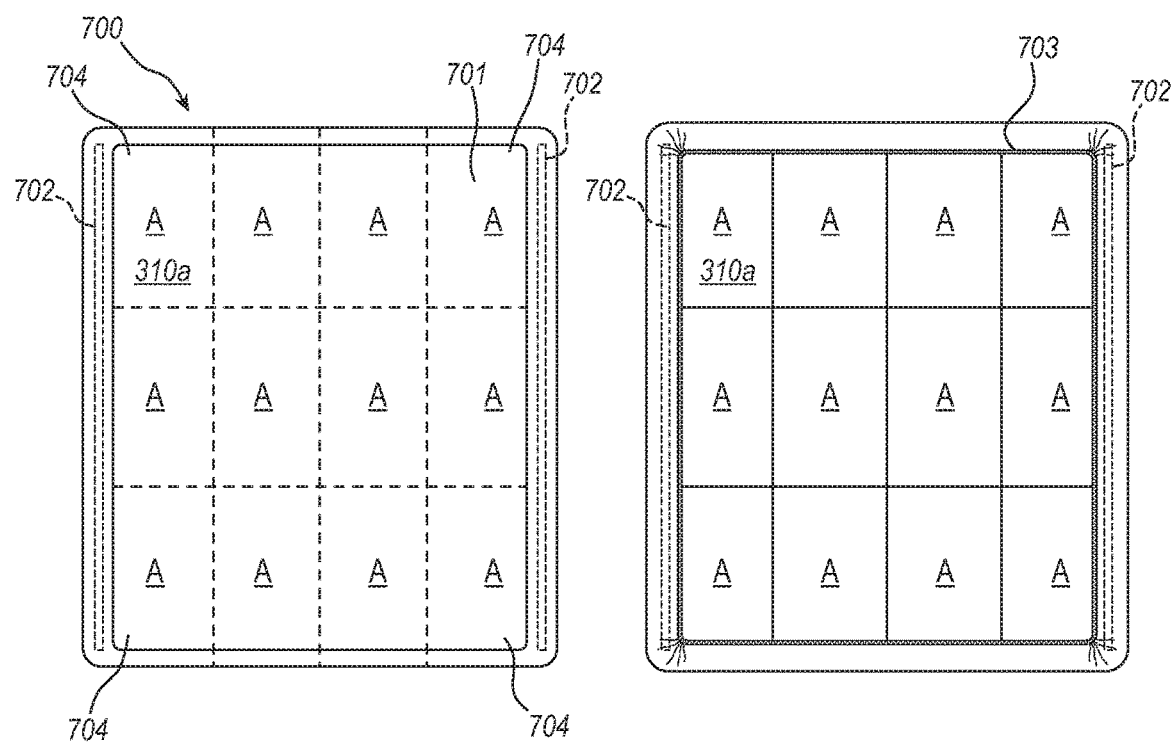 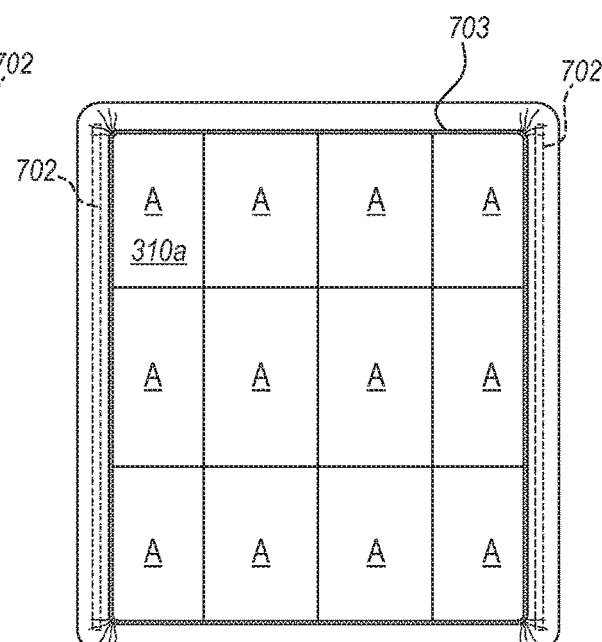
FIG. 33B     FIG. 33C

FURNITURE SPRING SYSTEM

CROSS-REFERENCE TO RELATED APPLICATIONS

This application claims the benefit of and priority to U.S. Provisional Application No. 62/806,516, filed on Feb. 15, 2019, entitled INTEGRATED MANUFACTURING FOR MODULAR FURNITURE, which is incorporated herein in its entirety by reference.

BACKGROUND

The Field of the Invention

The present disclosure relates to furniture and furniture systems. More specifically, the present disclosure relates to furniture spring systems.

The Relevant Technology

Spring systems that provide cushioning to furniture items such as beds, couches, and chairs are generally manufactured to be permanently fixed within a furniture item. For example, a box spring for a mattress includes internal springs that are not removable by a user. Also, S-springs or other springs are often integrated into base members of couches and chairs to provide added cushioning beneath cushions placed thereon.

Spring systems currently utilized in furniture are limited in a number of ways. For example, as noted above, spring systems are not removable or replaceable by a user without significant deconstruction of the furniture item and costly reconstruction. Typically, when a spring in a box spring breaks, it is more economical for the user to throw out the box spring and buy a new one rather than fix the single broken spring. Also, springs built into couches and chairs are integrated into the furniture in such a way that replacement of the spring system is difficult or impossible without damaging the furniture. Thus, as spring systems age and become less firm over time, it is not viable to simply replace the spring system.

Furthermore, the cushioning provided by current spring systems are set such that the user cannot change the degree of flexion, or "firmness," of the spring system to alter the provided cushioning effect. Rather, the spring system built into a given furniture item, and thus the degree of cushioning provided, is predetermined by the manufacturer and cannot be changed by the user.

However, over time, or as the use of a furniture item changes from one user to another, it may be desirable to change the amount of cushioning provided by a spring system within a furniture item. For example, users often have varying opinions on how firm they like their bed, including a firmness of their box spring. Additionally, a user's preference may change over time. Unfortunately, users need to buy entirely different box springs to alter the firmness of their beds. The same applies to the firmness of spring systems built into couches, chairs, and other furniture items.

Furniture items, such as beds, couches, and chairs, can also include built-in storage spaces. For example, a bed may include space within or underneath the bed frame to store items. Also, couches may include storage spaces within base components or otherwise underneath cushions or within ottomans. However, such furniture storage spaces, which are advantageous to save space and provide extra storage areas within a room, are constructed in a way that while protecting items within the storage spaces from damage limit cushioning or firmness variations. For example, for a storage space disposed underneath a bed or couch, rigid barriers to the storage space, such as lids or drawers, are used to protect items placed inside the storage space. These rigid components are placed underneath furniture cushions or mattresses to support users who sit or lie thereon and can negatively affect the comfort of the furniture item.

Accordingly, there are a number of problems in the prior art that need to be addressed in the field of furniture and furniture spring systems.

BRIEF SUMMARY OF THE INVENTION

The present disclosure relates to furniture and furniture systems. More specifically, the present disclosure relates to furniture spring systems. In one embodiment of the present disclosure, for example, a furniture spring system, includes a lid configured to provide a seating surface. The lid includes a frame comprising two opposing frame members and a retention member disposed on a top surface of at least one of the two opposing frame members. The spring system also includes an elongate slat extending between the two opposing frame members. In such an embodiment, the slat has an elongate body with an upper surface, a lower surface, a first end, a second end, and a flexible middle portion extending between the first end and the second end. The slat also includes a catch disposed at the first or second end. The catch engages the retention member to retain the slat to the frame and is configured to slide back-and-forth relative to the retention member as the middle portion elastically flexes downward and upward in response to forces intermittently pushing downward on the slat during use.

Furniture spring systems described herein solve a number of problems. For example, furniture spring systems of the present disclosure provide support to users sitting or lying thereon while protecting items that may be placed or stored below. In some configurations, spring systems described herein are modular. In some configurations, the spring systems described herein are easily replaceable without requiring deconstruction of other furniture components. In some configurations, spring systems described herein are adjustable so that users can customize the firmness or size of the spring system to suit their preferences or spacing needs. In some embodiments, the slats of the spring system can be extendable or contractable in order to make a furniture system a different size. In some configurations, the spring systems described herein can be at least one of moveable, replaceable, and adjustable. Embodiments of the invention, such as the examples disclosed herein, may be beneficial in a variety of respects.

In one embodiment of the present disclosure, a furniture spring system includes a lid configured to provide a seating surface and an elongate slat. The lid includes a frame having two opposing frame members, each frame member having a chamfered top inner edge, and a retention member disposed on at least one of the two opposing frame members. The elongate slat extends between the two opposing frame members and includes an elongate body having an upper surface, a lower surface, a first end, a second end, and a flexible middle portion extending between the first end and the second end. The elongate slat also includes a catch disposed at the first or second end, the catch engaging the retention member to retain the slat to the frame. The chamfered top inner edge of each frame member is configured to allow the slat to flex downward in response to a load applied thereon without the frame members impeding a downward displacement of the lower surface of the slat during use.

In one embodiment of the present disclosure, a furniture assembly includes a transverse member and a base member. The base member includes a base frame member having a bottom panel, side panels, and upper edges on the side panels. The base member also includes a lid configured to be mounted on the base frame member. The lid is mounted such that the lid covers a storage cavity formed within the base frame member. In such an embodiment, the lid includes slats, each slat having an elongate member and one or more catches that engage retention members of the base frame member.

In one embodiment, a furniture spring system of the present invention comprises (i) a lid configured to provide a seating surface, the lid comprising a frame comprising two opposing frame members and a retention member associated with at least one of the two opposing frame members; and (ii) a slat extending between the two opposing frame members, the slat comprising an elongate body having a first end and a second end and a catch disposed at the first end or second end, wherein the catch engages the retention member to retain the slat to the frame and the catch is configured to slide back-and-forth relative to the retention member as a portion of the elongate body between the first end and the second end elastically flexes downward and upward in response to forces intermittently pushing downward on the slat during use.

Another embodiment of a furniture spring system comprises a frame comprising two opposing frame members, and a retention member disposed on at last one of the two opposing frame members, and an elongate slat extending between the two opposing frame members, the slat comprising an elongate body having an upper surface, a lower surface, a first end, a second end, and a flexible middle portion extending between the first end and the second end, and a catch disposed at the first end or the second end, the catch engaging the retention member to retain the slat to the lid frame.

A furniture assembly of the present invention may comprise (i) a transverse member and (ii) a base member, the base member comprising a storage base and a lid configured to be mounted on a top of the storage base, such that the lid covers a storage cavity formed within the storage base, the lid comprising a frame with opposing frame members having one or more retention members, and one or more slats, each slat having an elongate member and one or more catches that engage the one or more retention members of the frame.

In another embodiment, a furniture spring system comprises, (i) a lid configured to be mounted onto (ii) a base frame of a furniture base, the lid configured to provide a seating surface, the lid comprising, a frame comprising two opposing frame members, and a plurality of retention members associated with each of the two opposing frame members, a plurality of slats extending between the two opposing frame members, each of the slats comprising an elongate body having a first end and a second end and first and second catches disposed at the first end and second end, respectively, of the elongate body, wherein each catch engages a retention member to retain the corresponding slat to the frame, and wherein each catch of a slat is configured to slide back-and-forth relative to the corresponding retention member as a portion of the elongate body between the first end and the second end elastically flexes downward and upward in response to forces intermittently pushing downward on the slat during use.

Principles of the present invention can also be applied to mattresses and sleeping systems, making the systems more efficient, useful, and enabling the use of various parts in various different sizes of mattresses and bedding systems.

In one embodiment, a modular mattress system of the present invention comprises a plurality of mattress modules configured to form a first modular mattress of a first selected geometry and being reconfigurable to form a second modular mattress of a second selected geometry, each of the mattress modules having a width (x) and a length (y), wherein the length (y) is substantially equal to two times the width (x); a bed casing (e.g., a rigid bed casing) configured to secure the plurality of mattress modules to form a completed mattress; and a mattress topper sized and shaped to substantially cover the completed mattress and provide additional cushioning to a user.

Manufactured components of the present invention may include base members, and/or transverse members, e.g., for use in assembling a chair, couch, or the like, or other furniture components, methods, or technology, such as those disclosed in U.S. Pat. No. 7,213,885 entitled MODULAR FURNITURE ASSEMBLY, incorporated herein by reference in its entirety. The modular furniture components and methods disclosed in the present application may also be used in connection with numerous furniture assemblies, e.g., such as, but not limited to, any similar to those disclosed in (i) U.S. Pat. No. 9,277,826, entitled MOUNTING PLATFORM FOR MODULAR FURNITURE ASSEMBLY, (ii) U.S. Pat. No. 8,783,778, entitled MOUNTING PLATFORM FOR MODULAR FURNITURE ASSEMBLY, (iii) U.S. Pat. No. 7,963,612 entitled MODULAR FURNITURE ASSEMBLY, (iv) U.S. Pat. No. 7,547,073, entitled MODULAR FURNITURE ASSEMBLY, (v) U.S. Pat. No. 7,213,885 entitled MODULAR FURNITURE ASSEMBLY, (vi) U.S. Publication No. 2017/0367486 entitled MODULAR FURNITURE ASSEMBLY CORNER SEATING SYSTEM, (vii) U.S. Pat. No. 10,212,519 entitled ELECTRONIC FURNITURE SYSTEMS WITH INTEGRATED INTERNAL SPEAKERS, (viii) U.S. Pat. No. 10,236,643 entitled ELECTRICAL HUB FOR FURNITURE ASSEMBLIES, (ix) U.S. Pat. No. 10,143,307 entitled FURNITURE SYSTEM WITH RECLINER ASSEMBLY, and (x) U.S. Pat. No. 10,123,621 entitled FURNITURE SYSTEM RECLINER ASSEMBLY WITH SLED RAILS, each of which is incorporated herein by reference in its entirety.

These and other objects and features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 15A illustrates a cross-sectional view of the spring system illustrated in FIG. 14A along plane 15A-15A indicated in FIG. 14A;

FIG. 15B illustrates a cross-sectional view of the spring system illustrated in FIG. 14B along plane 15B-15B indicated in FIG. 14B;

FIG. 21A illustrates a cross-sectional view of the spring system illustrated in FIG. 20A along plane 21A-21A indicated in FIG. 20A;

FIG. 21B illustrates a cross-sectional view of the spring system illustrated in FIG. 20B along plane 21B-21B indicated in FIG. 20B;

FIG. 33A illustrates a side, cross-sectional view of a casing of a modular mattress system as applied to a number of mattress modules according to one or more implementations of the present disclosure.

FIG. 33B illustrates a top plan view of a casing of a modular mattress system as applied to a number of mattress modules according to one or more implementations of the present disclosure.

FIG. 33C illustrates a bottom plan view of a casing of a modular mattress system as applied to a number of mattress modules according to one or more implementations of the present disclosure.

DETAILED DESCRIPTION OF THE PREFERRED EMBODIMENTS

Figure 1:
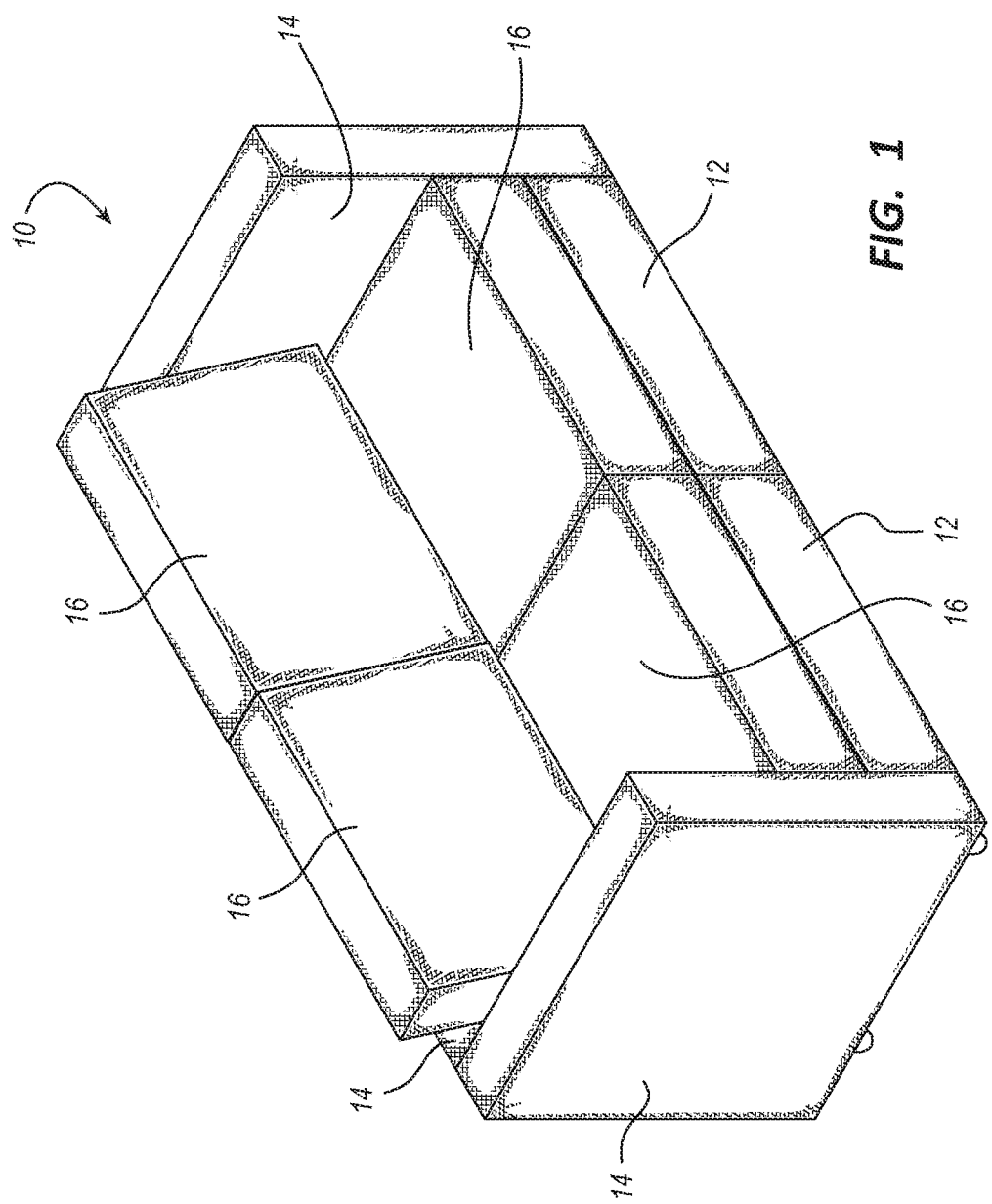
FIG. 1 illustrates an embodiment of a modular furniture system in the form of a couch, including two bases, a number of transverse members, and number of cushions on top of the bases, according to the present disclosure.

The present disclosure relates to furniture and furniture systems. More specifically, the present disclosure relates to furniture spring systems. For example, in at least one embodiment of the present disclosure, a furniture spring system includes a lid configured to provide a seating surface. The lid includes a frame having two opposing frame members and a retention member disposed on a top surface of at least one of the two opposing frame members. The spring system also includes an elongate slat extending between the two opposing frame members. The slat has an elongate body with an upper surface, a lower surface, a first end, a second end, and a flexible middle portion extending between the first end and the second end. The slat also includes a catch disposed at the first or second end. The catch engages the retention member to retain the slat to the frame and is configured to slide back-and-forth relative to the retention member as the middle portion elastically flexes downward and upward in response to forces intermittently pushing downward on the slat during use.

Furniture spring systems described herein solve a number of problems. For example, furniture spring systems of the present disclosure provide support to users sitting or lying thereon while protecting items that may be placed or stored below. In some configurations, spring systems described herein are modular. In some configurations, spring system described herein are easily replaceable without requiring deconstruction of other furniture components. In some configurations, spring systems described herein are adjustable so that users can customize the firmness of the spring system to suit their preferences. In some embodiments, the slats of the spring system can be extendable. In some configurations, the spring systems described herein can be at least one of moveable, replaceable, and adjustable.

Embodiments of the invention, such as the examples disclosed herein, may be beneficial in a variety of respects. For example, and as will be apparent from the present disclosure, one or more embodiments of the invention can provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

Turning now to the Figures, FIG. 1 illustrates an embodiment of a modular furniture system 10 in the form of a couch, including two bases 12, a number of transverse members 14, and number of cushions 16 on bases 12. The two bases 12 and the transverse members 14 are secured together via the couplers 18, which are generally hidden from view as depicted in FIG. 1, but shown in the exploded view of the furniture system 10b in FIG. 2. The furniture system 10 is modular in that the bases 12, the transverse members 14, and the cushions 13 can be added, subtracted, and repositioned relative to one another to form any number of furniture configurations. For instance, while FIG. 1 illustrates the furniture system 10 arranged to form a two-seated couch, the size and configuration of the furniture system can be varied based upon the particular needs of a user. For instance, in another configuration, the furniture system 10 can include additional bases 12 and transverse members 14 to form a larger couch, an L-shaped sectional, or the like. In still another configuration, such as illustrated in FIG. 2, a single base 12 is combined with the transverse members 14 and at least one cushion 16 to form a chair, as will be described in more detail hereinafter. In still other configurations, one or more bases 12 may be configured without any transverse members 14 to form ottomans, other seats, and other types of furniture systems. For example, one or more bases 12 and cushions 13 can be configured together to form a bed, including a box spring comprised of the bases 12 and/or the cushions 13 serving as a mattress or other padding.

One or more of the bases 12 of the furniture system 10 can include a storage cavity or space to store items, such as blankets, books, electronics, or other items within the base 12. As such, in the description, base and storage base can be used interchangeably to refer to the bases of the various furniture systems. In at least one embodiment, the storage bases can be visually indistinguishable from non-storage bases and often improve the aesthetic appearance of the furniture systems over the non-storage bases. Because the bases 12 can be rearranged and reconfigured within the furniture system 10, the storage spaces provided by such bases 12 can be repositioned within a footprint of the furniture system 10 without changing, repositioning, or otherwise reconfiguring the overall footprint of the furniture system 10. Stated another way, the location of particular storage spaces within a furniture system 10 can be changed while maintaining a particular footprint or combination modules forming the furniture system 10.

Figure 2A:
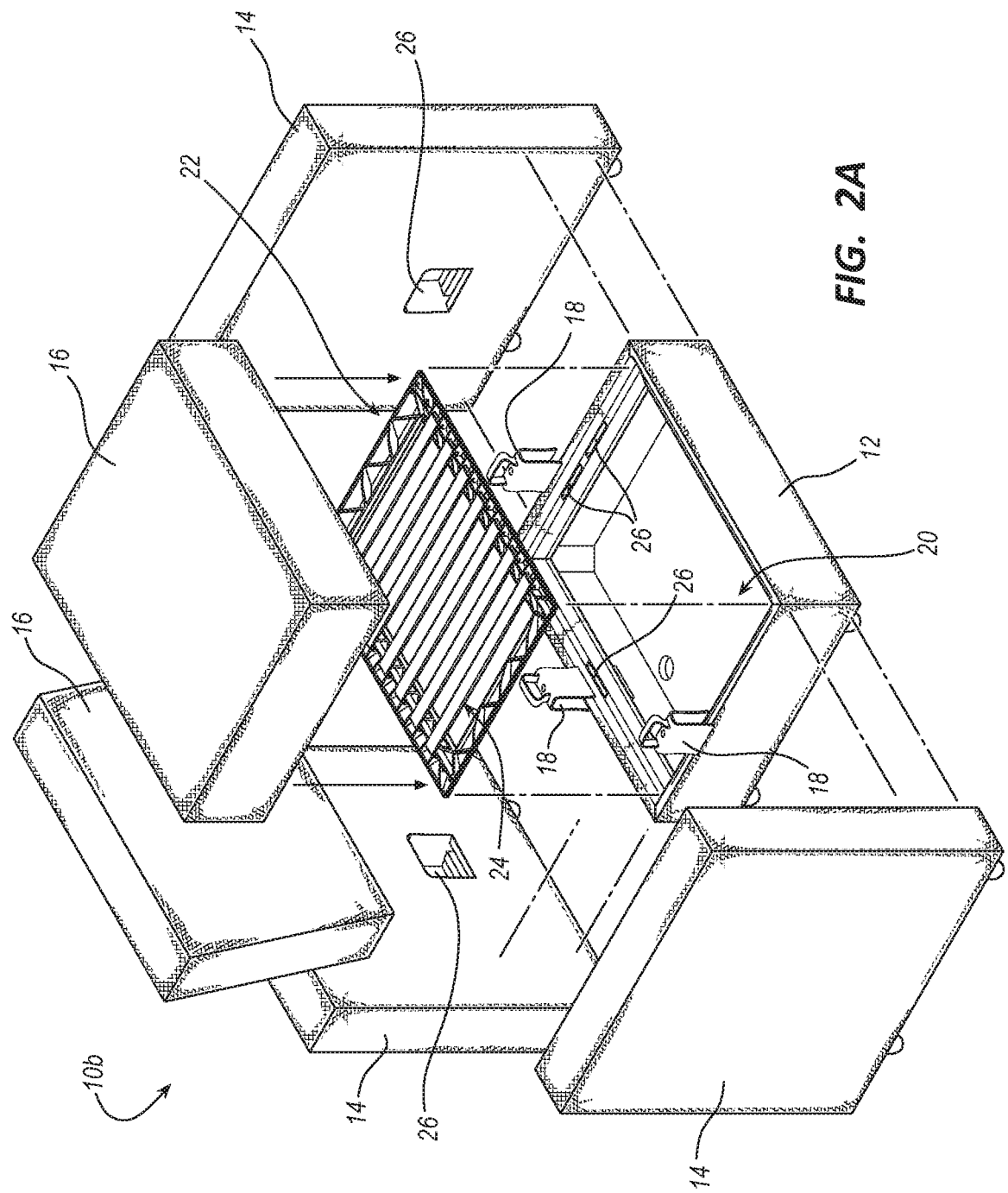
FIGS. 2A and 2B illustrate exploded views of another embodiment of a modular furniture system in the form of an armchair, including a storage base having a lid with a spring system extending thereacross and a plurality of couplers configured to hold the various transverse members to the base, according to the present disclosure.
Figure 2B:
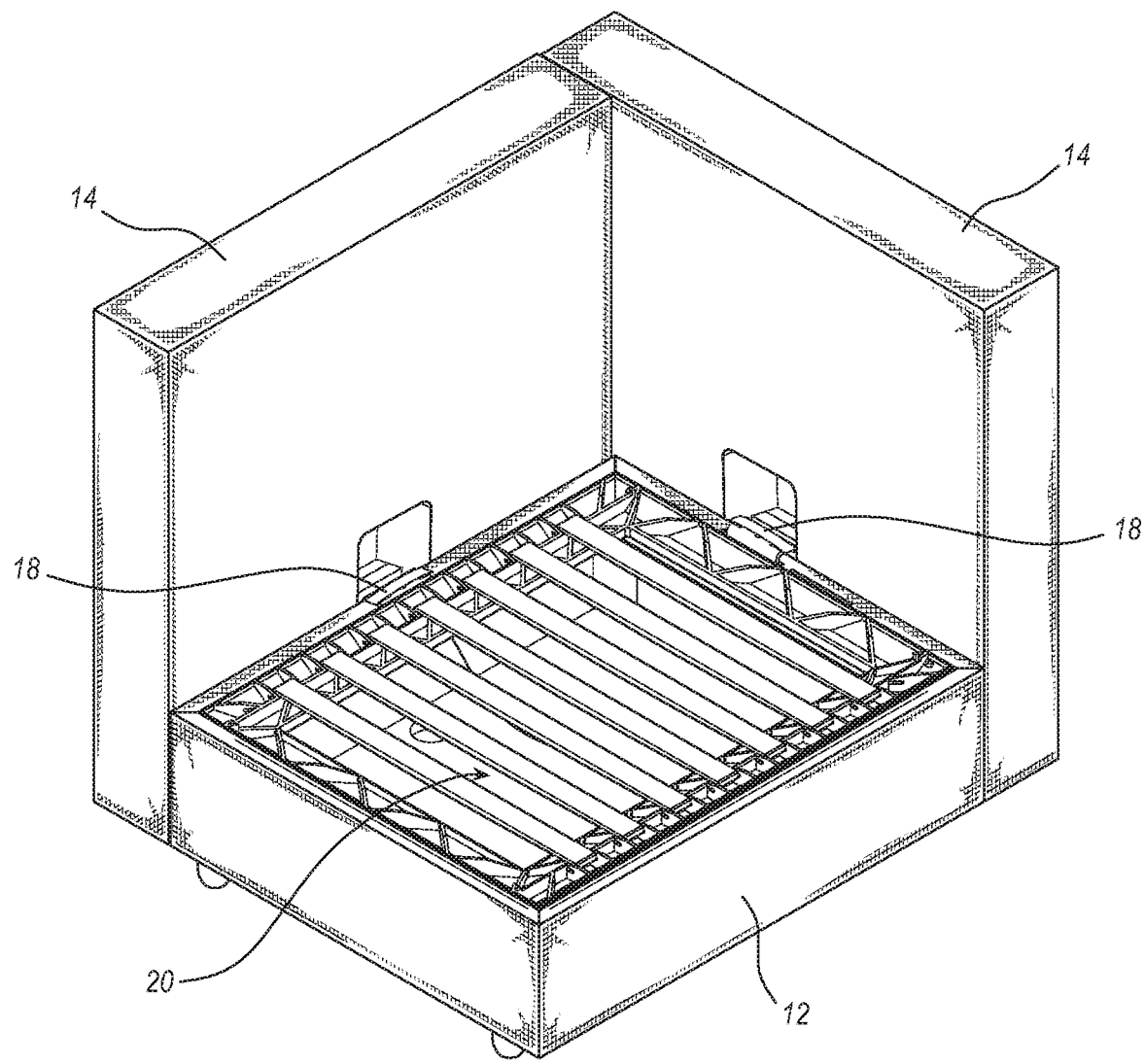

Turning now to FIGS. 2A and 2B, illustrated is another embodiment of a modular furniture system 10b in the form of an armchair. The description of the furniture system 10 is also applicable to the furniture system 10b, and vice versa.

The furniture system 10b includes a storage base 12 having a lid 22 with a spring system 24, and a cushion 16. A plurality of couplers 18 hold the various transverse members 14 to the storage base 12 as they are disposed within complementary slots 26 formed in the storage base 12 and the transverse members 14. For instance, the transverse members 14 and the storage base 12 include the slots 26 into which opposing arms of the couplers 18 are inserted to secure the storage base 12 to the various transverse members 14. The couplers 18 are removable such that the storage base 12 and the transverse members 14 can be separated, rearranged, and re-secured together. Alternatively, the base 12 and the traverse members 14 may be coupled via magnets embedded in one or both of base 12 and/or traverse members 14, optional with complementary iron-based coupling plates or connectors. The magnetic coupling assembly of U.S. Pat. No. 9,277,813 is incorporated herein by reference. In other configurations, other structures can be used to connect the storage bases 12, such as hook and loop fasteners, spring clamps, belts, or other mechanical fasteners or couplers. Additional details for a base or storage base useable with the spring system 24 can be found in U.S. patent application Ser. No. 16/707,571 entitled "Furniture Storage Base" filed Dec. 9, 2019, the entire disclosure of which is incorporated herein by this reference.

In at least one embodiment, the lid 22 is configured to be removable from the storage base 12 independently of the transverse members 14, as illustrated in FIGS. 2A-4B. For example, once the furniture system 10b is assembled so that the transverse members 14 are secured to the storage base 12 via the couplers 18, the lid 22 can be selectively removed from the storage base 12 to provide access to a storage cavity 20 defined by an interior space of the storage base 12. This can be done without removing any of the transverse members 14 from the storage base 12. Likewise, the lid 22 can be placed on top of the storage base 12 without altering any other connections of the various furniture system components. In some embodiments, "on top of a storage base" can include positioning the lid 22 on an uppermost edge or surface of one or more walls of the storage base 12. In other embodiments, "on top of a storage base" can include configurations where the lid 22 is disposed on at least a portion of the one or more walls. In other embodiments, "on top of a storage base" can include configurations where the lid 22 selective contacts at least a portion of the one or more walls, such as when the lid 22 is at least partially disposed within a recess of the storage base 12, as will be discussed in further detail hereinafter.

To allow the lid 22 to be easily removed from the storage base 12, the lid 22 may not be secured in any way to the storage base 12. Rather, the lid 22 can rest on top of the storage base 12 and can easily be lifted off. However, in at least one embodiment, the lid 22 can be partially or removably secured to the storage base 12. For example, in at least one embodiment, the lid 22 can be removably secured to the storage base 12 via one or more clips, clamps, or other securement means along one or multiple edges of lid 22. In such an embodiment, the lid 22 can be removably secured to storage base 12 to prevent the lid 22 from inadvertently lifting, sliding off, or otherwise disengaging from storage base 12.

Alternatively, in at least one embodiment, the lid 22 is fixed on top of the storage base 12 to allow the lid 22 to be pivoted or tilted from the storage base 12 like a door. For instance, as illustrated in FIGS. 4C-4D, the lid 22 is fixed to the storage base 12 via one or more hinges 28. Other securement means, including removable securement means that secure the lid 22 to the storage base 12 are also contemplated which at least partially secure the lid 22 to the storage base 12 while still allowing selective access to the storage cavity 20.

In still other embodiments, the storage base 12 can be a base member that does not provide storage space. Rather, the storage base 12 can be configured as a typical furniture base member having springs, such as the spring system 24. Whether the lid 22 is removable or permanently fixed to the storage base 12, the lid 22 can still be utilized and function as described herein.

Figure 22B:
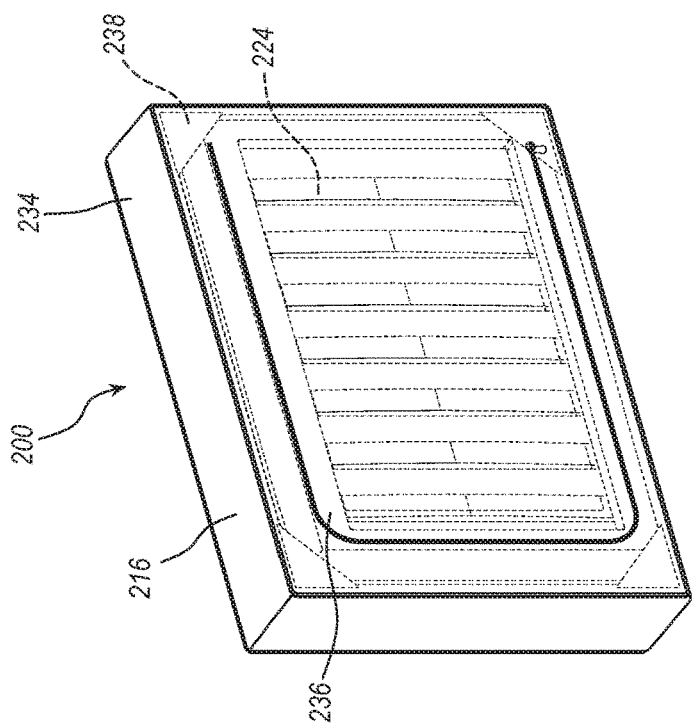
FIG. 22B illustrates an assembled view of the integrated lid-cushion assembly of FIG. 22A.
Figure 22A:
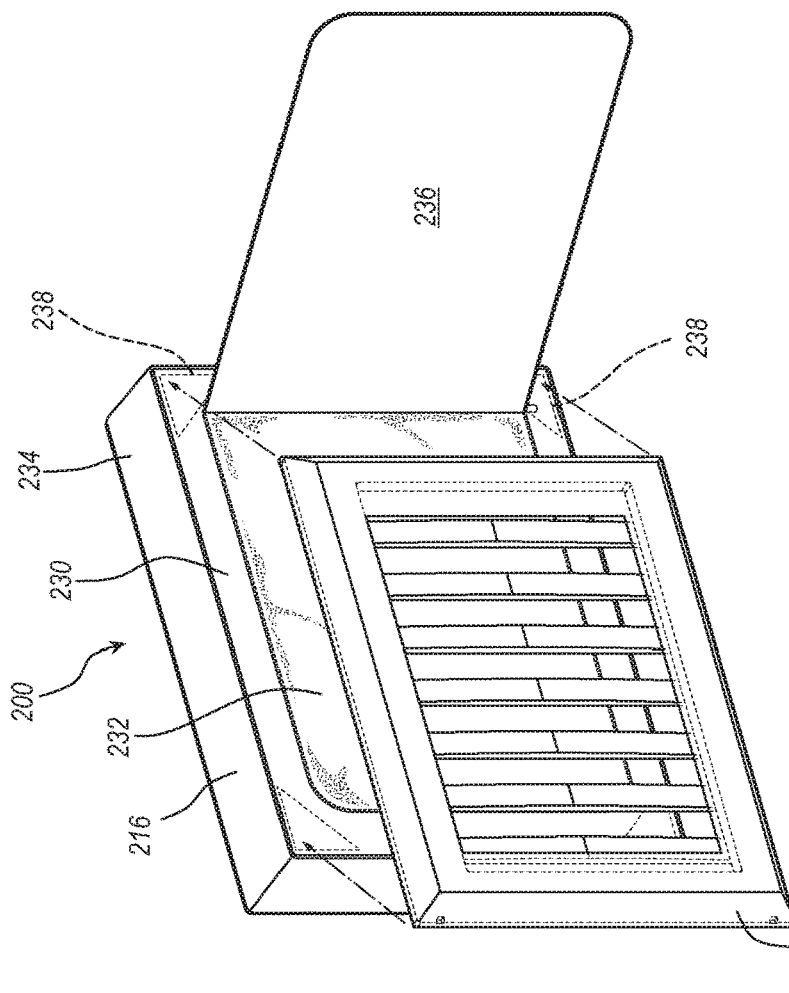
FIG. 22A illustrates an exploded view of an embodiment of an integrated lid-cushion assembly including a spring system, according to the present disclosure.

In the illustrated embodiments of FIGS. 1A-2A, the lid 22 and the cushion 16 are separate and distinct from one another. The cushion 16 sits on top of the lid 22, and/or a portion of the storage base 12, during use and can be freely separated from the lid 22 to provide access to the storage cavity 20. In at least one other embodiment, the lid 22 and the cushion 16 can be removably secured together or integrally formed with one another such that lifting the cushion 16 also lifts the lid 22 from the storage base 12, such as illustrated in FIGS. 22A-22B.

Figure 3A:
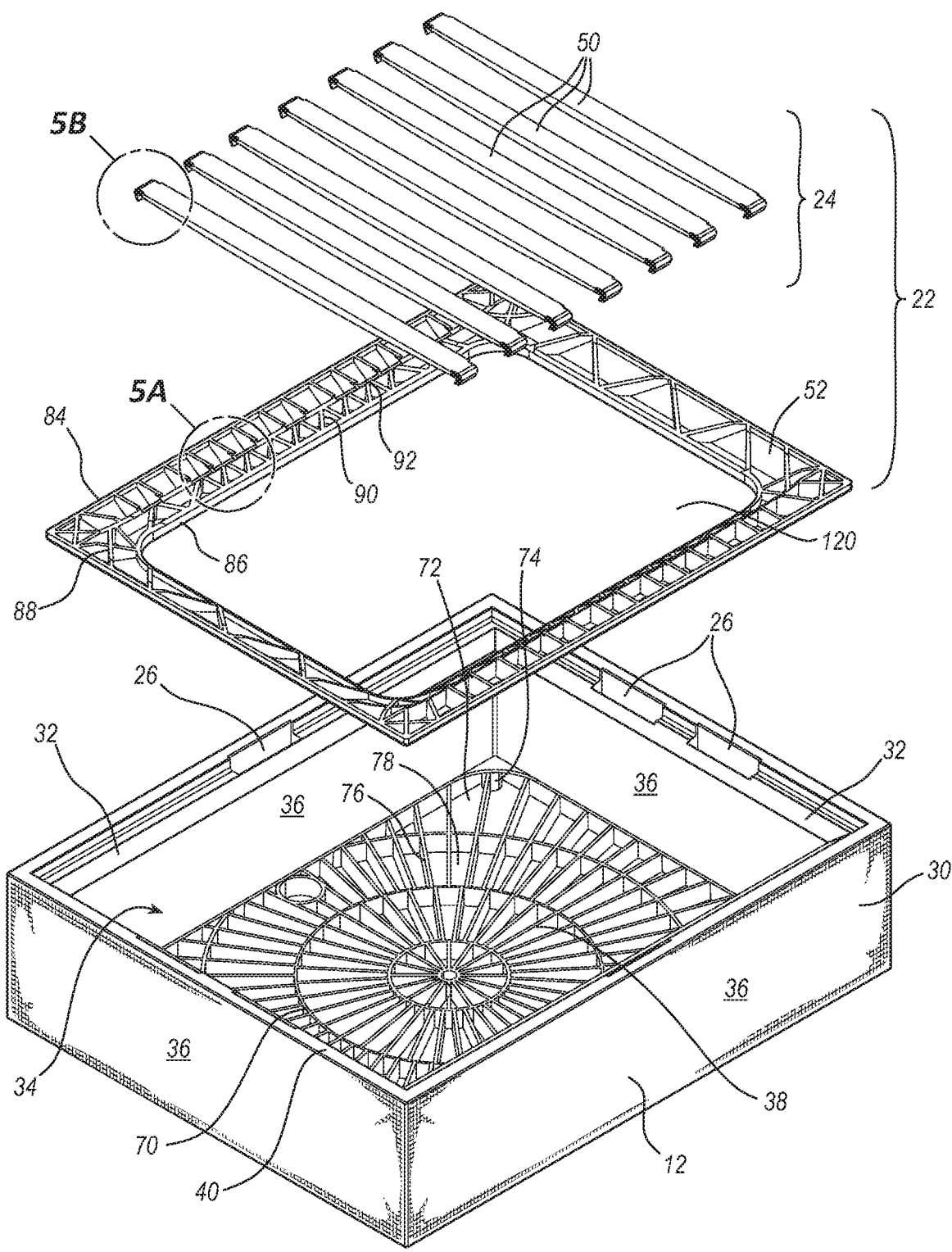
FIG. 3A illustrates an exploded view of an embodiment of a furniture spring system disposed over a furniture base, according to the present disclosure.
Figure 3B:
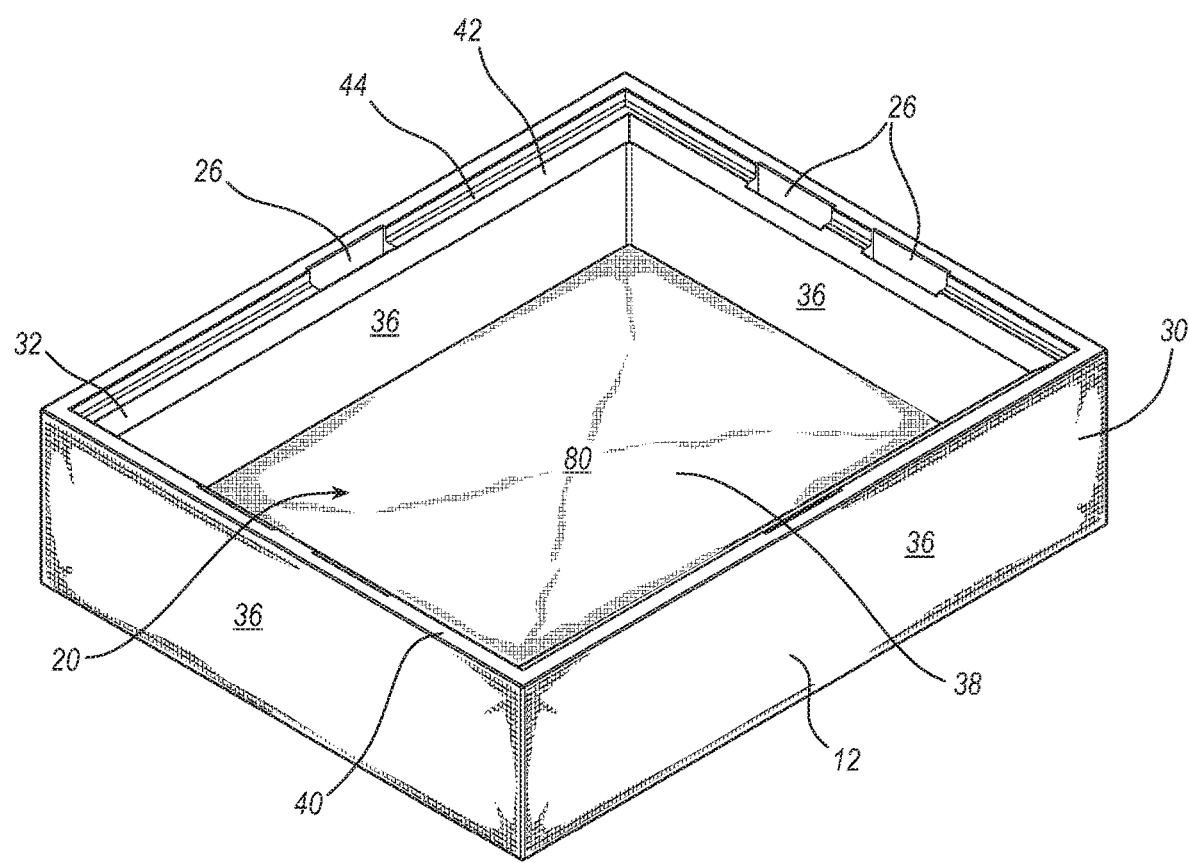
FIG. 3B illustrates the furniture base of FIG. 3A according to the present disclosure.

Turning to FIGS. 3A and 3B, the storage base 12 includes a base frame 30 with a recessed member 32 disposed within an interior space 34 of the base frame 30 and below a top surface 40 of the base frame 30; the interior space 34 forming a part of the storage cavity 20 (FIG. 2B). The base frame 30 includes the walls 36 and a base 38 that bound storage cavity 20. The lid 22 is configured to selectively rest upon the recessed member 32 without impinging on the storage cavity 20. The base 38 may optionally be covered or lined with fabric 80 (FIG. 3B), and optionally removable from a remainder of base frame 30. The fabric 80 can be separately removed from base 38 so it might be cleaned.

The recessed member 32 includes an internal chamfered edge 42 that extends at least partially around a perimeter of the base frame 30 and from a surface 44. The internal chamfered edge 42 and the surface 44 accommodate the lid 22. The surface 44, and optionally a portion of the internal chamfered edge 42, includes the slots 26 that receive the couplers 18 (FIG. 2A). Forming the slots 26 in the surface 44 rather than only in the internal chamfered edge 42 separates the couplers 18 (FIG. 2A) from a location where the lid 22 rests in the storage base 12. This creates a continuous surface free of obstructions on which the lid 22 may be placed, allowing at least a portion of the lid 22 to sit substantially flush with the top surface 40 of the base frame 30 to receive the cushion 16. Slots 26 are at least partially set back from the internal chamfered edge 42 to limit interference between the coupler 18 (FIG. 2A) and the lid 22 and the coupler 18 (FIG. 2A) and the cushion 16. A majority of a depth of the slots 26 are, therefore, positioned between the base frame 30 and the internal chamfered edge 42. In alternate configurations, the slots 26 are formed only in the surface 44, without a portion of the slot 26 formed in the internal chamfered edge 42 and/or the wall 36 of the base frame 30.

As mentioned previously, the storage cavity 20 or the interior space 34 can be defined by the walls 36, the base 38, and the lid 22. The base 38 can have an interior-facing surface 70 configured to come into contact with items stored within the storage base 12 when no fabric 80 is provided and an exterior-facing surface 72 which can come into contact with the floor or other surface where the storage base 12 is located. For instance, the base 38 includes feet 74 formed with the base 38. Webs 76 extend between the interior-facing surface 70 and the exterior-facing surface 72 and form venting holes 78 to provide airflow and decrease the weight of the base 38. As illustrated, the webs 76 form concentric rings and straight members emanating from a common central point, thereby including the venting holes 78 of different sizes. While this is one illustrative pattern of the webs, the base 38 can have different patterns of webs where the spacing between adjacent webs can be uniform or non-uniform, with sizes optionally being dependent on the size of the items to be stored within the storage base 12, and the desired weight or material usage to form the base 38. For example, toddler toys may include large blocks which can be stored in a storage base have a base with a large grid pattern or larger spacing between adjacent webs, while older children might have small toys requiring the base to having a smaller or finer-sized grid pattern.

The base 38 can be formed as monolithic structure with the feet 74 and the webs 76 formed as one-piece structure. Alternatively, the feet 74 can be separate structures from a remainder of base 38, the feet 74 being permanently or removably attached to a reminder of the base 38. In other configurations, less than all of the spaces between adjacent the webs 76 include the venting holes 76. In still other configurations, the base 38 may be solid, without the venting holes 78, so as to create a sealed compartment without any apertures. In still other configurations, the base 38 can include cross-hatching, patterning, groove formation, or other patterns, with or without venting holes, apertures, etc. In still other configurations, the Generally, the parts of storage base 12 can be formed as a single monolithic structure, i.e., as a one-piece structure, or alternatively, the parts of storage base 12 may separate pieces and assembled together to form storage base 12 as illustrated and described herein. Storage base 12 can be fabricated from a polymer, wood, metal, alloys, composites, combinations thereof, or the like.

Returning to FIG. 3A, the lid 22 includes the spring system 24 with associated slats 50 and frame 52. The frame 52 can be self-balancing in that a user may be able to drop the frame 52 onto the base 12 and the frame 52 may settle itself into the correct position on the base 12. The combination of the supports and structures of the frame 52 allow the frame 52 to maintain its shape under load as the slats 50 flex or deflect.

As illustrated, the frame 52 has an exterior support 84 and an interior support 86 separated by an upper support 88 and a transition support 90. Both the exterior support 84 and the interior support 86 extend around a perimeter of the frame 52, with the interior support 86 vertically displaced relative to the exterior support 84. Upper support 88 extends from the exterior support 84 towards an intermediate support 92 from which the transition support 90 extends to the interior support 86. The transition support 90 extends at an angle that approximates the internal chamfered edge 42 of recessed member 32 so the frame 52 can rest within the interior space 34.

To reduce overall weight of the frame 52, while maintaining strength and rigidity, the frame 52 includes a number of walls or webs forming spaces or compartments. This allows the frame 52 to be formed as a single monolithic structure, i.e., as a one-piece structure, or alternatively as a number of parts assembled together to form the frame 52. Additionally, the frame 52 can be fabricated from a polymer, wood, metal, alloys, composites, combinations thereof, or the like.

Figure 4A:
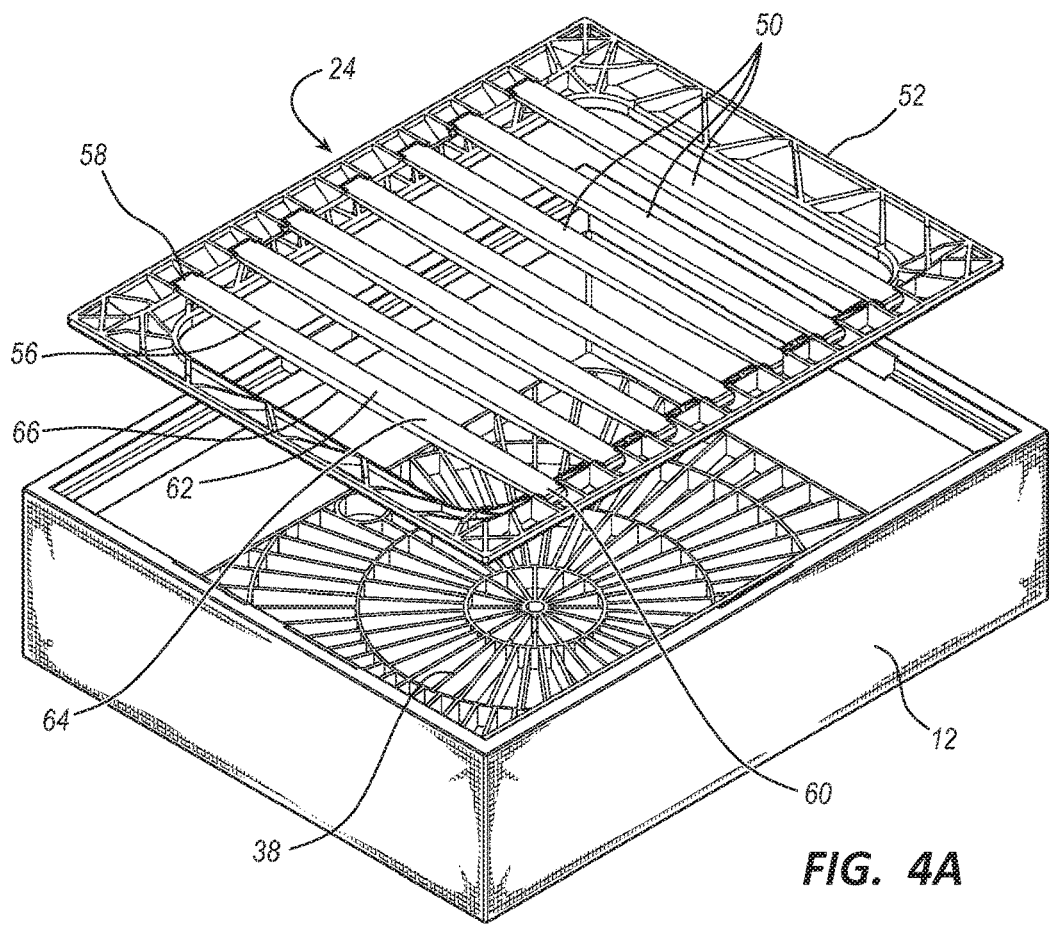
FIG. 4A illustrates a partially exploded view of an embodiment of a furniture spring system disposed over a furniture base, according to the present disclosure.
Figure 5A:
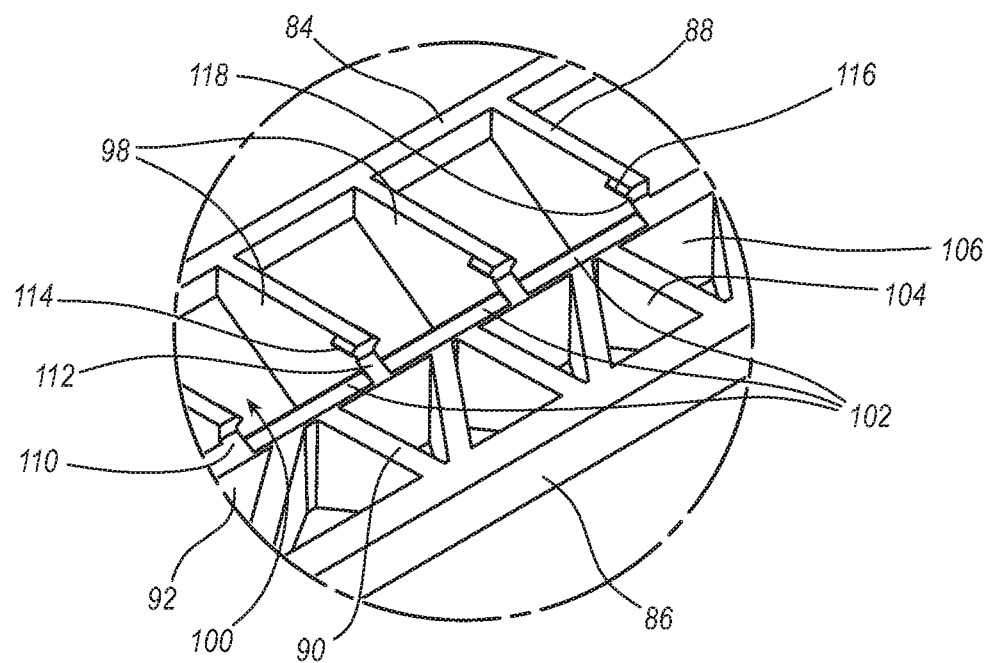
FIG. 5A illustrates a close-up view of a portion of the spring system illustrated in FIG. 3, as indicated in FIG. 3, according to the present invention.

As illustrated in FIGS. 4A and 5A, the upper support 88 includes a plurality of walls or webs 98, with adjacent walls or webs 98, optionally in combination with the intermediate support 92, forming securing compartments 100 that accommodate or receive a portion of the slat 50. A portion of the intermediate support 92 between the adjacent webs 98 form a securing edge 102 to which the slat 50 connects. The securing edge 102 may extend the length of the opposing sides of the frame 52. In some embodiments, the securing edge 102 may extend the length of all edges of the frame 52. The securing edge 102 may be defined into the series of securing compartments 100 which may maintain the slat 50 in a particular position within the spring system 24. Stated another way, the intermediate support 92 is partitioned into the securing edges 102, and associated securing compartments 100, by the walls or webs 98 extending or running perpendicular or transverse to the exterior support 84 and/or the intermediate support 92. In some embodiments, the walls or webs 98 may be equally spaced in order to maintain even distribution of the slats 50 within the spring system 24. In other embodiments, the walls or webs 98 may be distributed perpendicular to the securing edge 102 at varying distances to achieve a desired spring system 24 effect.

Transition support 90 also includes a plurality of webs 104 with spaces 106. An upper surface of the webs 98 lie in the same plane, while upper surfaces of the webs 102 lie in another plane transverse to the upper support 88. It is understood, however, that the upper surfaces of the webs 98 need not lie in the same plane and the upper surfaces of the webs 102 need not lie in the same plane and that plane need not be transverse to the plane associated with the upper support 88.

As illustrated in FIG. 5A, a step 110 is formed between transition support 90 and upper support 80 at a terminal end 112 of the upper support 88. Formed on the webs 98 are flanges 114 that extend towards the exterior support 84 and are configured to slidably cooperate with the slat 50 disposed within the securing compartment 100, as will be described in more detail hereinafter. Flange 114, in the illustrated configuration, includes an upper flange portion 116 and a lower flange portion 118. The combination of the flange 114 on each side of the web 98 forms a generally polygonal form when viewing terminal end 112 from within a space 120 (FIG. 3A) formed by the interior support 86. It will be understood that the combination of the flange 114 on each side of the web 98 can form non-polygonal or combinations of polygonal and non-polygonal shapes.

Figure 4B:
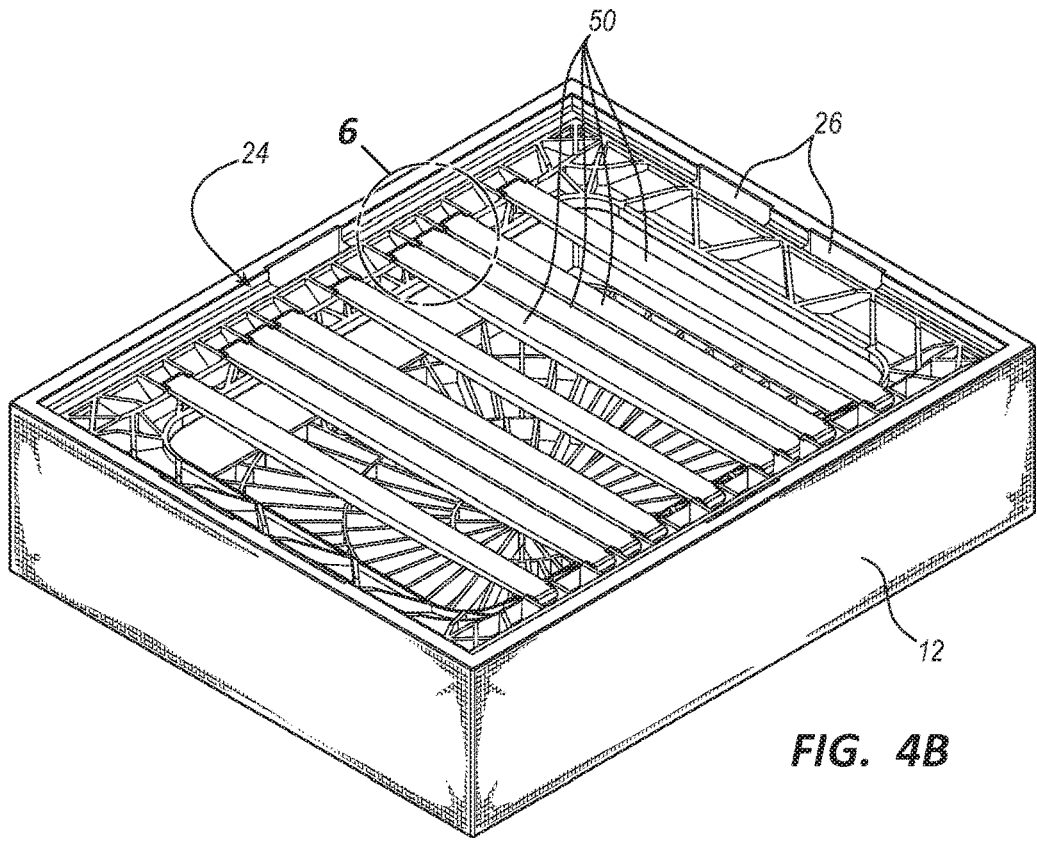
FIG. 4B illustrates an assembled view of the furniture spring system of FIG. 4A.
Figure 4C:
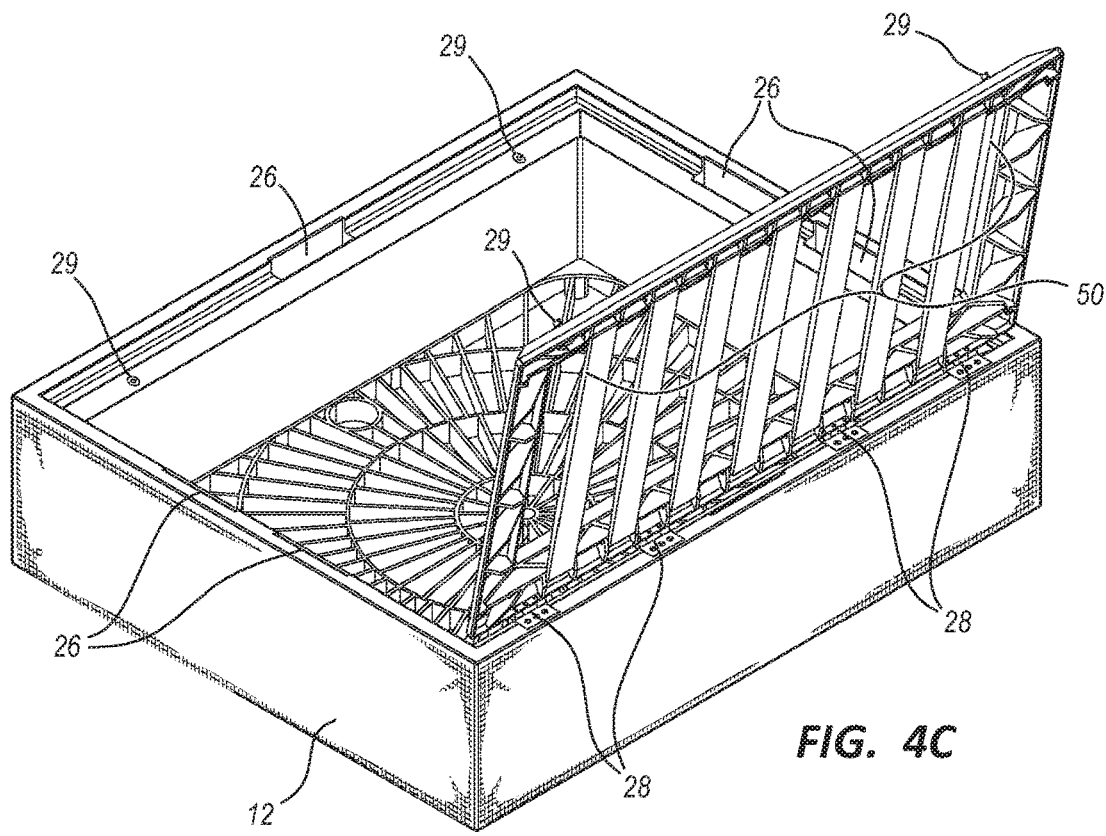
FIG. 4C illustrates a view of an embodiment of a furniture spring system disposed over a furniture base in an open position, according to the present disclosure.
Figure 4D:
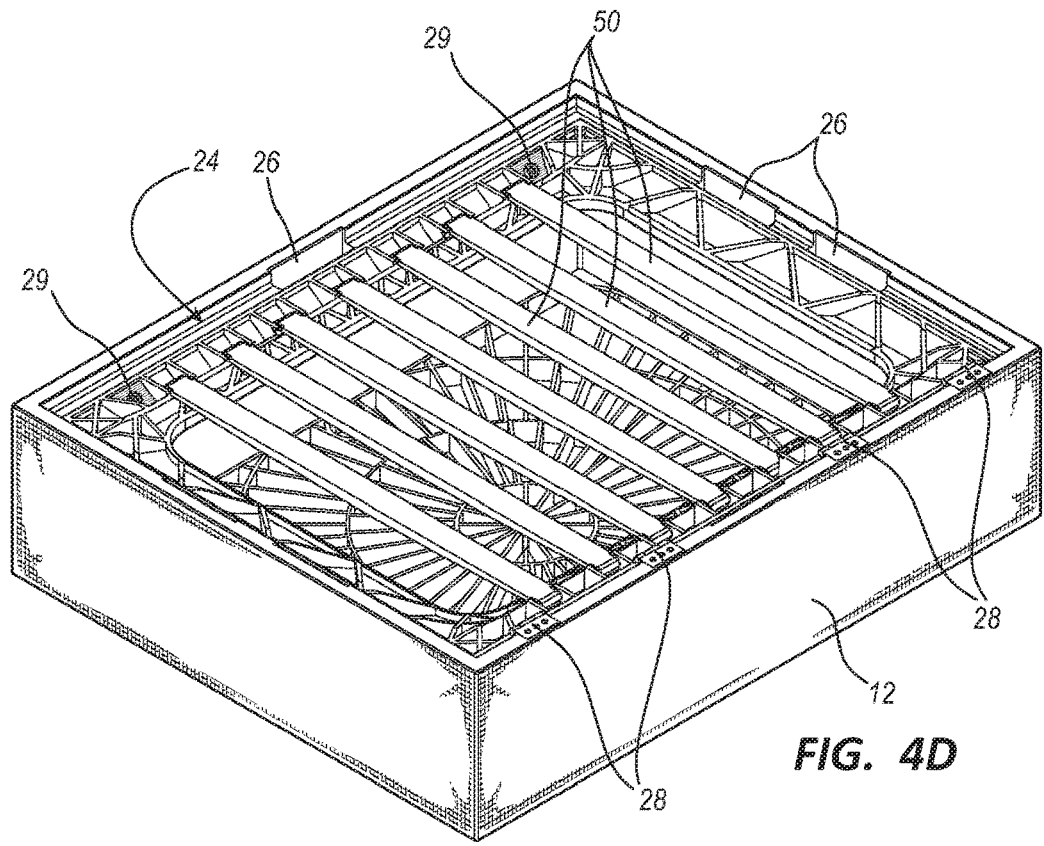
FIG. 4D illustrates a view of the furniture spring system of FIG. 4C in a closed position.

As illustrated in FIGS. 2A-3A and 4A-4B, the spring system 24 includes the slats 50 spanning the frame 52. Each slat 50 is elongate having an elongate body 56 with a first end 58 and a second end 60 that attach the slats 50 to the frame 52. The slats 50 can have a flexible middle portion 62 extending between the first end 58 and the second end 60. The slats 50 can have an arcuate profile spanning the length of the elongate body 56 of the slat 50. In some embodiments, an upper surface 64 of the slat 50 may be substantially flat or planer, while a lower surface 66 of the slat 50 has an arcuate profile. The upper surface 64 of the slat 50 is a side of slat 50 which can come into direct contact with the cushion 16 (FIG. 1) when the slat 50 is assembled on the frame 52. The illustrated spring system 24 can also optionally include fabric or other material spanning the frame 52 over or around the slats 50 or can optionally include a wooden board or metal board or other material spanning the frame 52. Additionally, the spring system 24 optionally includes material or components configured to support the cushion 16 (FIG. 1) placed thereon including the weight of persons or objects placed on top of the cushion 16 (FIG. 1) during use. The slats 50 of the illustrated spring system 24 can be selectively removed from the frame 52 and reconfigured in different patterns as desired by a user. For example, the slats 50 in FIG. 4A are arranged in a first pattern, while the slats in FIG. 4B are arranged in a second pattern where additional slats 50 have been added. A user may remove or add slats 50 to increase or decrease the level of support or firmness provide by the spring system 24.

Figure 5B:
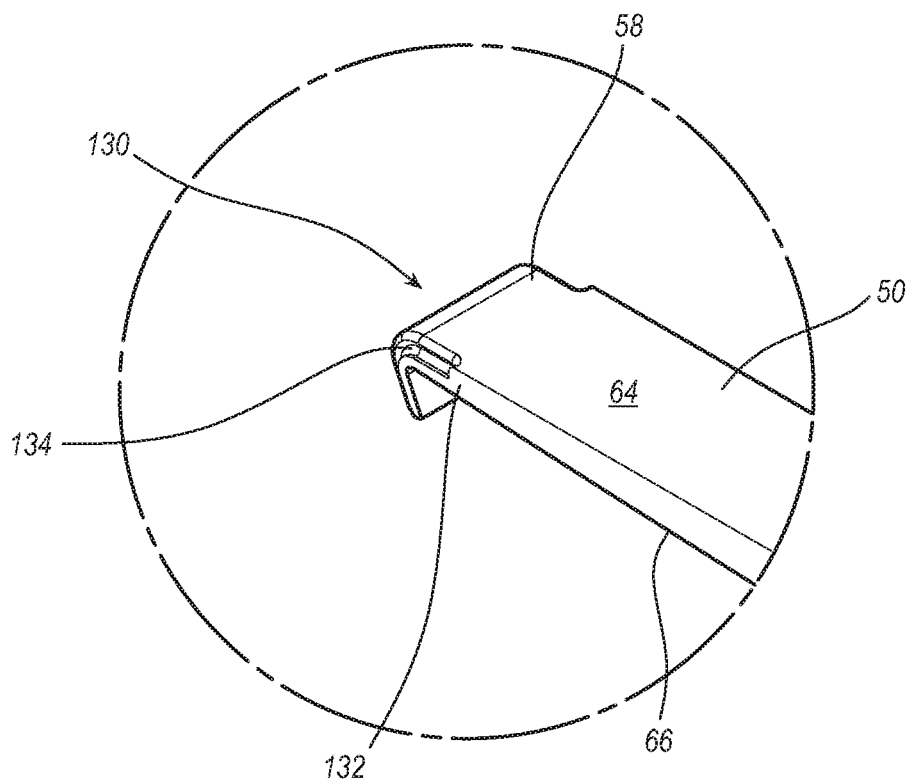
FIG. 5B illustrates a close-up view of a portion of the spring system illustrated in FIG. 3, as indicated in FIG. 3, according to the present invention.
Figure 6:
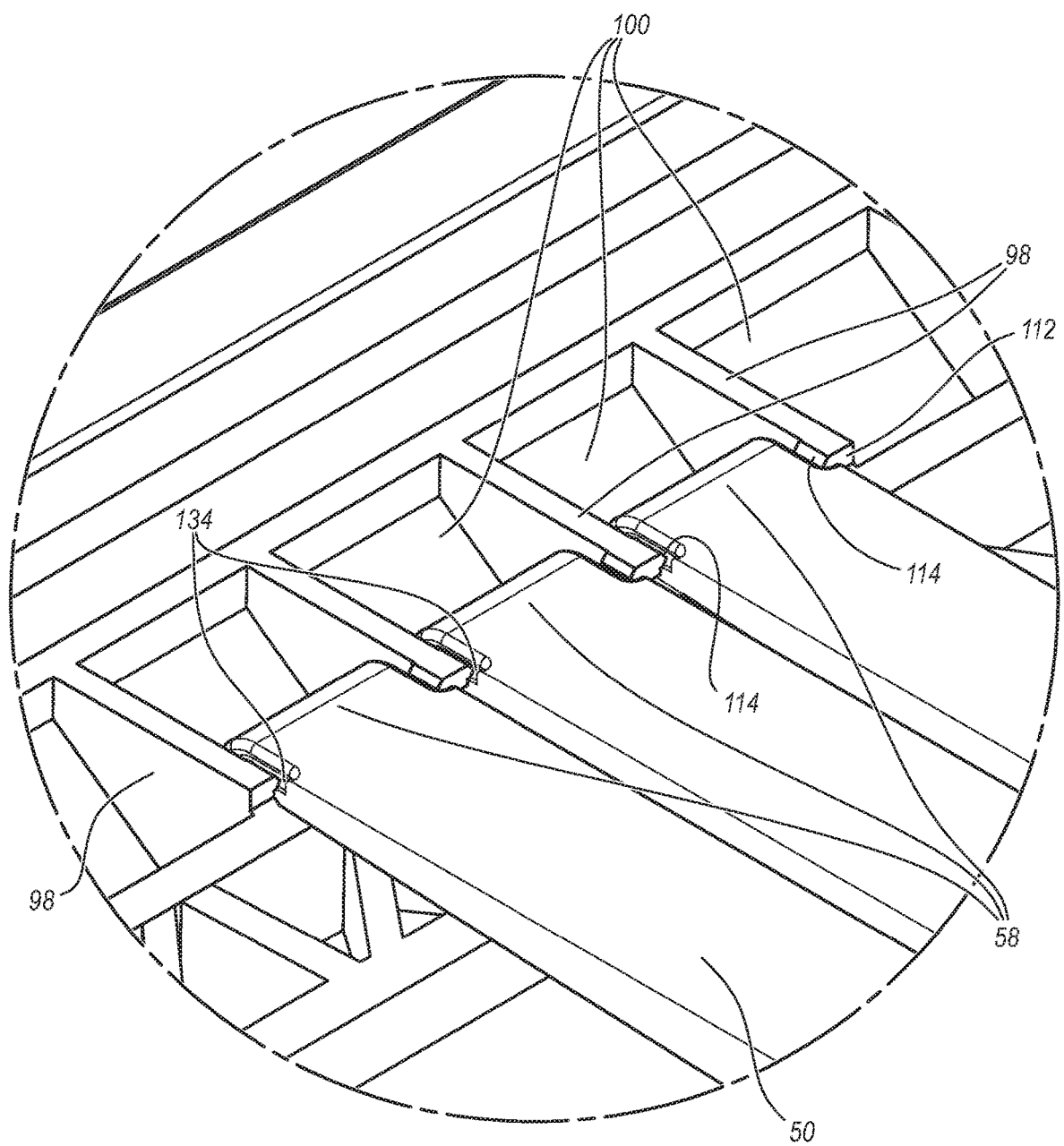
FIG. 6 illustrates a close-up view of a portion of the spring system illustrated n FIG. 4B, as indicated in FIG. 4B, according to the present disclosure.

FIG. 5B illustrates a close-up view of a portion of the spring system 24 illustrated in FIG. 3A. FIG. 5B provides a close-up view of the first end 58 of the slat 50 of the spring system 24. As illustrated in FIGS. 5B and 6, the first end 58 may have a catch 130, such as a hooked end, which can provide for attachment of the slat 50 to the securing edge 102 of the frame 52. In some embodiments, a side 132 of the catch 130 can be a planar surface so that it can fit flush against the walls or webs 98 of the securing compartments 100. In another embodiment, the side 132 of the catch 130 may be rounded. In some embodiments, such as the embodiment shown in FIG. 5B, the catch 130 includes a retention groove 134 configured to prevent the catch 130 from disengaging the securing edge 102. The retention groove 134 is complementary to the flange 114. The interface of the retention groove 134 and the flange can provide a track for the catch 130 of the slat 50 to move along when the spring system 24 is triggered, i.e., when a user sits on the cushion 16 (FIG. 1). The retention grooves 134 prevents the slats 50 from becoming unhinged or moving out of the desired movement path during use. The retention groove 134, either alone or in combination with the flange 114, is an example of a retention member or a means for retaining the slat in contact with the frame. Other structures of the retention member are possible, such as, but not limited to, other concave shapes, convex shape, projecting rims, collars that fits within a grooves, locking structures, such as pins, screws, plates, or the like, combinations therefore or other structures to control or limit movement of a slat relative to the frame. While the retention grooves 134 maintain engagement between the slats 50 and the frame 52, because the slats 50 can be disengaged from the flanges 114, such as when the slats 50 loose structure integrity, such that flexion is reduced, the slats 50 can be individually replaced. This allows a user to repair and/or replace individual slats and reduces the need to replace the furniture as a whole.

When the spring system 24 is unloaded, the slats 50 may maintain a flat position and sit in an even plane with the frame 52. When the slats 50 are in a flat, unloaded position, the catch 130 may extend beyond the securing edge 102 such that the catch 130 may not come into contact with the securing edge 102. When the spring system 24 is loaded or weighted, however, the slats 50 may bend or flex, positioning the center of the slat 52 below that of the frame 52. When loading occurs and the slats 50 are flexed, the flexion of the slats 50 causes the distance between the first end 58 and the second end 60 of the slats 50 to shorten, thereby causing the catch 130 to tension on the securing edge 102 of the frame 52. The flanges 114 engage with the retention grooves 134 allowing the flanges 114, and more generally the catch 130, to slide within the track defined by the flanges 114 and the walls or webs 98 of the securing compartments 100.

The slats 50 can be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50 can be from a polymer, wood, metal, alloys, composites, fiberglass, carbon fiber, and combinations thereof, or the like.

The slats 50 can flex in a bow-shape when loaded and return to an initial flat or elongate shape when unloaded. In some embodiments, the slats 50 can include a graduating thickness, where the middle portion 62 of the slat 50 is the thickest portion of the slat 50. The upper surface 64 of the slat 50 where the cushion 16 can be placed can maintain a continuous, flat surface, while the lower surface 66, or underside or bottom side, of the slat 50 can exhibit a curved shape to allow for greater thickness in the middle portion 62. The greater thickness in the middle portion 62 of the slats 50 may increase structural integrity of the slats 50 and prevent or slow wear by users of the furniture system over time. Varying a thickness of the middle portion 62, and/or portions of the slats 50 near the first end 58 and second end 68, can vary the biasing force; areas of the slats 50 with greater thickness being more resistant to bending and so the biasing force is greater than a situation where areas of the slats 50 are thinner. Additionally, varying a composition of the material forming the frame 52, including the slat 50, can also vary the biasing force.

Generally, the slats 50 can have a length ranging from about 10.0" (10 inches) to about 80.0" (80 inches), from about 12.0" to about 78", and from about 14" to about 75". A thickness in the middle portion 62 can range from about 0.060" to 2.0", from about 0.080" to 1.0", or from about 0.10" to 0.9". A thickness at one or both of the first end 58 and second end 68, closer to the middle portion than the catch 130, can range from about 10% of the max thickness of the middle portion 62 of the slats 50, to about 70%, from about 20% to about 65%, or from about 30% to about 60%. The slats 50 can have varying thicknesses along the length of the slats 50. The varying thickness along the length can provide reinforced support in certain locations along the slat, while providing for a greater range of flexibility at other locations along the length of the slats 50 as discussed herein.

In some embodiments where the slats 50 are made of metal, the thickness of the slats 50 can be substantially less than the thicknesses recited above. For example, thickness of the middle portion 62 of a slat 50 made of metal can range from about 0.00003" to about 0.25", from about 0.0003" to about 0.20", or from about 0.003" to about 0.15".

Generally, the slats 50 have a general uniform width along their width, as illustrated in FIG. 4A. However, the slats 50 can have non-uniform widths with a portion near the first end 58 and second end 60 being narrower than at the middle portion 62. Alternatively, a portion near the first end 58 and second end 60 can be wider than at the middle portion 62. By varying the widths, different flexion and biasing forces can be generated by the slats 50.

Figure 7:
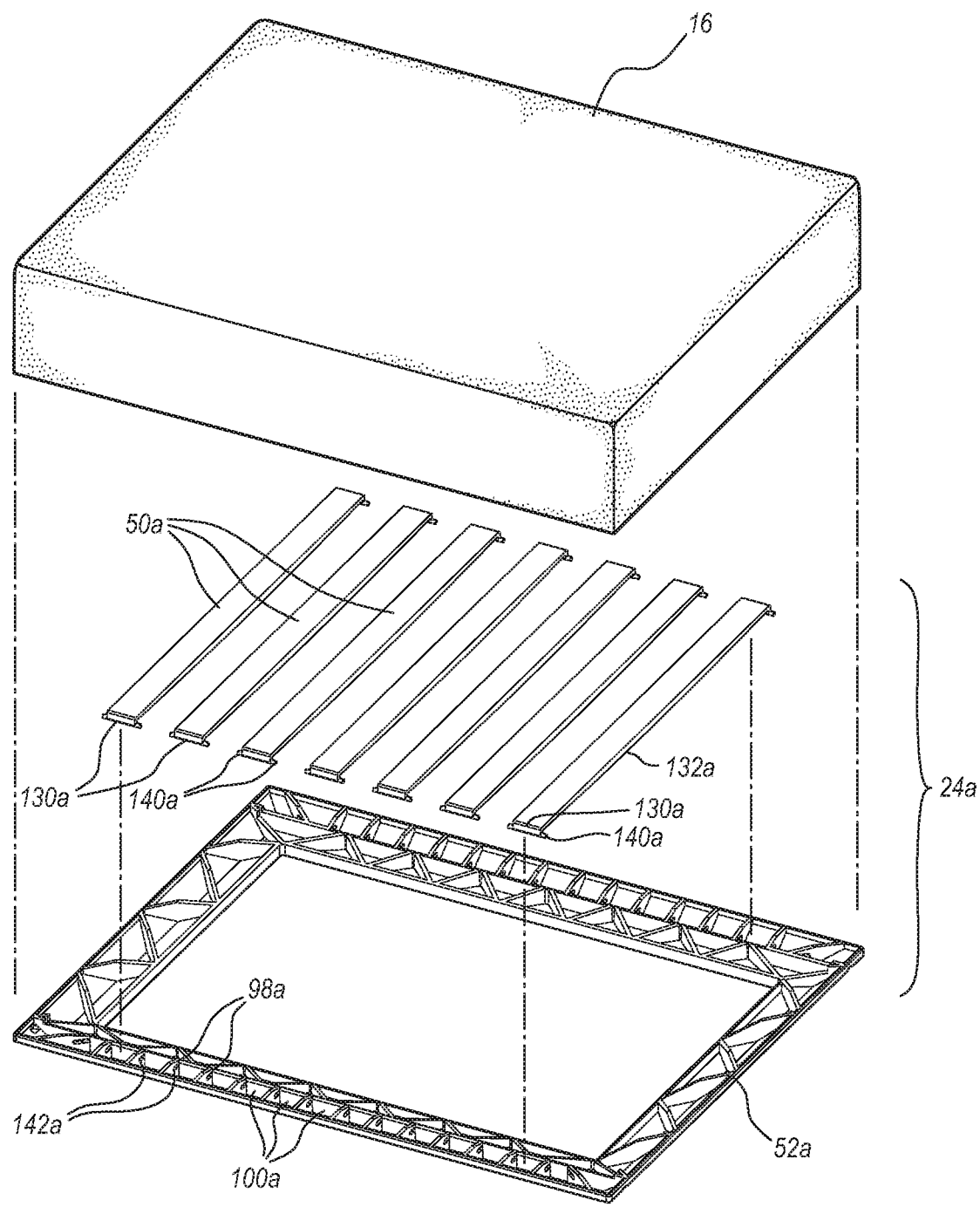
FIG. 7 illustrates an exploded view of another embodiment of a spring system including a furniture cushion, according to the present disclosure.
Figure 8A:
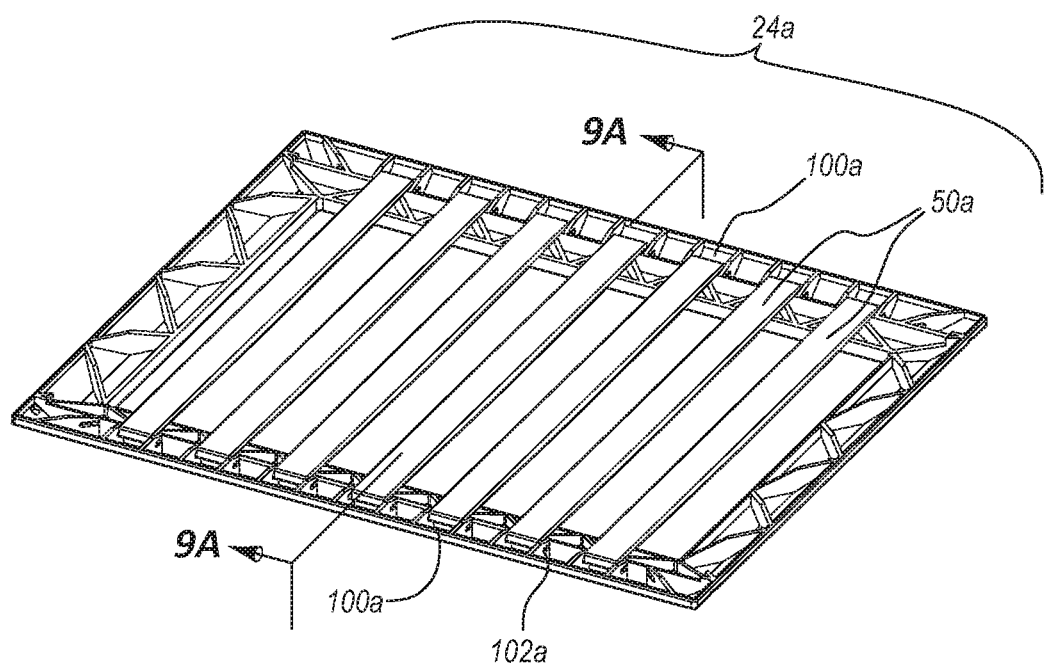
FIG. 8A illustrates a perspective view of an embodiment of a spring system, according to the present disclosure.
Figure 8B:
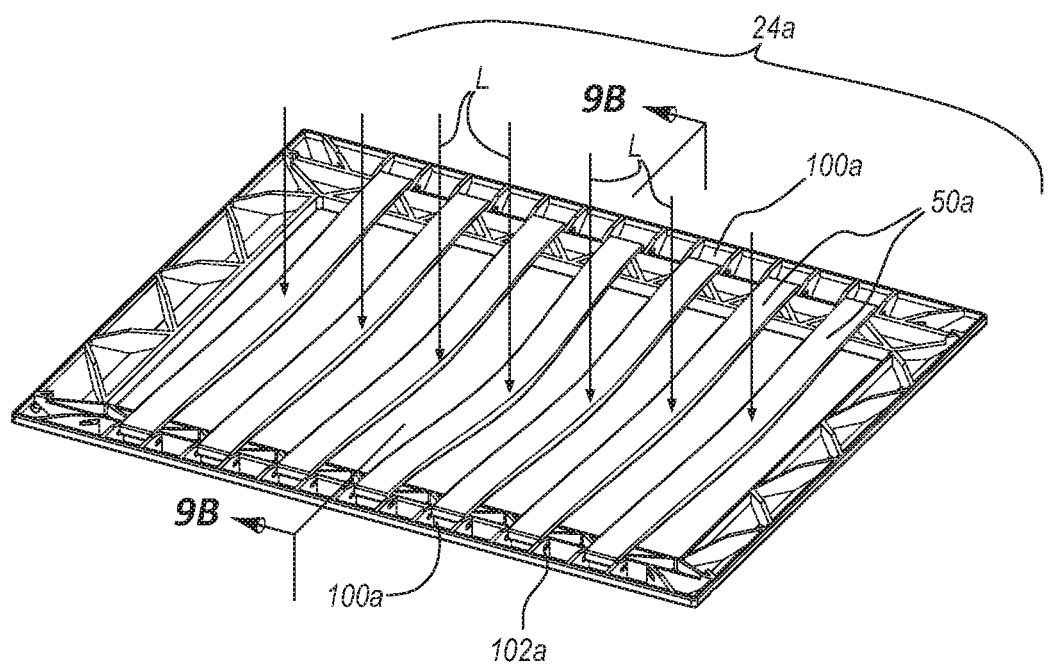
FIG. 8B illustrates a perspective view of the spring system illustrated in FIG. 8A with a load applied downwardly on the spring system.
Figure 9A:
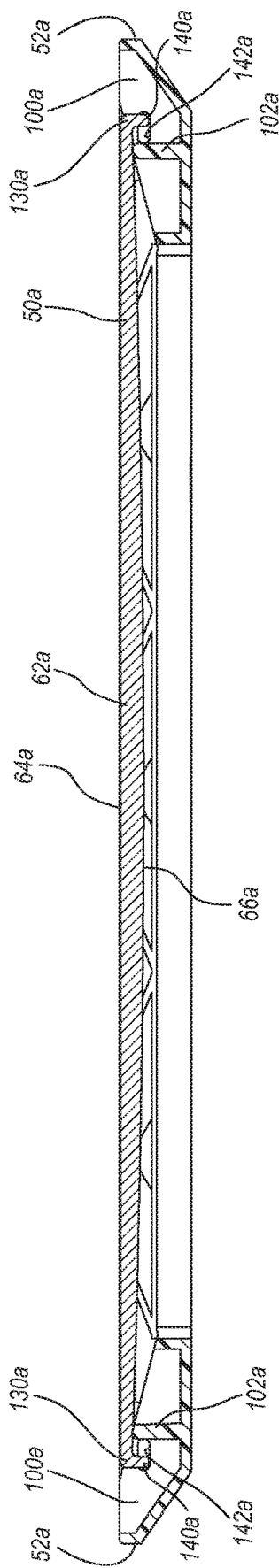
FIG. 9A illustrates a cross-sectional view of the spring system illustrated in FIG. 8A along plane 9A-9A indicated in FIG. 8A.
Figure 9B:
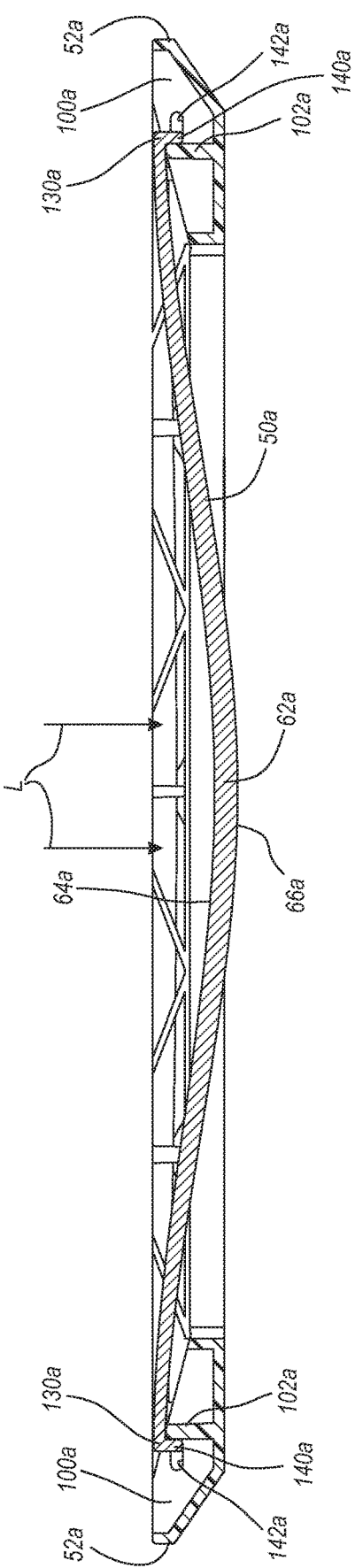
FIG. 9B illustrates a cross-sectional view of the spring system illustrated in FIG. 8B along plane 9B-9B indicated in FIG. 8B.

FIGS. 7-9 illustrate views of another embodiment of a spring system 24a according to the present invention. This discussion and disclosure associated with spring system 24 is also applicable to the spring system 24a, and vice versa. Like structures are identified by like reference numerals.

As illustrated, the spring system 24a cooperates with a furniture cushion 16. The furniture cushion 16 can sit on top of the lid 22 of the spring system 24a including a frame 52a and a plurality of slats 50a. The slats 50a can have a catch 130a at either one or both ends of the slats 50a. The catch 130a includes retention protrusions 140a that extends outwardly from the sides 132a. The retention protrusions 140a are secured within the walls or webs 98a of the securing compartments 100a, and more particularly within slots 142a, when the catch 130a is positioned within the securing compartment 100a. While the retention protrusions 140a maintain engagement between the slats 50a and the frame 52a, because the slats 50a can be disengaged from the frame 52a, such as when the slats 50 lose structural integrity, such that flexion is reduced, the slats 50a can be individually replaced. This allows a user to repair and/or replace individual slats and reduces the need to replace the furniture as a whole. The retention protrusions 140a, either alone or in combination with the slots 142a, is another example of a retention member or a means for retaining the slat in contact with the frame.

When the spring system 24a is unloaded, as illustrated in FIGS. 8A and 9A, the slats 50a may maintain a flat position and sit in an even plane with the frame 52a. When the slats 50a are in a flat, unloaded position, the catch 130a may extend beyond the securing edge 102a such that the catch 130a may not come into contact with the securing edge 102a. When the spring system 24a is loaded or weighted by a force or load L, however, the slats 50a can bend or flex, positioning the center of the slat 52a below that of the frame 52a. When loading occurs and the slats 50a are flexed, the flexion of the slats 50a causes the distance between the ends of the slats 50a to shorten, thereby causing the retention protrusions 140a to move or track within the slots 142a of the frame 52a.

The slats 50a can be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50a can be from a polymer, wood, metal, alloys, composites, fiberglass, carbon fiber, and combinations thereof, or the like.

The slats 50a can flex in a bow-shape when loaded and return to an initial flat or elongate shape when unloaded. In some embodiments, the slats can include a graduating thickness, where the middle portion 62a of the slat 50a is the thickest portion of the slat 50a. The upper surface 64a of the slat 50a where the cushion 16 (FIG. 1) can be placed can maintain a continuous, flat surface, while the lower surface 66a, or underside or bottom side, of the slat 50a can exhibit a curved shape to allow for greater thickness in the middle portion 62a. The greater thickness in the middle portion 62a of the slats 50a can increase structural integrity of the slats 50a and prevent or slow wear by users of the furniture system over time. Varying a thickness of the middle portion 62a, and/or portions of the slats 50a near the first end 58a and second end 68a, can vary the biasing force; areas of the slats 50a with greater thickness being more resistant to bending and so the biasing force is greater than a situation where areas of the slats 50a are thinner. Additionally, varying a composition of the material forming the frame 52a, including the slat 50a, can also vary the biasing force.

Generally, the slats 50a can have a length ranging from about 10.0" to about 80.0", from about 12.0" to about 78", and from about 14" to about 75". A thickness in the middle portion 62a can range from about 0.060" to 2.0", from about 0.080" to 1.0", or from about 0.10" to 0.9". A thickness at one or both of the first end 58a and second end 68a, closer to the middle portion than the catch 130a, can range from about 10% of the max thickness of the middle portion 62a of the slats 50a, to about 70%, from about 20% to about 65%, or from about 30% to about 60%. The slats 50a can have varying thicknesses along the length of the slats 50a. The varying thickness along the length may provide reinforced support in certain locations along the slat, while providing for a greater range of flexibility at other locations along the length of the slats 50a as discussed herein.

In some embodiments where the slats 50a are made of metal, the thickness of the slats 50a can be substantially less than the thicknesses recited above. For example, thickness of the middle portion 62a of a slats 50a made of metal can range from about 0.00003" to about 0.25", from about 0.0003" to about 0.20", or from about 0.003" to about 0.15".

Generally, the slats 50a have a general uniform width along their width, as illustrated in FIG. 7. However, the slats 50a can have non-uniform widths with a portion near the first end 58a and second end 60a being narrower than at the middle portion 62a. Alternatively, a portion near the first end 58a and second end 60a can be wider than at the middle portion 62a. By varying the widths, different flexion and biasing forces can be generated by the slats 50a.

FIGS. 10-12B illustrate another embodiment of a spring system 24b according to the present invention. This discussion and disclosure associated with the spring systems 24 and 24a are also applicable to the spring system 24b, and vice versa. Like structures are identified by like reference numerals.

FIGS. 10-12B illustrate a spring system 24b including a furniture cushion 16. When assembled, the furniture cushion 16 can sit on top of the lid 22b, which can include a frame 52b and a plurality of slats 50b. The first end 58b and second end 60b of the slats 50b can have elongate openings 144b through which a retention pin 146b is inserted to attach the slats 50b to the frame 52b. The retention pin 146b can be formed with the frame 52b, such that the retention pin 146b and frame 52b is a monolithic, one-piece structure. Alternatively, the retention pin 146b can be attached to the frame 52, such as through a threaded engagement, friction fit engagement, interference fit, an adhesive bonding or coupling, combinations thereof, or other attachments mechanisms. The retention pin 146b, either alone or in combination with the elongate openings 144b, is another example of a retention member or a means for retaining the slat in contact with the frame.

The first end 58b and the second end 60b of the slats 50b includes a catch 130b that is formed at right angles to a middle portion 62b, although other angles less or greater than 90 degrees are possible. The first end 58b and the second end 60b can extend towards the outside of the frame 52b beyond a securing edge 102b when the slats 50b are unloaded or unweighted. The frame 52b can include securing compartments 100b defined by walls or web 98b. The securing compartments 100b may be of equal size and/or equal spacing. In other embodiments, the securing compartments 100b can vary in size to accommodate different size slats and/or different slat patterns or configurations. While the retention pin 146b maintains engagement between the slats 50b and the frame 52b, because the slats 50b can be disengaged from the frame 52d, such as when the slats 50d loose structure integrity, such that flexion is reduced, the slats 50d can be individually replaced. This allows a user to repair and/or replace individual slats and reduces the need to replace the furniture as a whole.

Figure 11A:
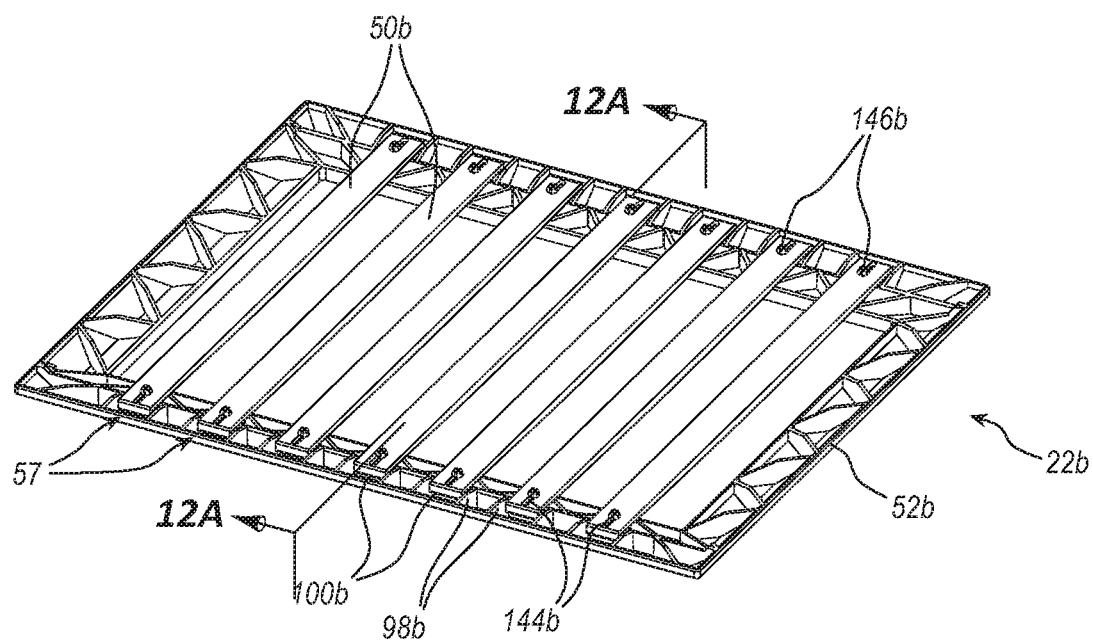
FIG. 11A illustrates a perspective view of an embodiment of a spring system, according to the present disclosure.
Figure 11B:
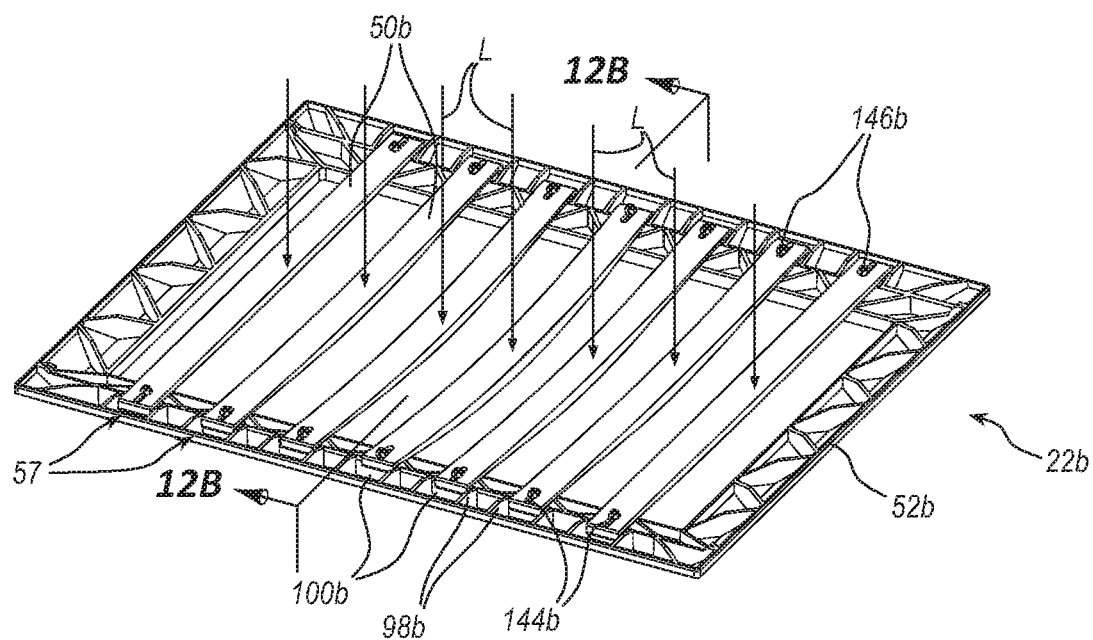
FIG. 11B illustrates a perspective view of the spring system illustrated in FIG. 11A with a load applied downwardly on the spring system.
Figure 12A:
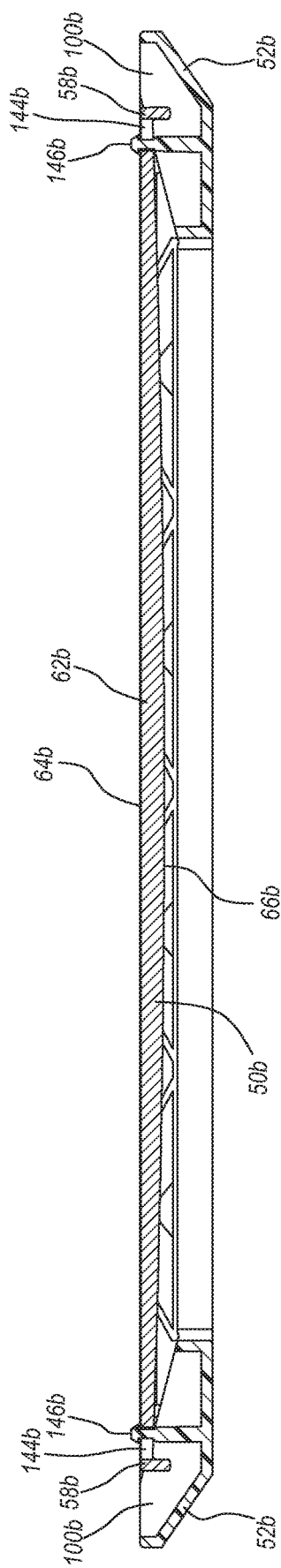
FIG. 12A illustrates a cross-sectional view of the spring system illustrated in FIG. 11A along plane 12A-12A indicated in FIG. 11A.
Figure 12B:
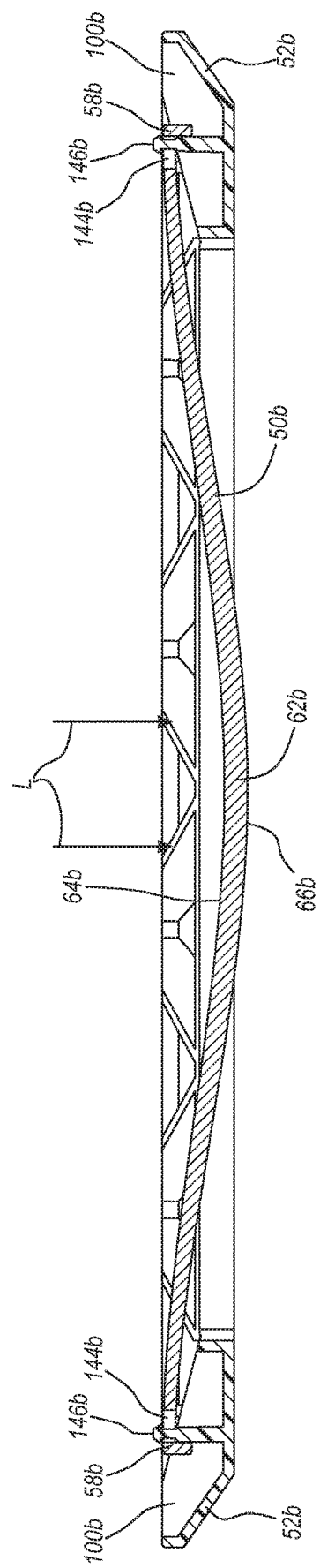
FIG. 12B illustrates a cross-sectional view of the spring system illustrated in FIG. 11B along plane 12B-12B indicated in FIG. 11B.

Loading on the spring system 24b with a force or load L, as illustrated in FIGS. 11B and 12B, causes the slats 50b to flex in a downward motion so that the middle portion 62b of the slats 50b is below the frame 52b. When the slats 50b are loaded and flexed, the elongate openings 144b allow the slats 50*b*, which have been secured by retention pin 146*b* inserted through the elongate openings 144*b*, to slide against the frame 52*b* and flex without becoming unhinged from the frame 52*b* as the catches 130*b* are tensions against the securing edges 102*b*. The first end 58*b* and the second end 60*b* of the slats 50*b* can catch on the securing edge 102*b* to limit flexion and support weight applied to the spring system 50*b*. The first end 58*b* and the second end 60*b* of the slats 50*b* can be flush with the securing edge 102*b* when the slats 50*b* are flexed. When the slats 50*b* are unloaded or unweighted, as illustrated in FIGS. 11A and 12A, the first end 58*b* and the second end 60*b* of the slats 50*b* extend beyond the securing edge 102*b*. When unloaded or unweighted, the slats 50*b* are preferably level with the upper surface 64*b* of the frame 52*b*.

As with the other embodiments, the slats 50*b* can be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50*b* can be from a polymer, wood, metal, alloys, composites, fiberglass, carbon fiber, and combinations thereof, or the like.

The slats 50*b* can flex in a bow-shape when loaded and return to an initial flat or elongate shape when unloaded. In some embodiments, the slats can include a graduating thickness, where the middle portion 62*b* of the slat 50*b* is the thickest portion of the slat 50*b*. The upper surface 64*b* of the slat 50*b* where the cushion 16 (FIG. 1) can be placed can maintain a continuous, flat surface, while the lower surface 66*b*, or underside or bottom side, of the slat 50*b* can exhibit a curved shape to allow for greater thickness in the middle portion 62*b*. The greater thickness in the middle portion 62*b* of the slats 50*b* can increase structural integrity of the slats 50*b* and prevent or slow wear by users of the furniture system over time. Varying a thickness of the middle portion 62, and/or portions of the slats 50 near the first end 58 and second end 68, can vary the biasing force; areas of the slats 50 with greater thickness being more resistant to bending and so the biasing force is greater than a situation where areas of the slats 50 are thinner. Additionally, varying a composition of the material forming the frame 52, including the slat 50, can also vary the biasing force.

Generally, the slats 50*b* can have a length ranging from about 10.0" to about 80.0", from about 12.0" to about 78", and from about 14" to about 75". A thickness in the middle portion 62*b* can range from about 0.060" to 2.0", from about 0.080" to 1.0", or from about 0.10" to 0.9". A thickness at one or both of the first end 58*b* and second end 68*b*, closer to the middle portion than the catch 130*b*, can range from about 10% of the max thickness of the middle portion 62*b* of the slats 50*b*, to about 70%, from about 20% to about 65%, or from about 30% to about 60%. The slats 50*b* can have varying thicknesses along the length of the slats 50*b*. The varying thickness along the length may provide reinforced support in certain locations along the slat, while providing for a greater range of flexibility at other locations along the length of the slats 50*b* as discussed herein.

In some embodiments where the slats 50*b* are made of metal, the thickness of the slats 50*b* may be substantially less than the thicknesses recited above. For example, thickness of the middle portion 62*b* of a slats 50*b* made of metal can range from about 0.00003" to about 0.25", from about 0.0003" to about 0.20", or from about 0.003" to about 0.15".

Figure 10:
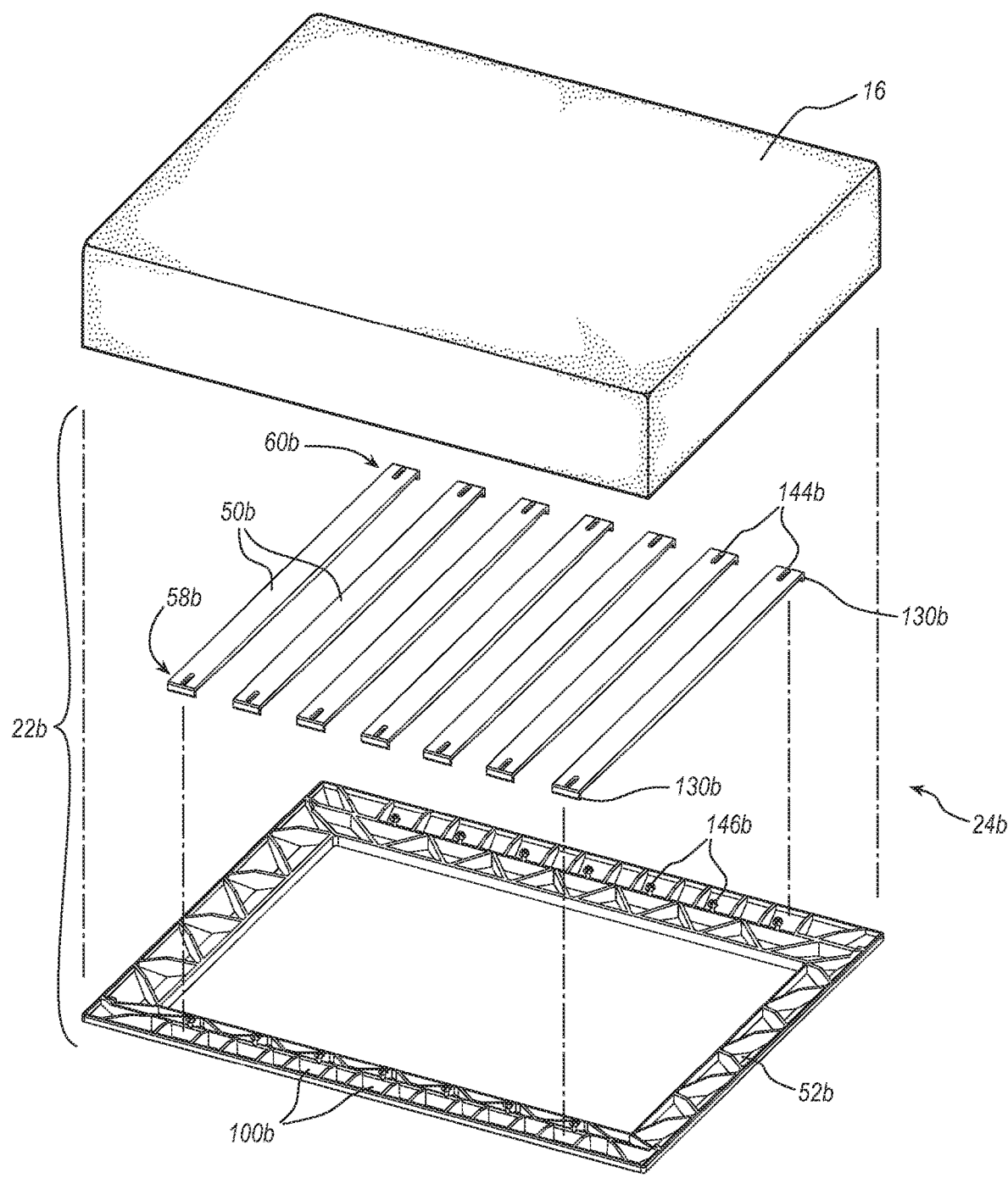
FIG. 10 illustrates an exploded view of another embodiment of a spring system including a furniture cushion, according to the present disclosure.

Generally, the slats 50*b* have a general uniform width along their width, as illustrated in FIG. 10. However, the slats 50*b* can have non-uniform widths with a portion near the first end 58*b* and second end 60*b* being narrower than at the middle portion 62*b*. Alternatively, a portion near the first end 58*b* and second end 60*b* can be wider than at the middle portion 62*b*. By varying the widths, different flexion and biasing forces can be generated by the slats 50*b*.

FIGS. 13-15B illustrate another embodiment of a spring system 24*c* according to the present invention. This discussion and disclosure associated with the spring systems 24, 24*a*, 24*b* are also applicable to the spring system 24*c*, and vice versa. Like structures are identified by like reference numerals.

FIG. 13-15B illustrate a spring system 24*c* including a furniture cushion 16. The spring system 26*c* may include a lid 22*c* comprising a frame 52*c*, a plurality of slats 50*c*, and one or more retention plates 150*c*. The slats 50*c* may be positioned on the frame 52*c* so that the first end 58*c* and second end 60*c* of the slats 50*c* are positioned in securing compartments 100*c* on the frame 52*c*. A retention plate 150*c* may be applied over the first end 58*c* and second end 60*c* of the slats 50*c* and secured onto the frame 52*c*, such as by fasteners, screws, pins, nuts and bolts, or other releasable fastener, so that the slats 50*c* are sandwiched between the frame 52*c* and the plate 150*c*. While the plates 150*c* maintain engagement between the slats 50*c* and the frame 52*c*, because the slats 50*c* can be disengaged from the frame 52*c* by removing the plates 150*c*, such as when the slats 50*c* lose structural integrity, such that flexion is reduced, the slats 50*c* can be individually replaced. This allows a user to repair and/or replace individual slats and reduces the need to replace the furniture as a whole. The retention plate 150*c*, either alone or in combination with fasteners, is another example of a retention member or a means for retaining the slat in contact with the frame.

Figure 14A:
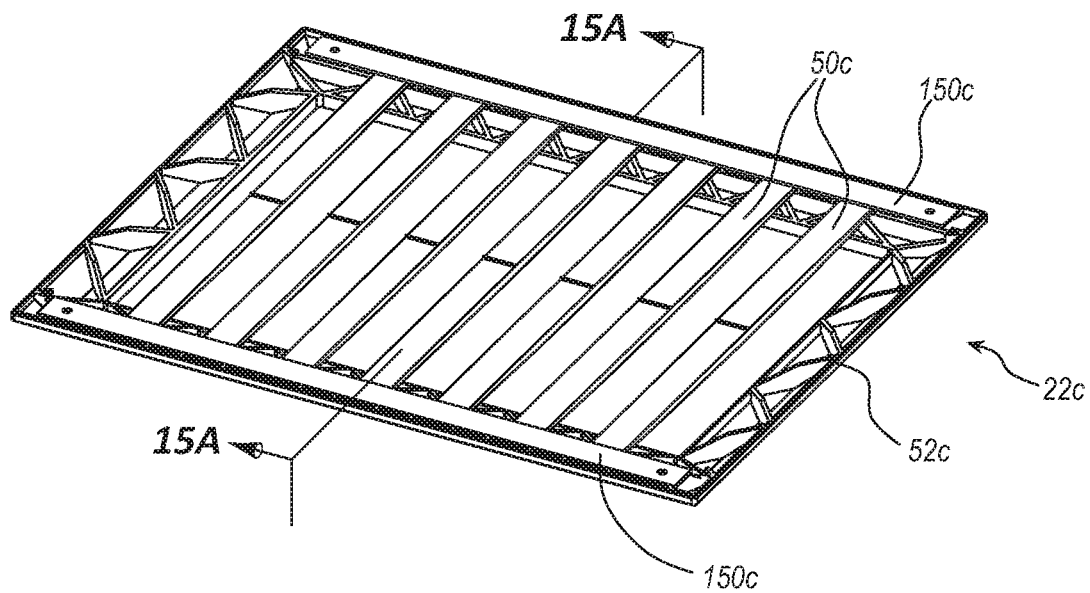
FIG. 14A illustrates a perspective view of an embodiment of a spring system, according to the present disclosure.
Figure 14B:
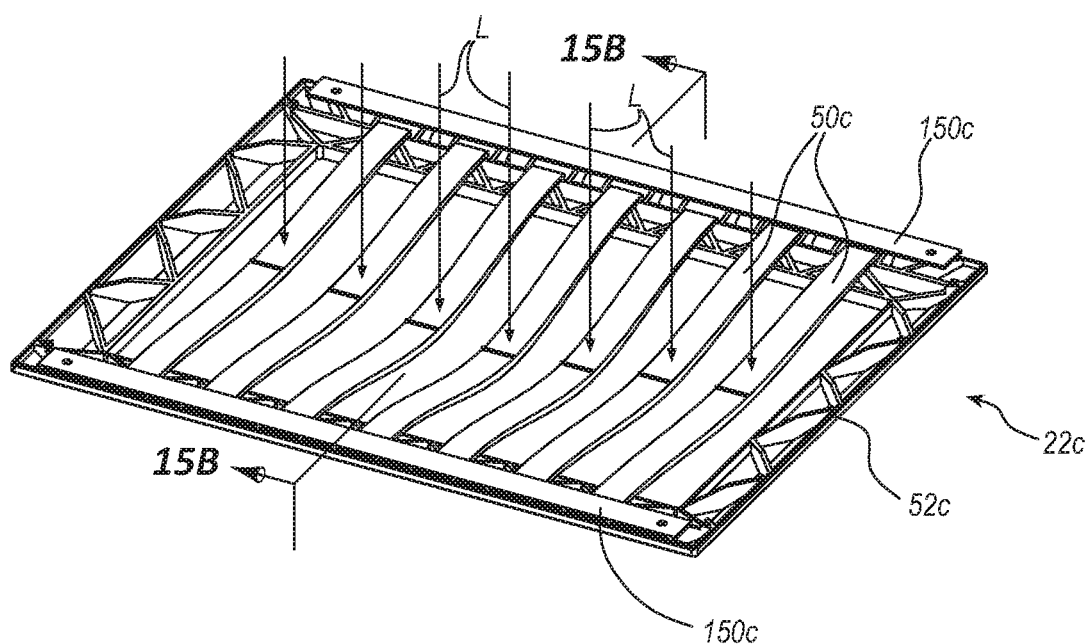
FIG. 14B illustrates a perspective view of the spring system illustrated in FIG. 14A with a load applied downwardly on the spring system.

When the spring system 24*c* is unweighted, as illustrated in FIGS. 14A and 15A, the upper surface 64*c* of the slats 50*c* sits level with the frame 52*c* and the first end 58*c* and second end 60*c* extend beyond the securing edge 102*c* into the securing compartment 100*c* on the frame 52*c*. The retention plate 150*c* may be secured over the top of the first end 58*c* and second end 60*c* of the slats 50*c*. When the spring system 24*c* is loaded or weighted with a force or load L, as illustrated in FIGS. 14B and 15B, the slats 50*c* will flex. The middle portion 62*c* of the slats 50*c* may flex below the height of the frame 52*c* and the first end 58*c* and second end 60*c* may tension against the securing edge 102*c*. The first end 58*c* and second end 60*c* of the slats 50*c* may be secured in place by the retention plates 150*c* in a configuration that allows the slats 50*c* to slide and flex without detaching from the frame 52*c*.

As with the other embodiments, the slats 50*c* may be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50*c* can be from a polymer, wood, metal, alloys, composites, fiberglass, carbon fiber, and combinations thereof, or the like.

The slats 50*c* may flex in a bow-shape when loaded and return to an initial flat or elongate shape when unloaded. In some embodiments, the slats may include a graduating thickness, where the middle portion 62*c* of the slat 50*c* is the thickest portion of the slat 50*c*. The upper surface 64*c* of the slat 50*c* where the cushion 16 (FIG. 1) may be placed may maintain a continuous, flat surface, while the lower surface 66*c*, or underside or bottom side, of the slat 50*c* may exhibit a curved shape to allow for greater thickness in the middle portion 62*c*. The greater thickness in the middle portion 62*c* of the slats 50c may increase structural integrity of the slats 50c and prevent or slow wear by users of the furniture system over time. Varying a thickness of the middle portion 62, and/or portions of the slats 50 near the first end 58 and second end 68, can vary the biasing force; areas of the slats 50 with greater thickness being more resistant to bending and so the biasing force is greater than a situation where areas of the slats 50 are thinner. Additionally, varying a composition of the material forming the frame 52, including the slat 50, can also vary the biasing force.

Generally, the slats 50c can have a length ranging from about 10.0" to about 80.0", from about 12.0" to about 78", and from about 14" to about 75". A thickness in the middle portion 62c can range from about 0.060" to 2.0", from about 0.080" to 1.0", or from about 0.10" to 0.9". A thickness at one or both of the first end 58c and second end 68c, closer to the middle portion than the catch 130c, can range from about 10% of the max thickness of the middle portion 62c of the slats 50c, to about 70%, from about 20% to about 65%, or from about 30% to about 60%. The slats 50c can have varying thicknesses along the length of the slats 50c. The varying thickness along the length may provide reinforced support in certain locations along the slat, while providing for a greater range of flexibility at other locations along the length of the slats 50c as discussed herein.

In some embodiments where the slats 50c are made of metal, the thickness of the slats 50c may be substantially less than the thicknesses recited above. For example, thickness of the middle portion 62c of a slats 50c made of metal can range from about 0.00003" to about 0.25", from about 0.0003" to about 0.20", or from about 0.003" to about 0.15".

Figure 13:
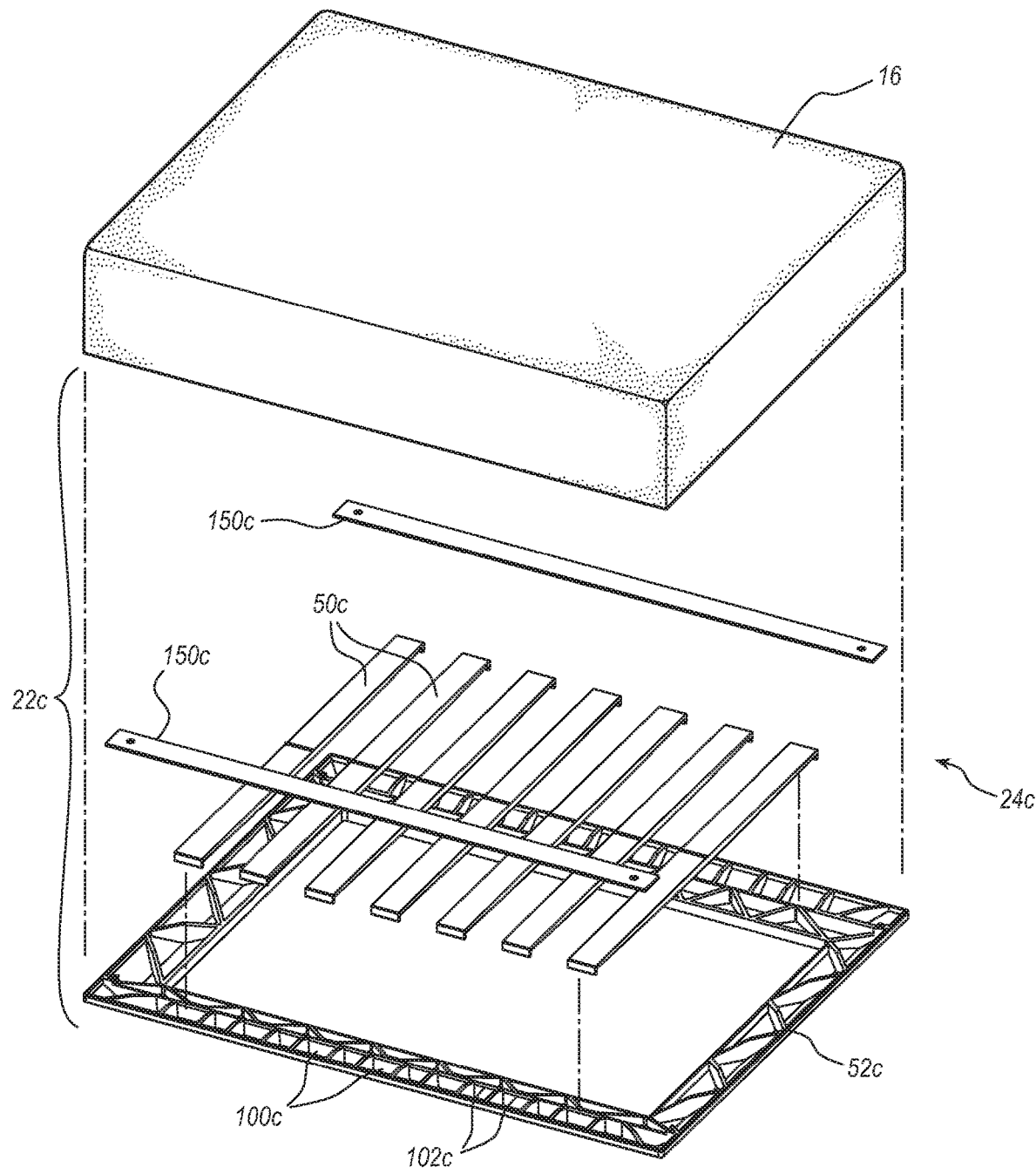
FIG. 13 illustrates an exploded view of another embodiment of a spring system including a furniture cushion, according to the present disclosure.

Generally, the slats 50 have a general uniform width along their width, as illustrated in FIG. 13. However, the slats 50c can have non-uniform widths with a portion near the first end 58c and second end 60c being narrower than at the middle portion 62c. Alternatively, a portion near the first end 58c and second end 60c can be wider than at the middle portion 62c. By varying the widths, different flexion and biasing forces can be generated by the slats 50c.

FIGS. 16-18B illustrate another embodiment of a spring system 24d according to the present invention. This discussion and disclosure associated with the spring systems 24, 24a, 24b, 24c are also applicable to the spring system 24d, and vice versa. Like structures are identified by like reference numerals.

FIGS. 16-18B illustrate another embodiment of a spring system 24d including a furniture cushion 16. The spring system 24d may include a lid 22d having a frame 52d and a plurality of slats 50d. The first end 58d and second end 60d of the slats 50d may have elongate openings 152d through which retention fasteners 154d may be inserted and secured into retention bores 156d on the frame 52d. The retention bores 156d may be raised, or project or extend upward from the frame 52d. The retention fasteners 154d may comprise screws, pins, or the like. While the retention fasteners 154d maintain engagement between the slats 50d and the frame 52d, because the slats 50 can be disengaged from the frame 52d, such as when the slats 50d loose structure integrity, such that flexion is reduced, the slats 50d can be individually replaced. This allows a user to repair and/or replace individual slats and reduces the need to replace the furniture as a whole. The retention fasteners 154d, either alone or in combination with retentions bores 156d and the elongate openings 152d, is another example of a retention member or a means for retaining the slat in contact with the frame.

Figure 17A:
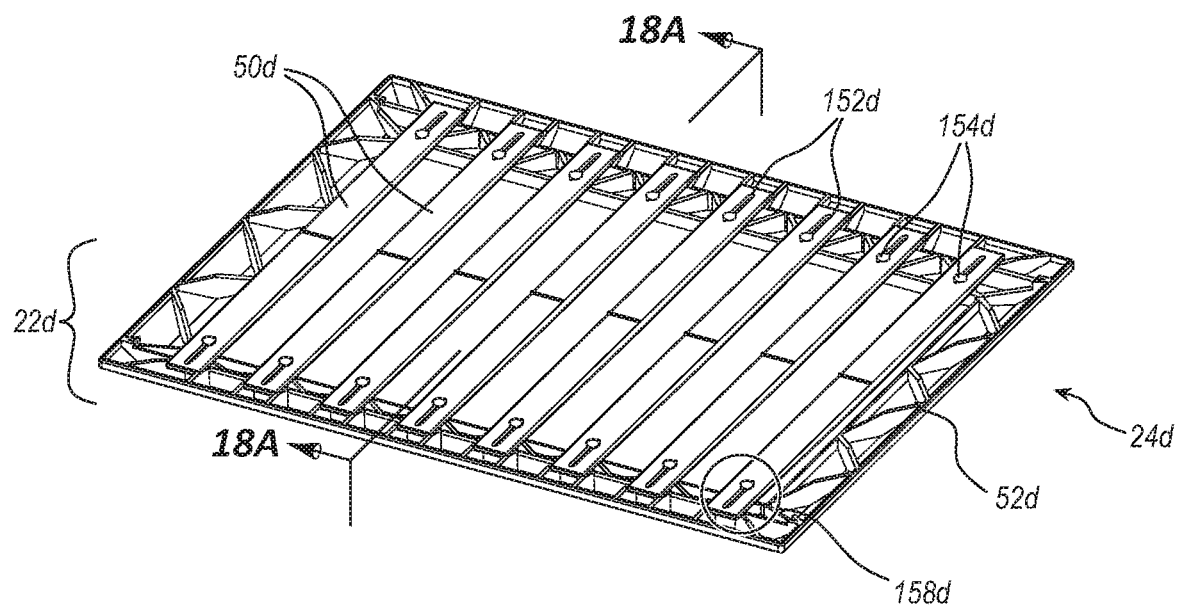
FIG. 17A illustrates a perspective view of an embodiment of a spring system, according to the present disclosure.
Figure 17B:
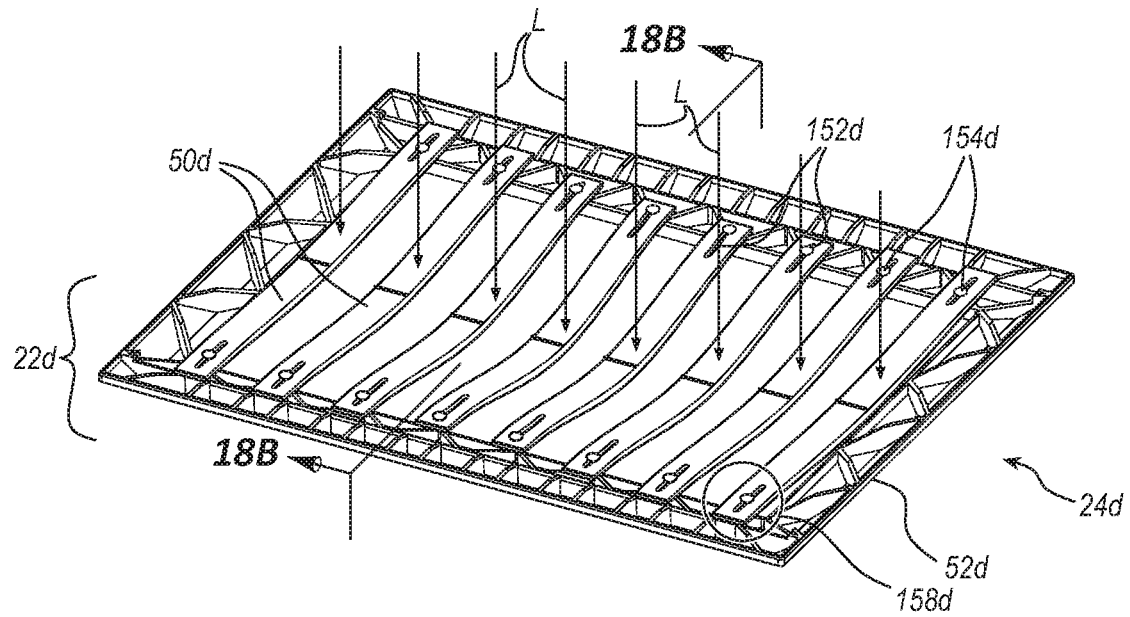
FIG. 17B illustrates a perspective view of the spring system illustrated in FIG. 17A with a load applied downwardly on the spring system.
Figure 18A:
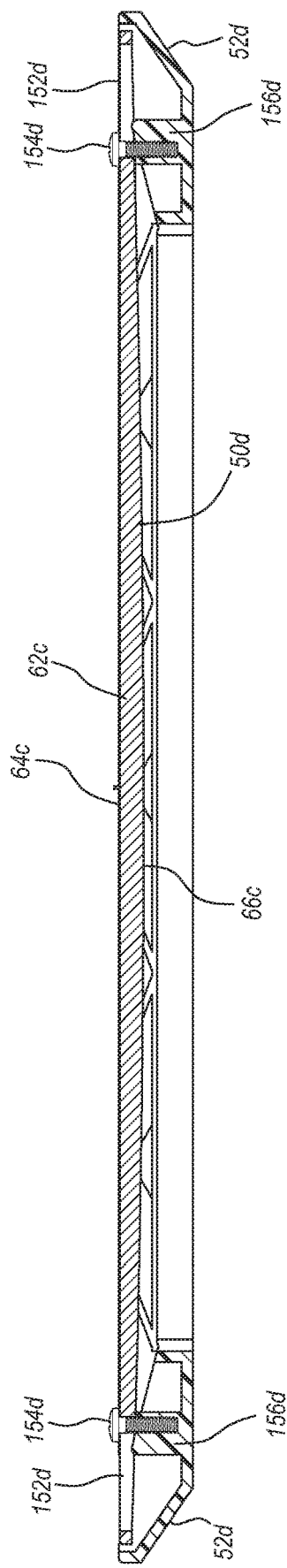
FIG. 18A illustrates a cross-sectional view of the spring system illustrated in FIG. 17A along plane 18A-18A indicated in FIG. 17A.
Figure 18B:
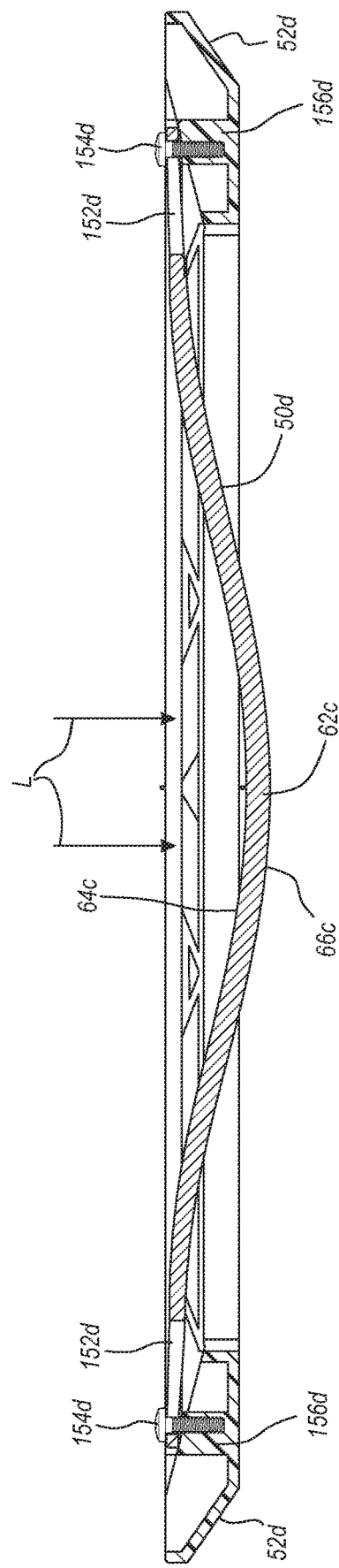
FIG. 18B illustrates a cross-sectional view of the spring system illustrated in FIG. 17B along plane 18B-18B indicated in FIG. 17B.

When the spring system 24d is unloaded or unweighted, as illustrated in FIGS. 17A and 18B, the slats 50d may sit level with the frame 52d. The first end 58d and second end 60d of the slats 50d may extend past the retention bore 156d to the edge of the frame 52d. In contrast, when a weight or load L is applied downwardly on the spring system 24d, as illustrated in FIGS. 17B and 18B, the slats 50d slide and flex at a middle portion or point 62d. In order to flex, the elongate openings 152d allow the slats 50d to slide along a desired track dictated by the length 158d of the elongate opening 152d, and flex until the retention fastener 156d reaches a terminal end of the elongate opening 152d. That is, the slats 50d slide along the length 158d of the elongate openings 152d when flexed, and flexion may reach a terminal point when the retention fastener 154d reaches an end of the elongate opening 152d. When the spring system 24d is weighted or loaded, as in FIG. 18B, the slats 50d may flex or bend below the height of the frame 52d.

As with the other embodiments, the slats 50d may be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50d can be from a polymer, wood, metal, alloys, composites, fiberglass, carbon fiber, and combinations thereof, or the like.

The slats 50d may flex in a bow-shape when loaded and return to an initial flat or elongate shape when unloaded. In some embodiments, the slats may include a graduating thickness, where the middle portion 62d of the slat 50d is the thickest portion of the slat 50d. The upper surface 64d of the slat 50d where the cushion 16 (FIG. 1) may be placed may maintain a continuous, flat surface, while the lower surface 66d, or underside or bottom side, of the slat 50d may exhibit a curved shape to allow for greater thickness in the middle portion 62d. The greater thickness in the middle portion 62d of the slats 50d may increase structural integrity of the slats 50d and prevent or slow wear by users of the furniture system over time. Varying a thickness of the middle portion 62d, and/or portions of the slats 50d near the first end 58d and second end 68d, can vary the biasing force; areas of the slats 50d with greater thickness being more resistant to bending and so the biasing force is greater than a situation where areas of the slats 50d are thinner. Additionally, varying a composition of the material forming the frame 52d, including the slat 50d, can also vary the biasing force.

Generally, the slats 50d can have a length ranging from about 10.0" to about 80.0", from about 12.0" to about 78", and from about 14" to about 75". A thickness in the middle portion 62d can range from about 0.060" to 2.0", from about 0.080" to 1.0", or from about 0.10" to 0.9". A thickness at one or both of the first end 58d and second end 68d, closer to the middle portion than the catch 130d, can range from about 10% of the max thickness of the middle portion 62d of the slats 50d, to about 70%, from about 20% to about 65%, or from about 30% to about 60%. The slats 50d can have varying thicknesses along the length of the slats 50d. The varying thickness along the length may provide reinforced support in certain locations along the slat, while providing for a greater range of flexibility at other locations along the length of the slats 50d as discussed herein.

In some embodiments where the slats 50d are made of metal, the thickness of the slats 50d may be substantially less than the thicknesses recited above. For example, thickness of the middle portion 62d of a slats 50d made of metal can range from about 0.00003" to about 0.25", from about 0.0003" to about 0.20", or from about 0.003" to about 0.15".

Figure 16:
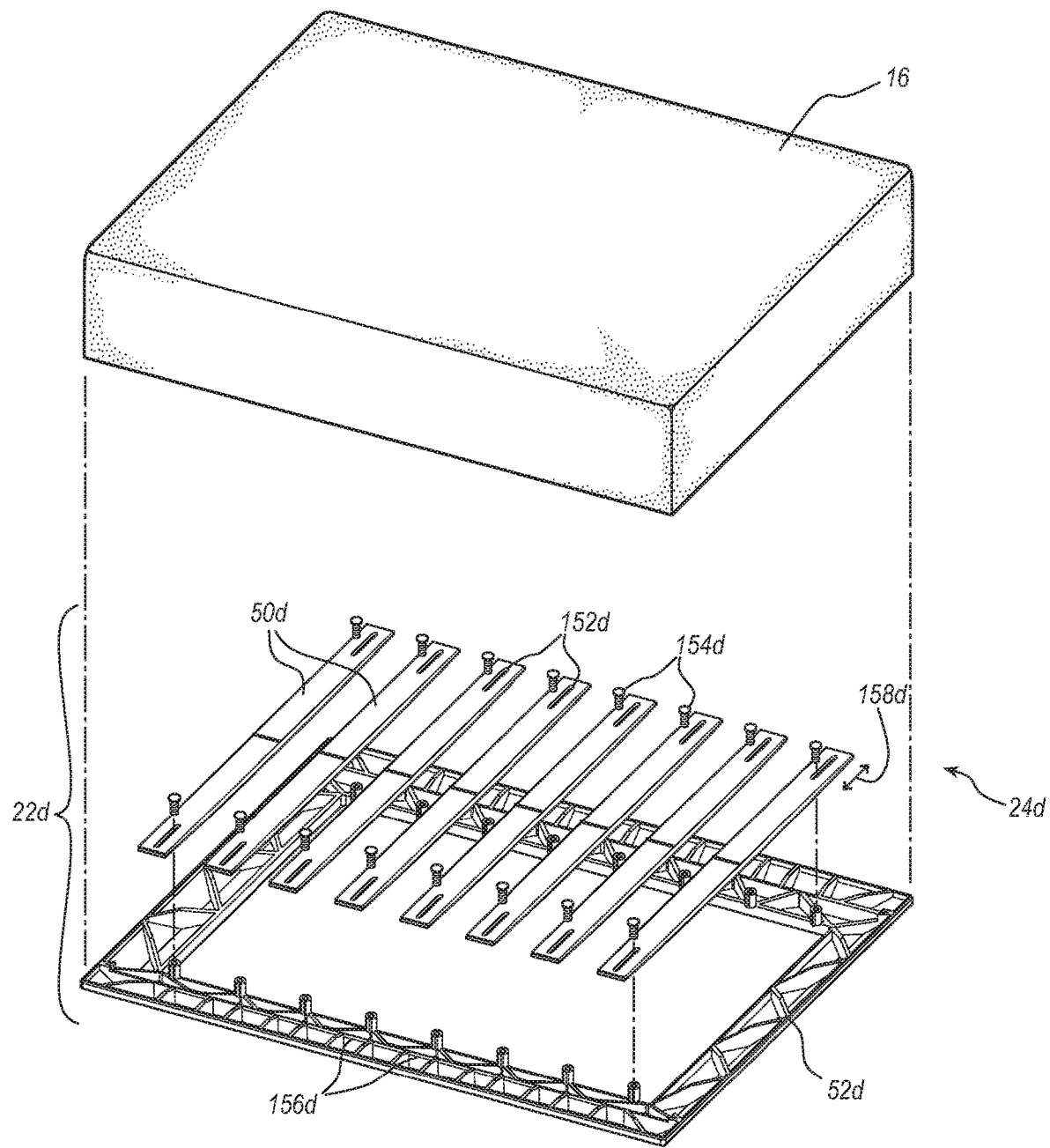
FIG. 16 illustrates an exploded view of another embodiment of a spring system including a furniture cushion, according to the present disclosure.

Generally, the slats 50d have a general uniform width along their width, as illustrated in FIG. 16. However, the slats 50*d* can have non-uniform widths with a portion near the first end 58*d* and second end 60*d* being narrower than at the middle portion 62*d*. Alternatively, a portion near the first end 58*d* and second end 60*d* can be wider than at the middle portion 62*d*. By varying the widths, different flexion and biasing forces can be generated by the slats 50*d*.

FIGS. 3A-18 illustrate various retention members or means for retaining the slat in contact with the frame. It will be understood by one skilled in the art that the spring systems, and more generally, the furniture items, contemplated by this application can include one or more of the retention members of FIGS. 3A-18, whether used alone or in combination with one another. For instance, the spring systems, and more generally, the furniture items, contemplated by this application, can include any combination of the retentions members described herein, such that each retention member described herein can be used in combination with one or more of the other retentions members described herein.

FIG. 19-21B illustrate another embodiment of a spring system 24*e* according to the present invention. This discussion and disclosure associated with the spring systems 24, 24*a*, 24*b*, 24*c*, 24*d* are also applicable to the spring system 24*e*, and vice versa. Like structures are identified by like reference numerals.

In the embodiment of FIGS. 19-21B, a spring system 24*e* may be formed as a single piece, such as a monolithic structure. FIGS. 19-21B show the spring system 24*e* and a furniture cushion 16. When assembled, the furniture cushion 16 may rest on top of the spring system 24*e*. The spring system 24*e* may include a lid 22*e* comprising a frame 52*e* with a plurality of slats 50*e* molded onto the frame 52*e*. The slats 50*e* may be formed in a bow shape so that in an unweighted position, as illustrated in FIGS. 20A and 21A, a middle portion 62*e* of the slats 50*e* is positioned higher relative to a first end 58*e* and a second end 60*e* of the slats 50*e*. The slats 50*e* may be configured in a raised or bow-shape, perpendicular to the edges of the frame 52*e*. The pre-formed bow-shape of the slats 50*e* may provide a mechanism for the slats 52*e* to return to an initial position after they are flexed and/or a load is applied. When the spring system 24*e* is flexed and/or a load L is applied downward on the spring system 24*e*, as in FIGS. 20B and 21B, the middle portions 62*e* of the slats 50*e* flex downwardly under load while the first end 58*e* and the second end 60*e* of the slats 50*e* remain at the same height as the frame 52*e*.

Figure 20A:
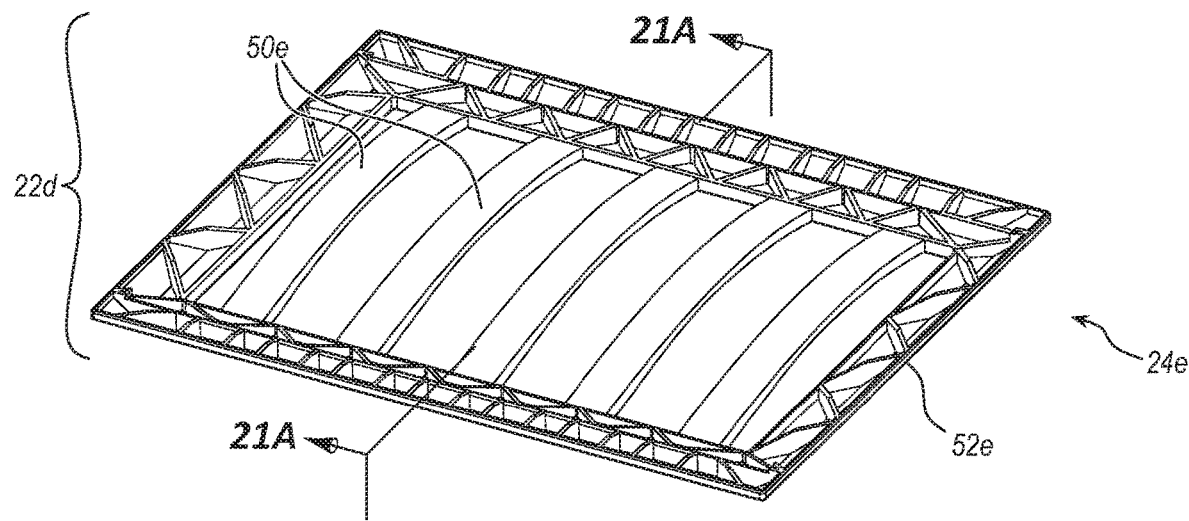
FIG. 20A illustrates a perspective view of an embodiment of a spring system, according to the present disclosure.
Figure 20B:
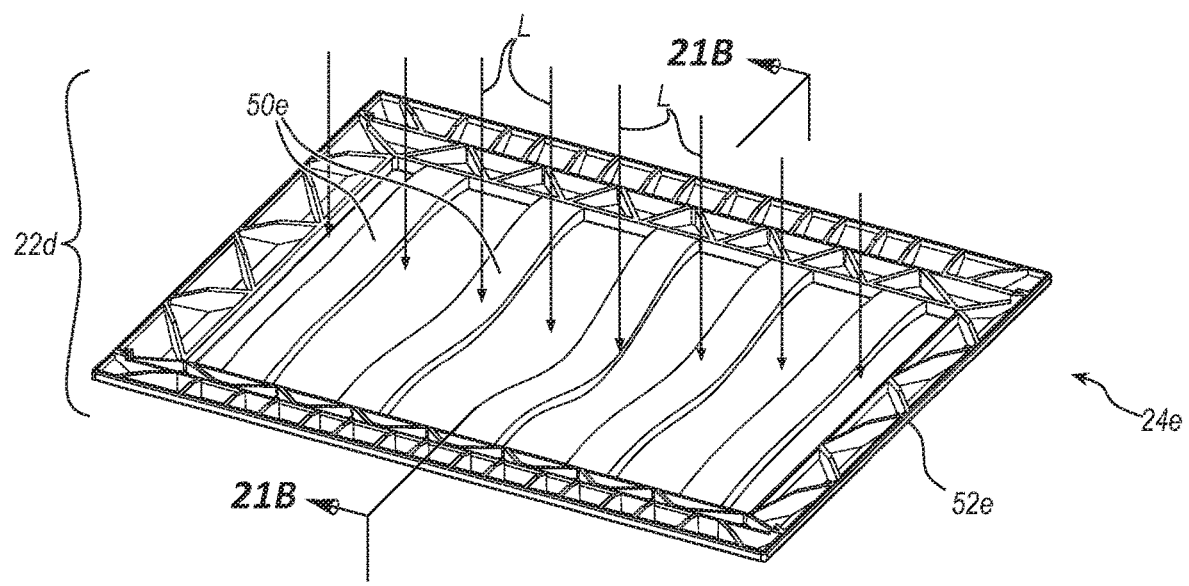
FIG. 20B illustrates a perspective view of the spring system illustrated in FIG. 20A with a load applied downwardly on the spring system.

The slats 50*e* are formed with the frame 52*e* via the first end 58*e* and the second end 60*e* of the slats 50*e*. The first end 58*e* and the second end 60*e* are form with an interior support 86*e* of the frame 52*e*. The slats 50*e* form a bow-shape, with a center or mid-point 158*e*, or apex of the slats 50*e* is level with a top surface of the frame 52*e*. The slats 50*e* may have a mid-point 158*e* level or even with the height of the frame 52*e* to allow the furniture cushion 16 to sit comfortably or flat on top of the spring system 24*e* when the system is unloaded. When a load is applied downward on the spring system 24*e*, as illustrated in FIGS. 20B and 21B, the mid-point 158*e* of the slats 50*e* may extend below the frame 52*e*. The slats 50*e* may be thicker towards the first end 58*e* and the second end 60*e*. These thicker ends serve as stabilizing sections 160*e* that provide a biasing force to return the slats 50*e* to an initial position after the spring system 24*e* is unloaded. Varying a thickness of the stabilizing sections 160*e* can vary the biasing force; slats 50*e* with thicker stabilizing sections 160*e* being more resistant to bending and so the biasing force is greater than a situation where the stabilizing sections 160*e* are thinner. Additionally, varying a composition of the material forming the frame 52*e*, including the slat 50*e* and the stabilizing sections 160*e*, can also vary the biasing force.

As with the other embodiments, the slats 50*e* may be made of any stiff material that can be flexed to accommodate a weight load of up to 250 lbs, more preferably up to 300 lbs, more preferably up to 350 lbs, more preferably up to 400 lbs, more preferably up to 450 lbs, or more preferably up to 500 lbs. For instance, the slats 50*e* can be from a polymer, wood, metal, alloys, composites, fiberglass, carbon fiber, and combinations thereof, or the like.

Generally, the slats 50*e* can have a length ranging from about 10.0" to about 80.0", from about 12.0" to about 78", and from about 14" to about 75". A thickness at one or both of the first end 58*e* and second end 68*e*, closer to the middle portion than the catch 130*e*, can range from about 0.060" to 2.0", from about 0.080" to 1.0", or from about 0.10" to 0.9". A thickness in the middle portion 62*e* can range from about 10% of the max thickness of the thickness at one or both of the first end 58*e* and the second end 68*e* of the slats 50, to about 70%, from about 20% to about 65%, or from about 30% to about 60%. The slats 50*e* can have varying thicknesses along the length of the slats 50*e*. The varying thickness along the length may provide reinforced support in certain locations along the slat, while providing for a greater range of flexibility at other locations along the length of the slats 50*e* as discussed herein.

In some embodiments where the slats 50 are made of metal, the thickness of the slats 50 may be substantially less than the thicknesses recited above. For example, thickness of the middle portion 62 and or thickness of one or both of the first end 58*e* and the second send 68*e* of slats 50 made of metal can range from about 0.00003" to about 0.25", from about 0.0003" to about 0.20", or from about 0.003" to about 0.15".

Figure 19:
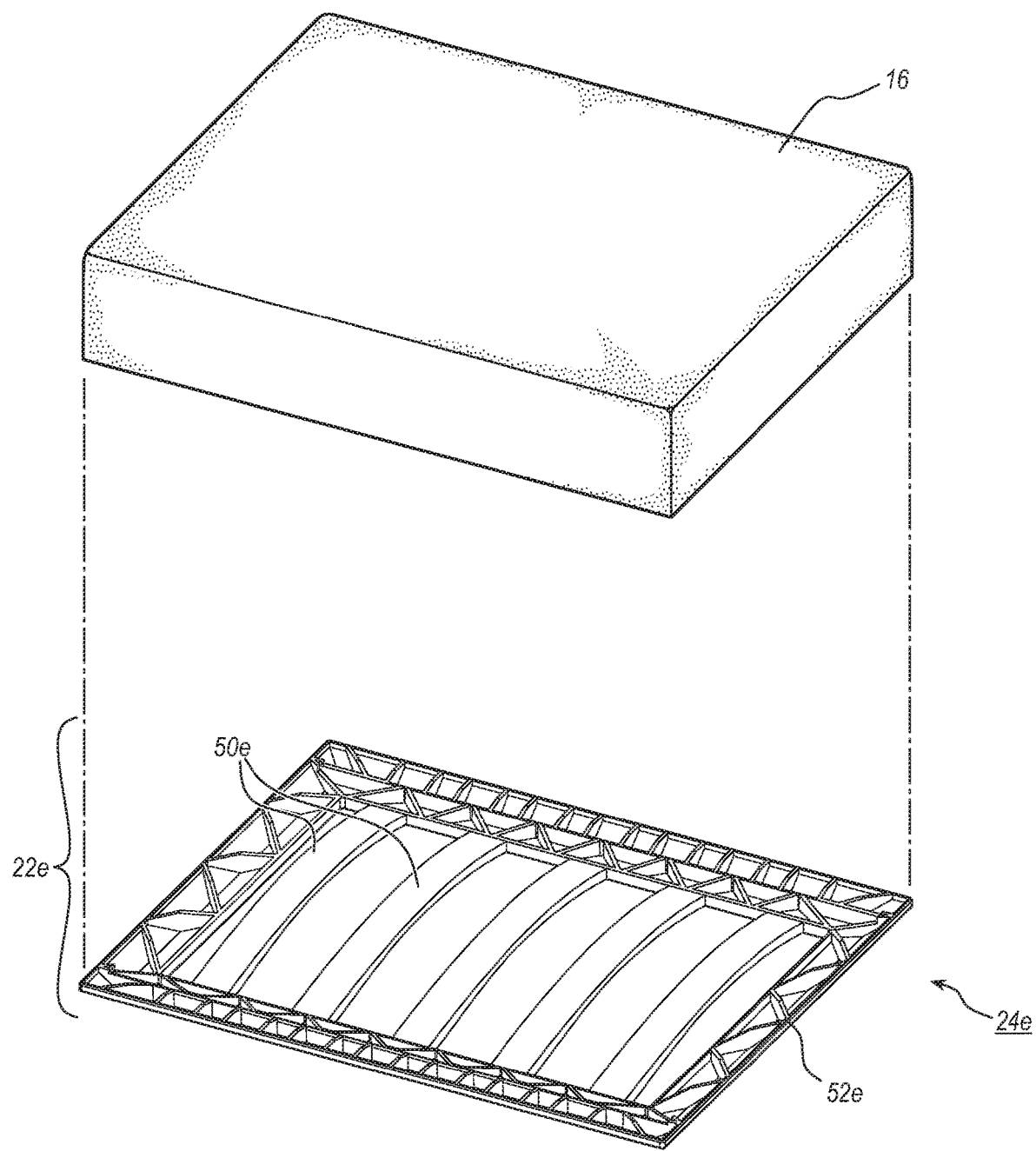
FIG. 19 illustrates an exploded view of another embodiment of a spring system including a furniture cushion, according to the present disclosure.

Generally, the slats 50*e* have a general uniform width along their width, as illustrated in FIG. 19. However, the slats 50*e* can have non-uniform widths with a portion near the first end 58*e* and second end 60*e* being narrower than at the middle portion 62*e*. Alternatively, a portion near the first end 58*e* and second end 60*e* can be wider than at the middle portion 62*e*. By varying the widths, different flexion and biasing forces can be generated by the slats 50*e*.

In some embodiments, the frame and spring system described herein can be formed onto, or fixedly attached to a furniture base. In some embodiments, the spring system may be formed onto or fixedly attached to a furniture base without the use of a frame. In another embodiment, the frame may be formed onto or fixedly attached on all sides to a furniture base, wherein the frame may provide attachment points to which slats may be selectively attached and arranged in any manner described above. In these embodiments, the spring system and/or frame may not be removable from the furniture base. Similarly, the frame and/or spring system may not be moved to allow for storage within the furniture base. Rather, this configuration may only provide support for a user's weight applied to the furniture.

In some embodiments, the lid and spring system described herein can be integrated into a cushion. FIG. 22A illustrates an exploded view of an embodiment of an integrated lid-cushion assembly 200 including a spring system 224 and a cushion 216. While reference is made to the spring system 224, it will be understood that any of the embodiments or configurations of lids and spring systems described herein can be integrated into the cushions. The spring system 224 may be set inside a bottom side 230 of a cushion 216.

In an embodiment, the cushion 216 has a fill member 232 covered by a liner 234. The liner 234 can be a fabric material that is either water permeable or impermeable. An advantage of a water impermeable liner is that the liner will help protect the interior contents of the cushion 216. The fill member 232 can be a piece of foam, combinations of layers of foam of differing densities, memory foam, polyurethane foam, feathers and down, polyester, batting, and combinations thereof or other materials.

The bottom side 230 of the cushion 216 can include a flap 236 or selectively openable portion of the liner 234. The edges or corners of the spring system 224 may be secured within pockets 238 on an interior side of the liner 234 on the bottom side 230 of a cushion 216. Stated another way, the pockets 238 are formed between the fill member 232 and the liner 234 and can receive the spring system 224.

Once the spring system 224 is positioned into the pocket 238 of the cushion 216, the flap 236 may cover and secure the spring system 224 inside the cushion 216, as shown in FIG. 22B. The flap 236 may be detachably coupled through the use of a removable securing mechanism, such as a hook and pile mechanism, e.g. VELCRO®, one or more zippers, male and female snap members, hook and latch type fasteners, or any other type of securing means that will facilitate the flap 236 being selectively removable. The spring system 224 may be transferable between compatible furniture components, for example, the consumer may want to change the appearance of the furniture by changing the removeable liner of the cushions or may want to transition between different furniture configurations. In some embodiments, extendable slats may be incorporated to allow a furniture section to be extended to form a lounger.

The spring system of the present disclosure may be utilized in various types of modular furniture, including part of a bed system or modular bed system. The modular system advantageously simplifies manufacturability, durability through flipping, relocating & replacing worn modules, and simplifies packing/shipping. The modular bed system allows modular components to be used to resize a bed overtime. For instance, the modular components forming a twin bed can be utilized to form Full, Queen, King, and California King beds by adding other modular components.

Figure 23A:
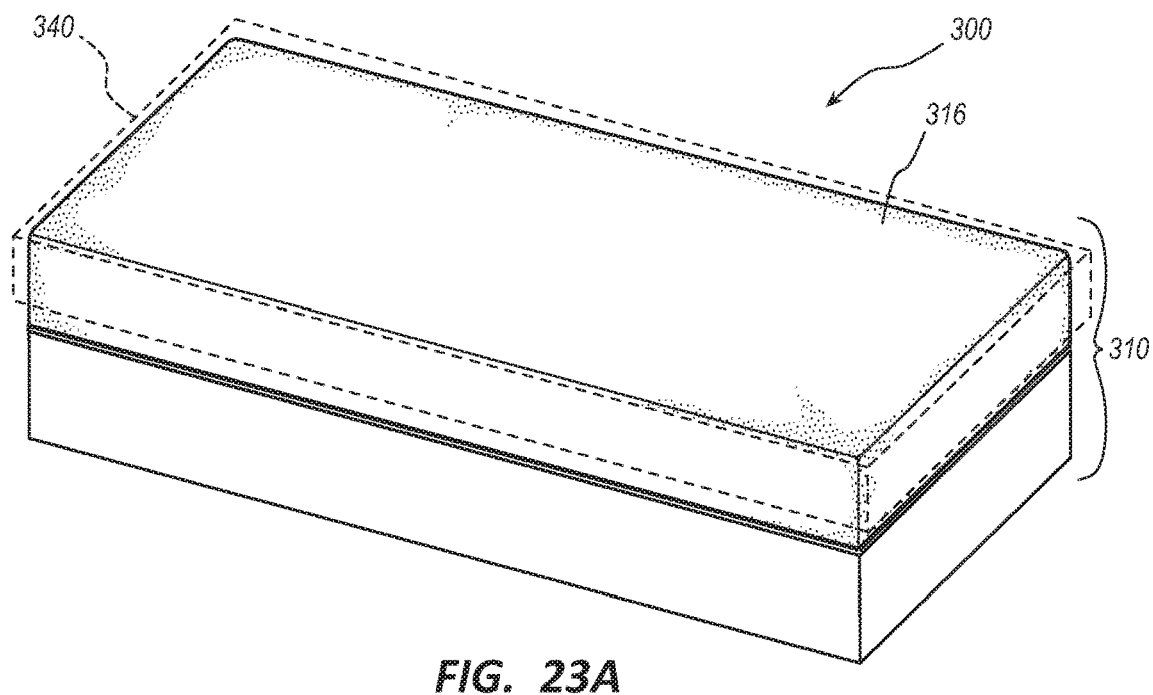
FIG. 23A illustrates a perspective view of a modular mattress system according to the present disclosure.
Figure 23B:
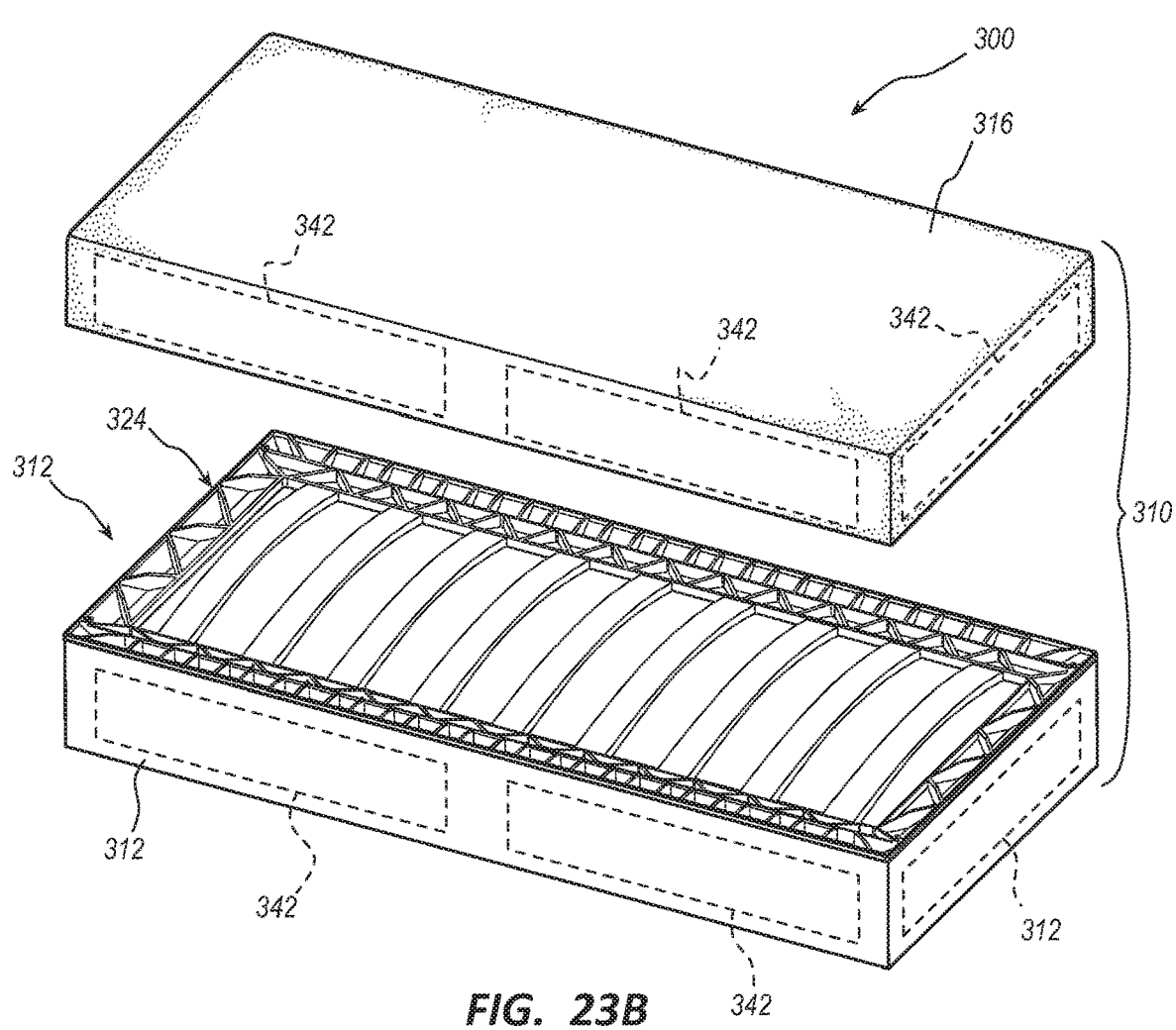
FIG. 23B illustrates an exploded view of the modular mattress system of FIG. 23A.

With reference to FIGS. 23A-23B, illustrated is a modular component 310 of a bed system 300; the modular component 310 being combined with other similarly sized or differently sized modular components 310 to form a bed. The modular component 310 utilizes a modular mattress 316 that can be selectively attached to a support structure 312 with a spring system 324. The modular mattress 316 can be similar to the cushions described herein, the support structure 312 can be similar to the bases described herein, and the spring system 324 can be similar to the other spring systems described herein. As such, the disclosures and discussions of the cushions, bases, and spring systems described herein are also applicable to the support structure 312, the modular mattress 316, and the spring system 324. Like structures, therefore, are identified with like reference numerals.

The modular components 310 may be detachably coupled through the use of securing mechanisms 342 (FIG. 23B) on the opposing sides of the modular components 310. For instance, the securing mechanism 342 can be a hook and loop mechanism, e.g. VELCRO®, one or more zippers, male and female snap members, magnets, hook and latch type fasteners, mechanical interlocks or any other type of securing means that will facilitate the modular components 310 being selectively coupled to one another. Alternatively, a bed frame (e.g., a rigid bed frame) may be used to secure a plurality of modular components 310 in a desired configuration to form a completed bed system 300.

The modular mattress 316 can include materials such as foam, polyurethane, memory foam, pocket coils, Durafoam, high-density foam, and other materials used in mattress construction. In some embodiments, the modular mattress 316 may be a dual-comfort module, where a first side of the modular mattress 316 provides soft or light support, and a second side provides medium or firm support. The consumer may turn the modular mattress 316 so that the preferred side of the dual-comfort module is facing up to form the sleeping surface. The advantage of this feature is that the consumer may adjust the support level of the mattress as often as they might prefer.

In some embodiments, the spring system 324 may be incorporated into the interior of a modular mattress 316 or mattress module 310. For example, mattress materials such as foam can be molded on to and cover the spring system 324 on all surfaces so that the spring system 324 is fixed inside of a mattress module 310.

Individual component modules 310 and/or the bed system 300 as a whole, can include removable toppers 340 (FIG. 23A) formed of down, memory foam, etc. to provide comfort and durability. These removeable toppers 340 may be added to provide an additional degree of support and customization to the modular components 310. The removeable toppers 340 may also provide continuity between mattress modules 316 and prevent splitting or sinking between mattress modules 316.

As mentioned above, the modular components 310 forming a twin bed can be utilized to form Full, Queen, King, and California King beds by adding other modular components. Some embodiments utilize modular components 310 complying with an equation:

$$y=2x$$

where, x is the component width (W) and y is the component length (L).

Figure 24:
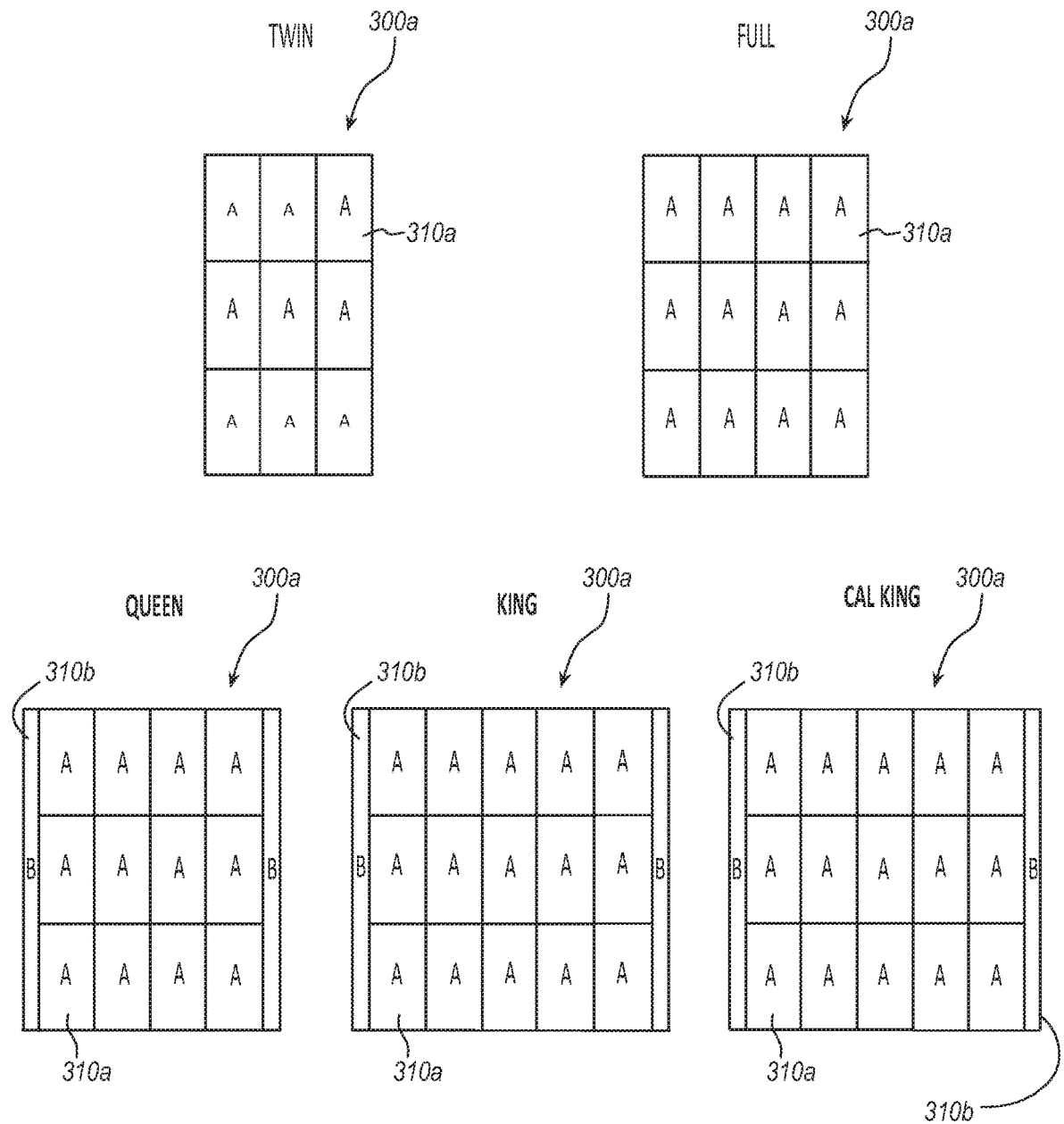
FIG. 24 illustrates a modular mattress system according to one or more implementations of the present disclosure, wherein various configurations of mattress modules are utilized to form beds of different dimensions.

In the bed system 300a of FIG. 24, the width of modular component 310A is 12.5 inches and the length of the modular component 310A is 25.0 inches. This allows a majority of the bed area of the bed system 300a uses the modular component 310A of one size. The twin bed can be increased in size to the Full bed by adding a number of modular components 310A. To form the Queen, King, and California King sized beds, one or more modular components 310B and/or module components 310A and 310B can be added to form the bed system 300a. The modular component 310B can have a width of 5 inches and a length of 75 inches.

The modular components 310A and 310B, with associated support structure, mattress modules, and spring systems, may be manufactured in a number of sizes to allow a user to incrementally add components to create a particular bed size. For example, and as illustrated in FIGS. 24-28, modular components 310A, 310B, and 310C can have various other sizes and be combined in a variety of different orientations. Table 1 below provides some possible sizes of the modular components 310A, 310B, 310C, 310D, 310E, and 310F for the bed systems 300a, 300b, 300c, 300d, and 300e. It will be understood that the sizes referenced in Table 1 can apply to the modular component as a whole, and each of the modular mattress 316 and support structure 312 associated with the modular component 300. Additionally, the spring system 324 can have similar sizes to those described in Table 1, while accommodating for resting upon the support structure 312 in a similar way that the spring systems rest on the bases described herein.

TABLE 1

Figure 25:
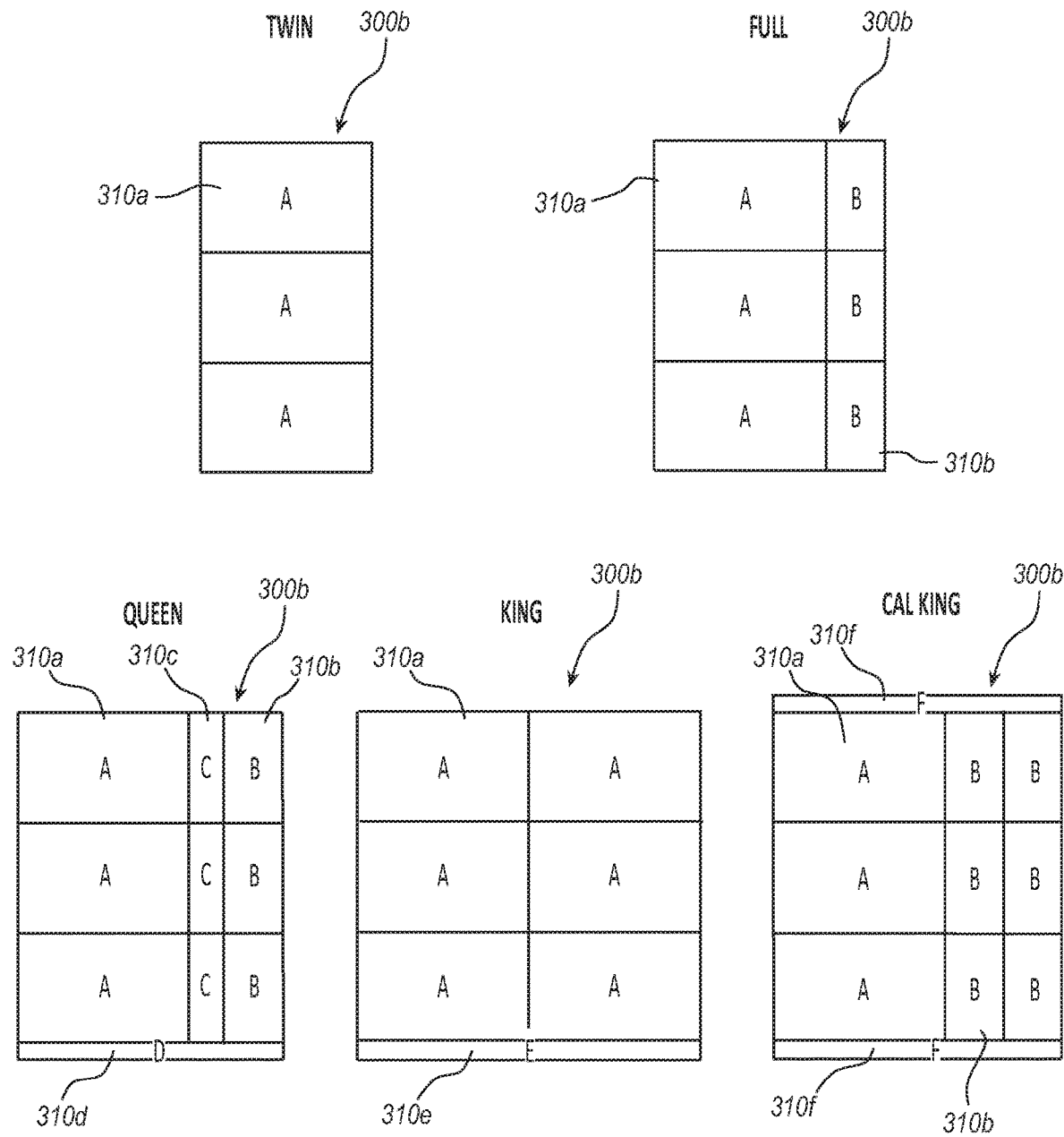
FIG. 25 illustrates a modular mattress system according to one or more implementations of the present disclosure, wherein various configurations of mattress modules are utilized to form beds of different dimensions.
Figure 26:
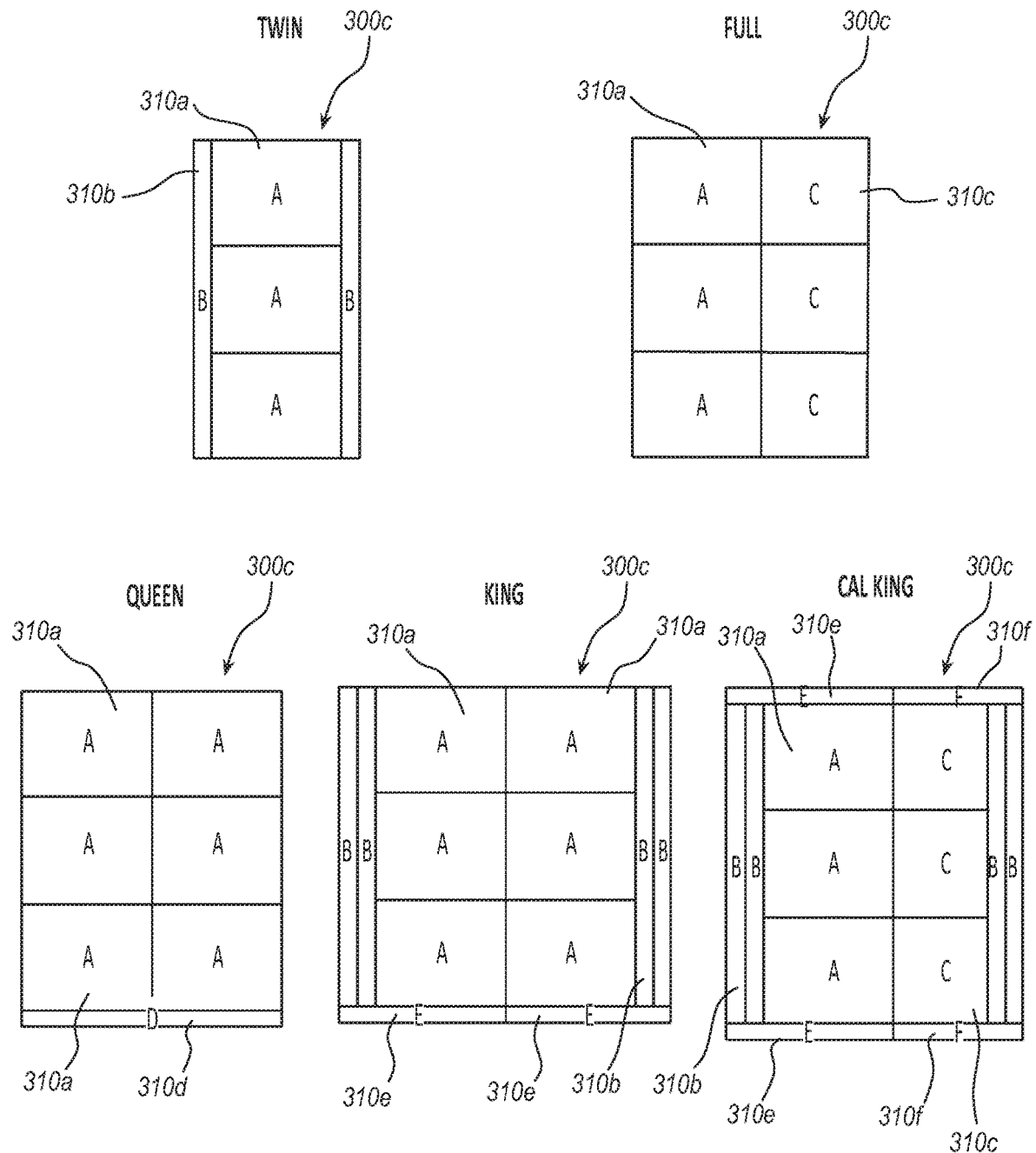
FIG. 26 illustrates a modular mattress system according to one or more implementations of the present disclosure, wherein various configurations of mattress modules are utilized to form beds of different dimensions.
Figure 27:
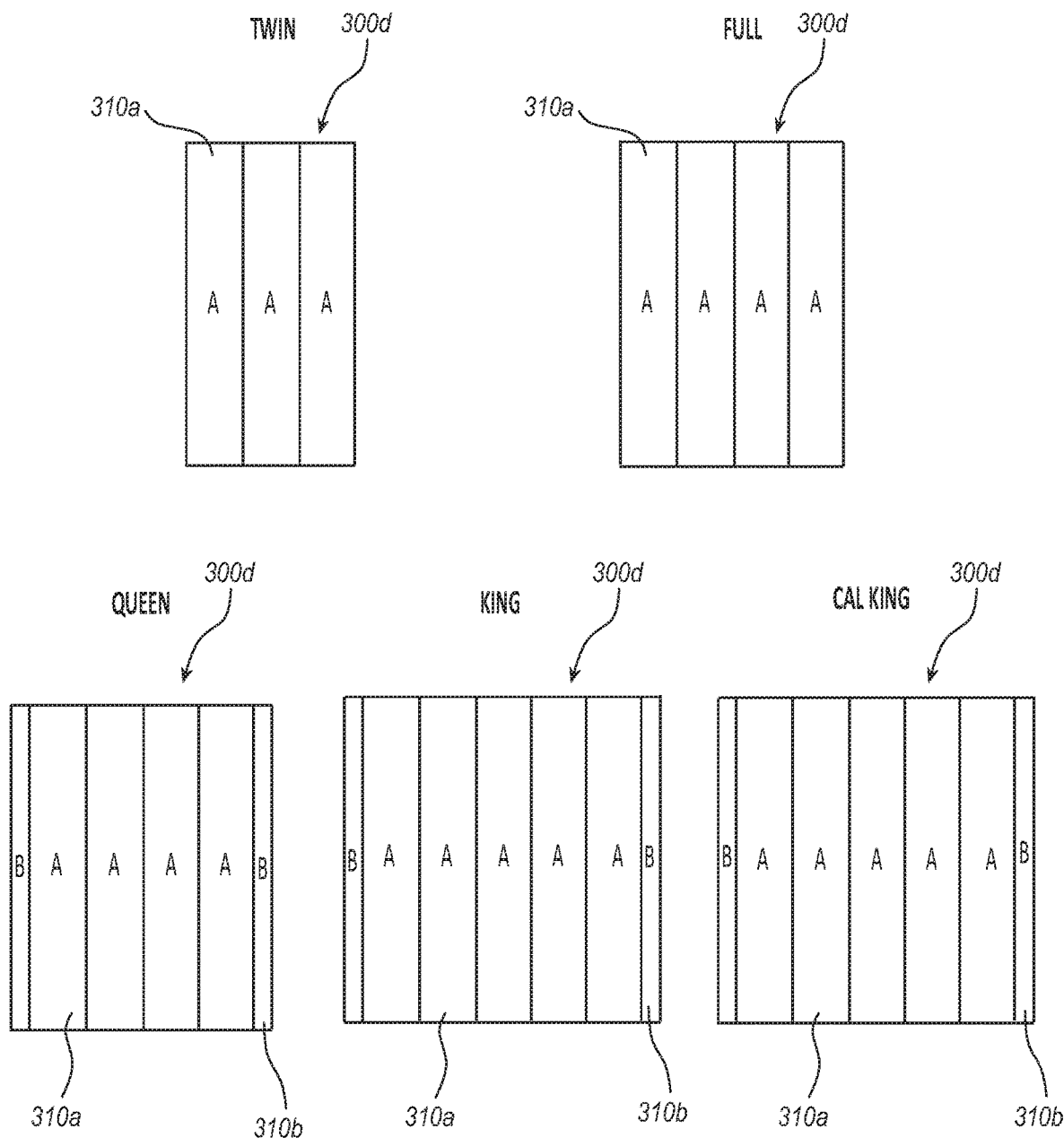
FIG. 27 illustrates a modular mattress system according to one or more implementations of the present disclosure, wherein various configurations of mattress modules are utilized to form beds of different dimensions.
Figure 28:
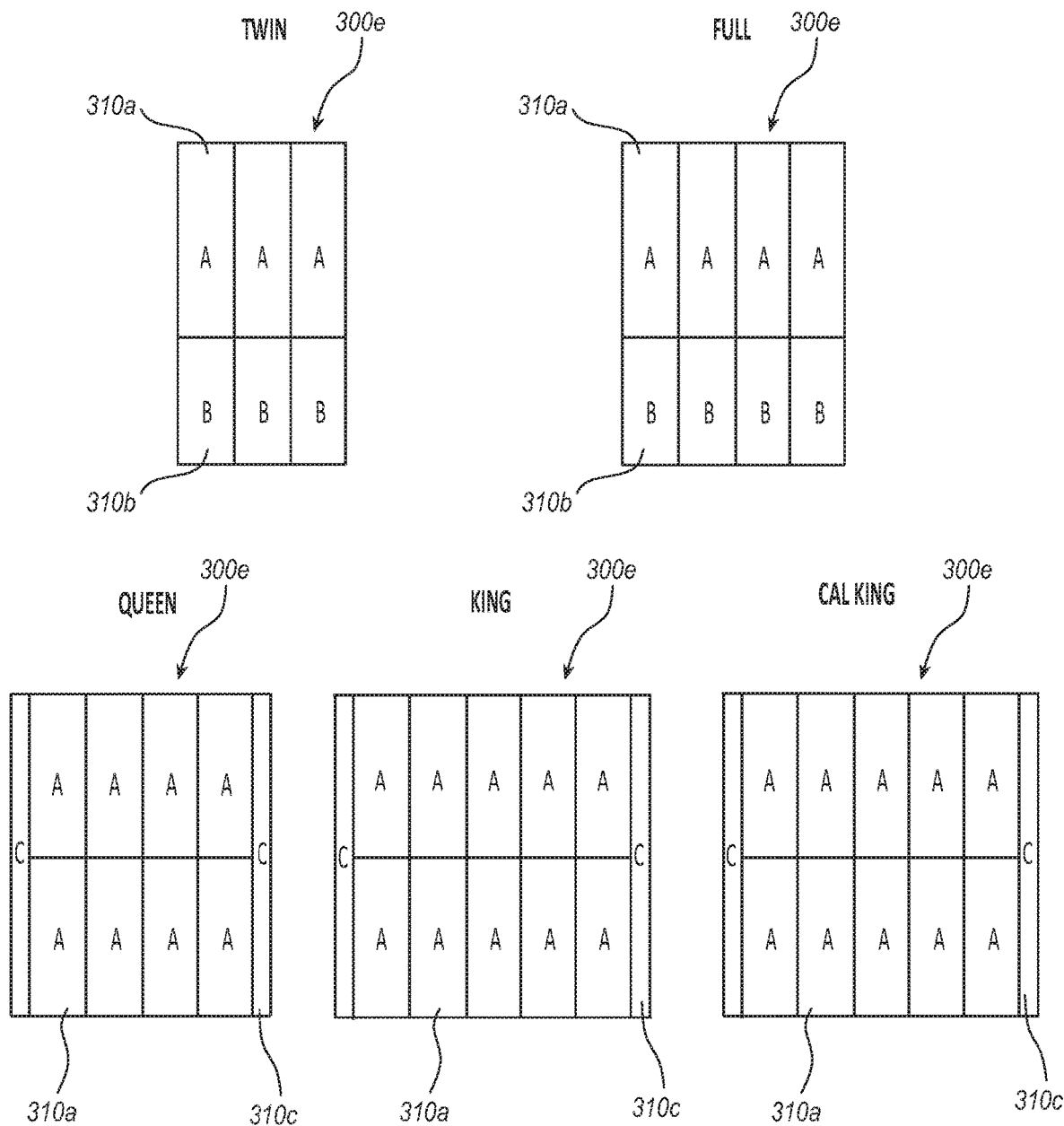
FIG. 28 illustrates a modular mattress system according to one or more implementations of the present disclosure, wherein various configurations of mattress modules are utilized to form beds of different dimensions.

|         | Module A (L × W) | Module B (L × W) | Module C (L × W) | Module D (L × W) | Module E (L × W) | Module F (L × W) |
|---------|------------------|------------------|------------------|------------------|------------------|------------------|
| FIG. 24 | 25" × 12.5"      | 75" × 5"         | —                | —                | —                | —                |
| FIG. 25 | 25" × 39"        | 25" × 16"        | 25" × 5"         | 5" × 60"         | 5" × 78"         | 5" × 71"         |
| FIG. 26 | 25" × 30"        | 75" × 4"         | 25" × 25"        | 5" × 60"         | 5" × 38"         | 5" × 33"         |
| FIG. 27 | 75" × 13"        | 75" × 4"         | —                | —                | —                | —                |
| FIG. 28 | 40" × 13"        | 35" × 13"        | 40" × 4"         | —                | —                | —                |

The modular combinations described above are non-limiting examples of modular component combinations which may be utilized to create the bed systems. As such, a modular component can have a length from about 4.0" to about 85.0", from about 4.5" to about 78.0", from about 5.0" to about 75.0", from about 5.5" to about 72.5", or from about 6.0" to about 70.0". The modular component can have a width from about 3.0" to about 85.0", from about 3.5" to about 78.5", from about 4.0" to about 75.0", from about 4.5" to about 72.5", or from about 5.0" to about 70.0".

The number and size of the modular components 310 used may be dependent on the comfort and support preferences of a user. For example, a user requiring more variation in support (i.e. firm support, soft support, etc.) may prefer a configuration utilizing modular components 310 in order to increase/decrease the degree of support for different areas of the user's body. In such a case, the modular component 310 near the user's hips might have firmer support than the modular components 310 near the user's head or feet. Alternatively, the modular component 310 near the user's hips might have softer support than the modular components 310 near the user's head or feet. Each modular component 310 used in a particular bed system 300 can have the same or different support properties. Where two or more persons share the same bed system 300, each user may customize their portion of the bed system 300 to their support preference. This feature may also be beneficial in places like hotels, guest rooms, and other short-term use situations where the user of the mattress module might change frequently and may prefer a different degree of comfort and support relative to other uses.

In addition to changing the particular modular component 310, and any of the mattress module 316 and the spring system 324, a density of modular components 310 can also vary to change the support properties. For instance, for selective support a higher number of modular components 310 can be used to form the bed area. Conversely, a user who prefers uniform support may prefer a bed system 300 having fewer modular components 300 which may simplify and/or decrease the degree of variation.

Figure 32A:
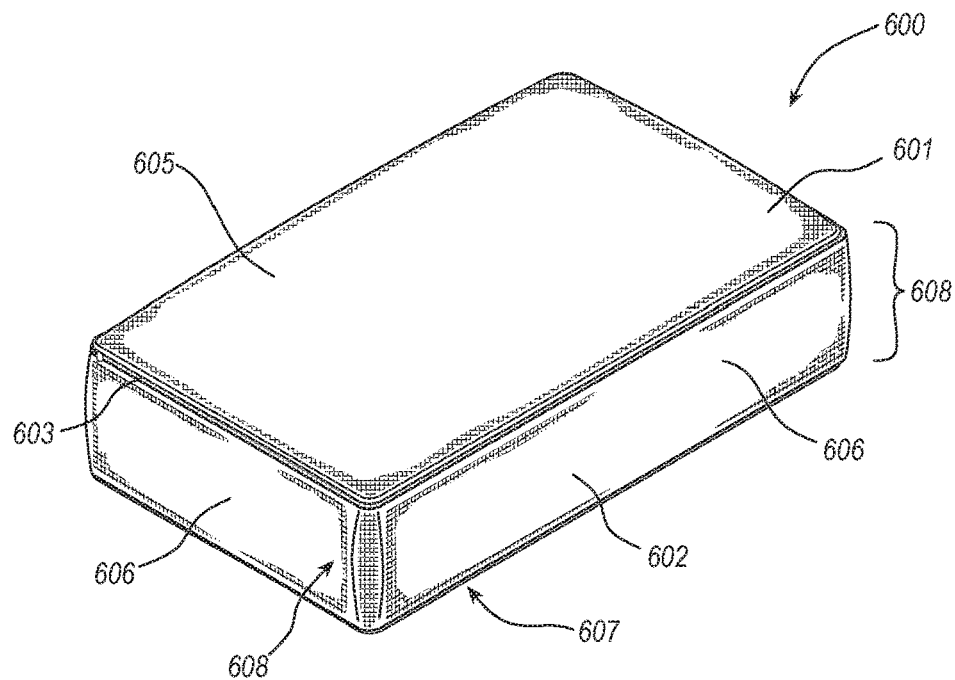
FIG. 32A illustrates a perspective view of a casing of a modular mattress system in a closed position according to one or more implementations of the present disclosure.
Figure 32B:
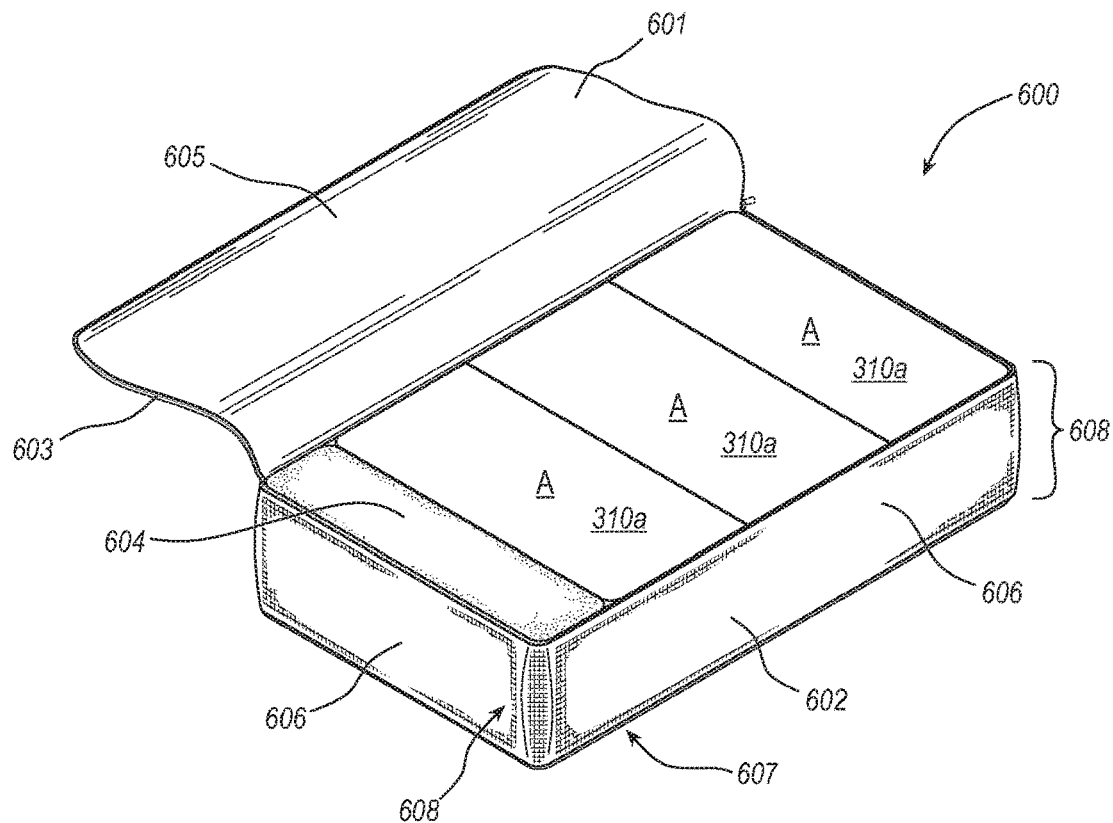
FIG. 32B illustrates a perspective view of a casing of a modular mattress system in an open position according to one or more implementations of the present disclosure.

In some embodiments, the modular components described above may, in certain combinations, require that a casing be applied to achieve the correct mattress size. The casing may be sized and shaped to compensate for missing length and/or width and/or depth needed to form a standard size mattress. For example, in one embodiment shown in FIGS. 32A-32B, a twin XL-size casing 600 may be applied to add about 5.0" of length to several mattress modules A (310a) forming a twin-size mattress in order to convert the twin-size mattress into a twin XL size mattress. The casing 600 in FIG. 32A is shown having an upper section 601 and a lower section 602 joined by a connector 603. The connector 603 shown is a zipper, though buttons, snaps, clips, magnets, or the like can be used. The casing 600 is configured to contain the mattress modules 310a placed therein. In some embodiments, the lower section 602 of the casing 600 includes opposing sides 606 extending upwards from a bottom surface 607, with corners 608 formed therebetween. The components include the lower section 602 can be formed from a single piece of material. In some embodiments, it may be advantageous for the corners 608 to be fitted corners, or corners with extra elastic properties relative to the rest of the casing 600 so that the corners may be stretched and tightly secured around the mattress modules 310a to provide an increased degree of support to the fully formed mattress.

In one embodiment, in order to form a mattress, mattress modules 310a are configured inside of the casing 600. The upper section 601 of the casing 600 is then joined to the lower section 602 of the casing 600 via the connector 603 in order to close the casing. In the embodiment shown in FIG. 32B, the upper section 601 is disconnected from the lower section 602 on three sides, forming a flap 605, providing access to the interior of the lower section 602 of the casing 600. In some embodiments, the upper section 601 can be completely removed from the lower section 602 when the casing 600 is opened to place mattress modules 310a inside, and then rejoined to form a closed, completed mattress. In some embodiments, the upper section 601 and lower section 602 can be equally sized, by having the connector 603 positioned at a midpoint of the opposing sides 606 and extending latitudinally around the casing 600.

In some embodiments, the flap 605 can also function as a mattress topper and can be formed of down, memory foam, etc. to provide an additional degree of customization and support to the mattress modules 310a. When the flap 605 or the upper section 601 of the casing 600 functions as a topper, it can also provide continuity between mattress modules 310a and prevent splitting or sinking between modules.

An extender 604 is fixed within the interior of the lower portion 602 of the casing 600. In some embodiments, the extender portion 604 can be selectively removeable and/or repositionable within the casing 600. In casing 600, the extender 604 is positioned at an end of the casing 600 in order to extend the length of the mattress formed by the mattress modules 310a. In some embodiments, the extender 604 may be used to expand the width of the mattress. The extender 604 can be made of materials generally used in mattress construction such as foam, foam alternatives, polyester blends, quilting, padding, gel, and other similarly resilient materials. The extender 604 must be stiff enough to support a user and not collapse under weight, while providing a comfortable surface. The mattress modules 310a can be placed side by side within the casing 600, and are preferably flush with each other and the extender 604 so as to avoid gaps in the completed mattress.

FIGS. 33A and 33B illustrate an alternative embodiment of a casing 700 as applied to a number of mattress modules 310a to form, for example, a full-size mattress. The casing 700 can have elastic properties, and as such, can be applied to a number of mattress modules 310a by securing the casing 700 over a corner 704 and then stretching the casing 700 over the remaining mattress modules 310a. The casing 700 may include extenders 702, fixed within the casing 700 to extend the length and/or width and/or depth of the mattress modules to form a standard size mattress. Similar to the extender 604, extender 702 can be made of materials generally used in mattress construction and must be stiff enough to support the weight of a user without collapsing, yet provide a comfortable surface similar to a mattress surface. A retention band 703 on the peripheral edge of the casing 700 can be used to selectively secure the casing 700 over a number of mattress modules 310a. The retention band 703 as shown in FIG. 33C is constructed of elastic material. In another embodiment, the retention band 703 can comprise buttons, snaps, clips, pins, hook and loop fasteners, magnets, or the like.

The casing for a twin-size mattress can add a width at least from about 0.5", from about 1.0", or from about 1.5". For example, a twin-size casing may add a width from about 0.5" to about 2.0", or from about 1.0" to about 1.75". A casing for a twin XL size mattress may add only length, while some twin XL casings may add both length and width to several modules forming a mattress. As such, a casing for a twin XL size mattress may add at least about 3.0" in length, at least about 4.0" in length, or at least about 5.0" in length. For example, a twin XL casing may add a length of about 3.0" to about 6.0", about 3.5" to about 5.5", or about 4.0" to about 5.0". A casing for a twin XL may also add the width for a twin-size mattress as recited above.

A casing for a full-size mattress can add a width from at least 0.5", from about 1.0", or from about 1.5". For example, a full-size casing may add a width from about 0.5" to about 3.0", or from about 1.0" to about 2.5". A casing for a full XL size mattress may add only length, while some full XL casings may add both length and width to several modules forming a mattress. As such, a casing for a full XL size mattress may add at least about 3.0" in length, at least about 4.0" in length, or at least about 5.0" in length. For example, a full XL casing may add a length of about 3.0" to about 6.0", about 3.5" to about 5.5", or about 4.0" to about 5.0". A casing for a full XL may also add the width for a full-size mattress as recited above.

A casing for a queen size mattress can add a length from at least about 3.0", about 4.0", or about 5.0". For example, a queen size casing may add a length from about 3.0" to about 7.0", from about 4.0" to about 6.5", or from about 4.5" to about 6.0". A casing for a king size mattress can add a length and/or width to several mattress modules combined to form a king size bed. A king size mattress casing can add a length from at least about 3.0", about 4.0", or about 5.0". For example, a king size casing may add a length from about 3.0" to about 7.0", from about 4.0" to about 6.5", or from about 4.5" to about 6.0". A king size casing can add a width from at least about 1.0", about 2.0", or about 3.0". For example, a king size casing may add a width from about 1.0" to about 4.0", from about 2.0" to about 3.5", or from about 3.0" to about 4.0".

A casing for a California king size mattress can add a length to several mattress modules combined to form a California king size bed. A California king size mattress casing can add a length from at least about 7.0", about 8.0", or about 9.0". For example, a California king size casing may add a length from about 7.0" to about 12.0", from about 8.0" to about 11.00", or from about 9.0" to about 10.0".

The casing may be formed of materials used in mattress construction such as foam, polyurethane, memory foam, pocket coils, Durafoam, high-density foam, or the like. Some casings may be a rigid casing in order to support the weight of a user without collapsing.

Figure 29:
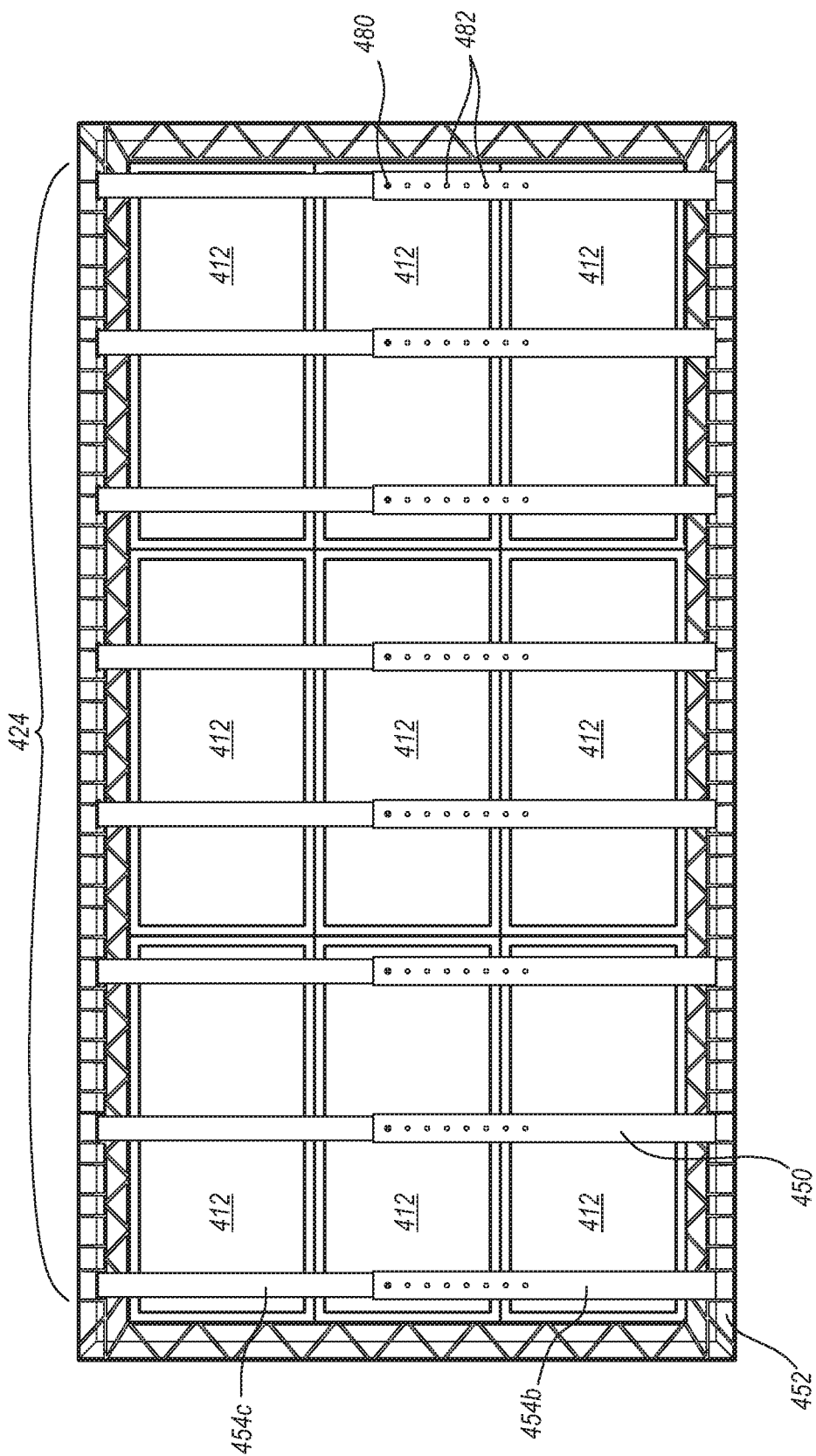
FIG. 29 illustrates a top plan view of a modular mattress system according to one or more implementations of the present disclosure.

Turning now to FIG. 29, the spring system 424 of a bed system 400 in another configuration is illustrated. The disclosure of bed system 300 and associated spring system 324 is also applicable to this configuration, and vice versa.

As depicted the spring system 424 includes a frame 452 and slats 450. The frame 452 is illustrated supported by a plurality of support structure 412, such as a base described herein. The slats 450 can attached to the frame 452 through the connections described earlier, such as catches and securing edges, retentions pins and elongate openings, projections and slots, plates, elongate openings and fasteners, being integrally formed as a monolithic one-piece structure, combinations therefore, or the like.

To accommodate for changing a size of the bed system 400, such as when a consumer may initially configure a twin-size bed for a child and as the child grows the bed system 400 is extended to the width of a full-size bed, the frame 452 can be replaced with a larger size and the slats 450 telescope to extend to the larger size. As illustrated in FIG. 29, the slats 450 include a first slat portion 454a and a second slat portion 454b. The slat portions 454a and 454a slide relative to each other, with the first slat portion 454a being received within a portion of the second slat portion 454b. The first slat portion 454a includes a biased locking pin 480 that can be received within a complementary opening 482 in the second slat portion 454b. As the biasing force of the biased locking pin 480 is overcome, the pin 480 is released from within the opening 482 to allow relative movement between the first slat portion 454a and the second slat portion 454b. The spacing of the openings 482 can be associated with specific dimensions of the bed system 400, and function as predetermined locking positions that a user may use to easily transition the overall lengths of the slats 450 as needed to create, for example, a twin-size mattress, which may then be extended further to accommodate a queen size mattress. The slats 450 may be extended and selectively fixed at a desired length (i.e. bed size).

Figure 30:
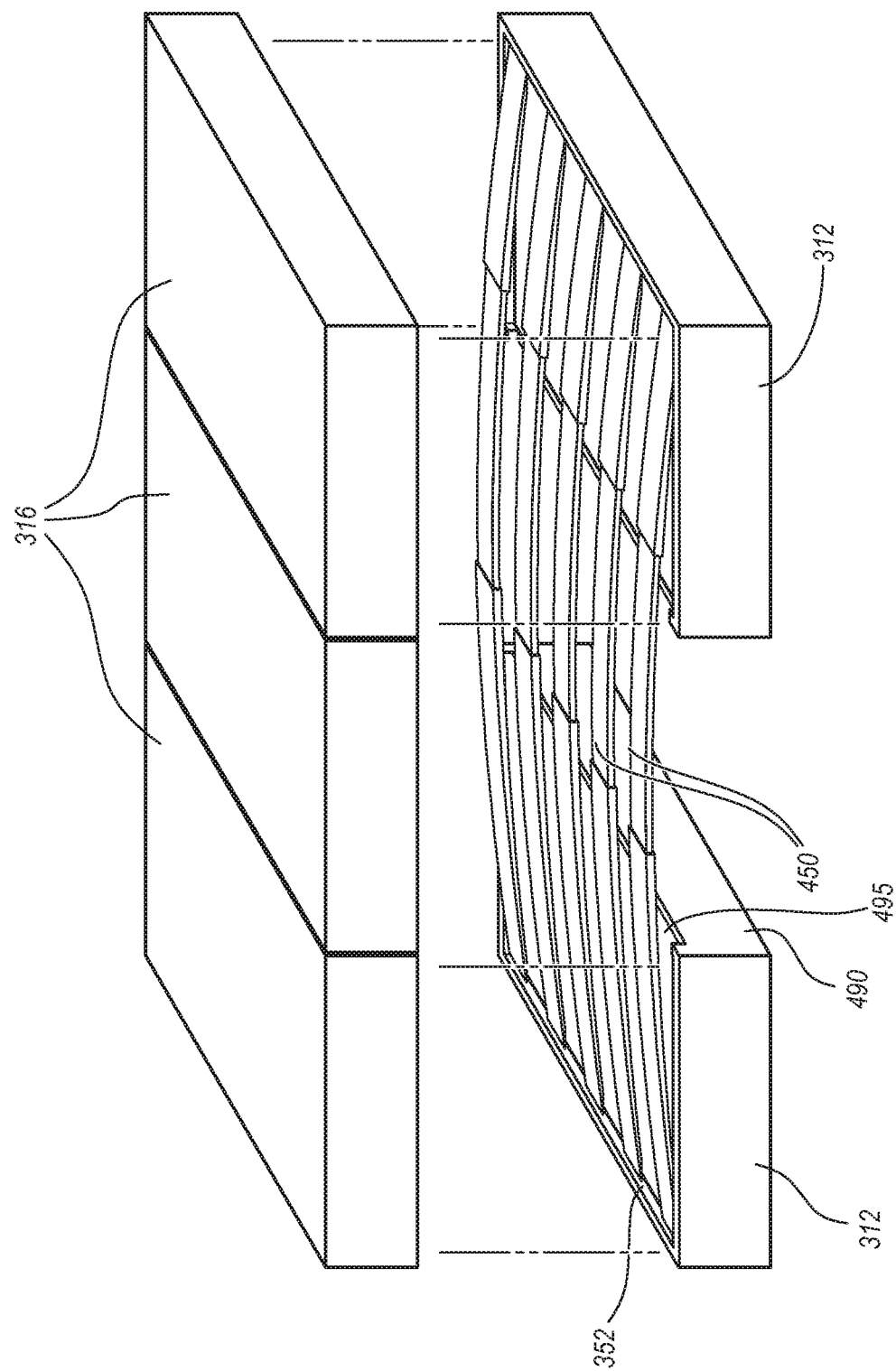
FIG. 30 illustrates a perspective view of a modular mattress system according to one or more implementations of the present disclosure.

In another configuration, as illustrated in FIG. 30, the slats 450 are used with the bases 312 having the frame 352 rather than the frame 452 that extends over a plurality of bases 412. For instance, the slats 450 from one base 312 having the frame 352 to another base 312 having the frame 352 with a space between the adjacent bases 312. The mattress modules 316 can still rest on the slats 450 even though a middle portion of the slats 450 are suspended above an open space between the adjacent bases 312. At least one side 490 of a base 312 may have a cutout or notch 495 extending the entire length of the side 490 of the base 312. The width of the notch 495 may depend on the vertical thickness of the slats 450. The vertical thickness can be the distance between the upper surface 64 of a slat 450 and the lower surface 66. The notch 495 can accommodate the slats 450 so that the slats 450 may extend over the bases 312 and maintain an upper surface 64 that is flat and does not protrude above the height of the base 312 when weight is applied to the bed system 300. In other words, when the slats 450 extend over the bases 312, the top surface of the slats 450 provides a level surface, the height of which may terminate at or before a top edge of the bases 312.

Figure 31:
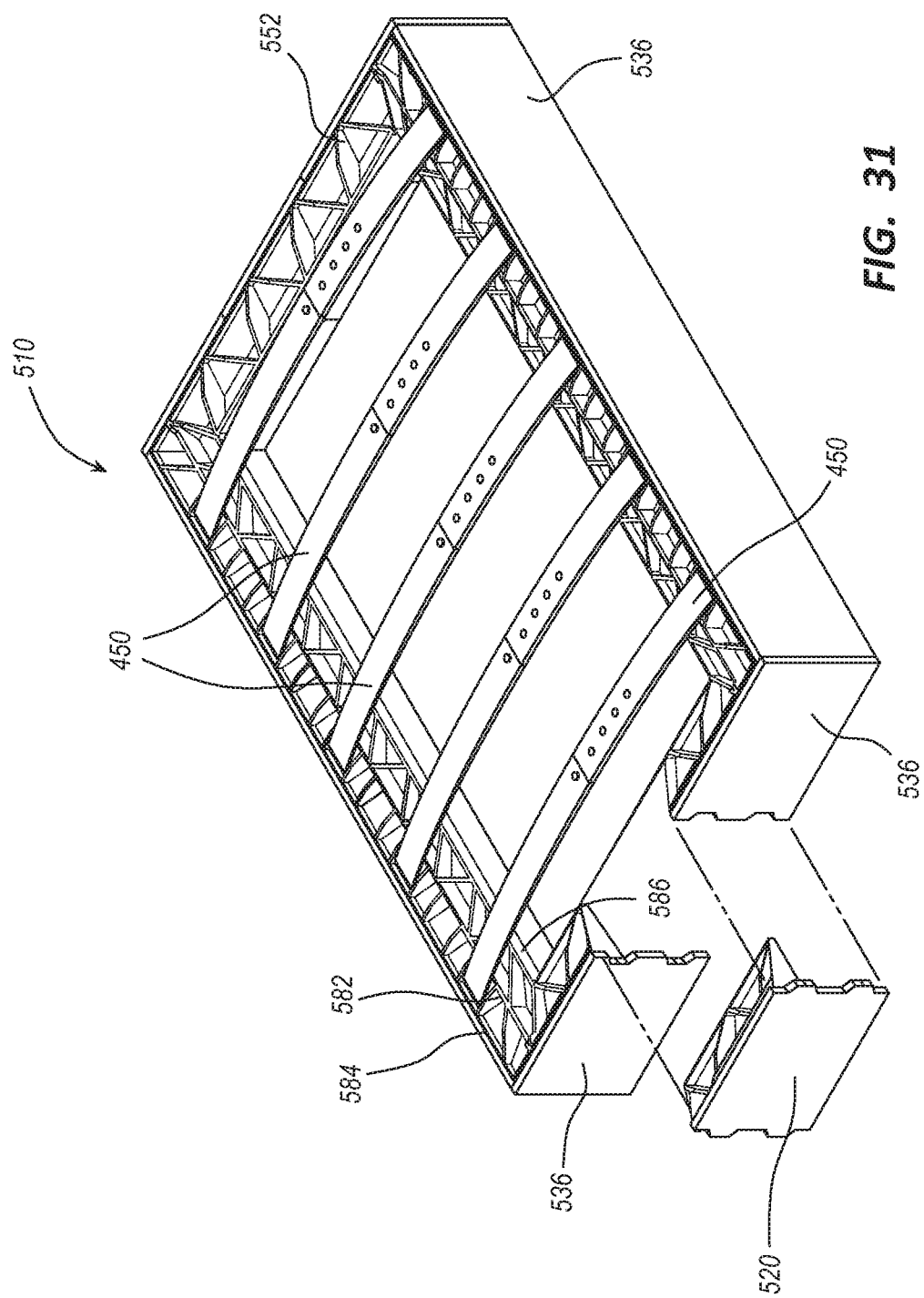
FIG. 31 illustrates a perspective view of a modular mattress system according to one or more implementations of the present disclosure, wherein sidewalls are added to the bed base to increase the size of the modular mattress system.

In another configuration, as illustrated in FIG. 31, not only are the slats adjustable but the frame and the base are adjustable in size, or dimensions of the frame and the base can be varied to accommodate a lesser or greater number of mattress modules. As illustrated, a modular component 510 includes a base 512 with a plurality of slats 550 (which can be similar to the slats 450 of FIG. 29). The base 512 is a combination of a base and frame described in earlier configurations or embodiments. The base and frame are segmented so that extension base members 520 can be added to the base 512 and increase a dimension of the base 512; the dimension can be a length, width, or depth of the base 512.

As illustrated, the base 512 includes walls 536 with frame segments 552 having an exterior support 584, and interior support 586, and an intermediate support 592 similar to the other exterior supports, interior supports, and intermediate supports. In contrast to the previously described exterior supports, interior supports, and intermediate supports, the exterior support 584, the interior support 586, and the intermediate support 592 extend partially around the base 512. This accommodates for extension base member 520 that also includes the exterior support 584, the interior support 586, and the intermediate support 592.

The extension base member 520 mounts to the walls 536 to position the frame segment 552 in alignment with the other frame segments 552. The extension base member 520 can attach to the walls through attachment features 522, such as magnets, hook and loop fasteners, clips, other mechanical connectors, or the like. This allows a user to apply a variety of interchangeable, decorative panels or veneers (i.e. wood, faux wood, metal, patterns, etc.) to the exterior of the base 512.

Figure 34A:
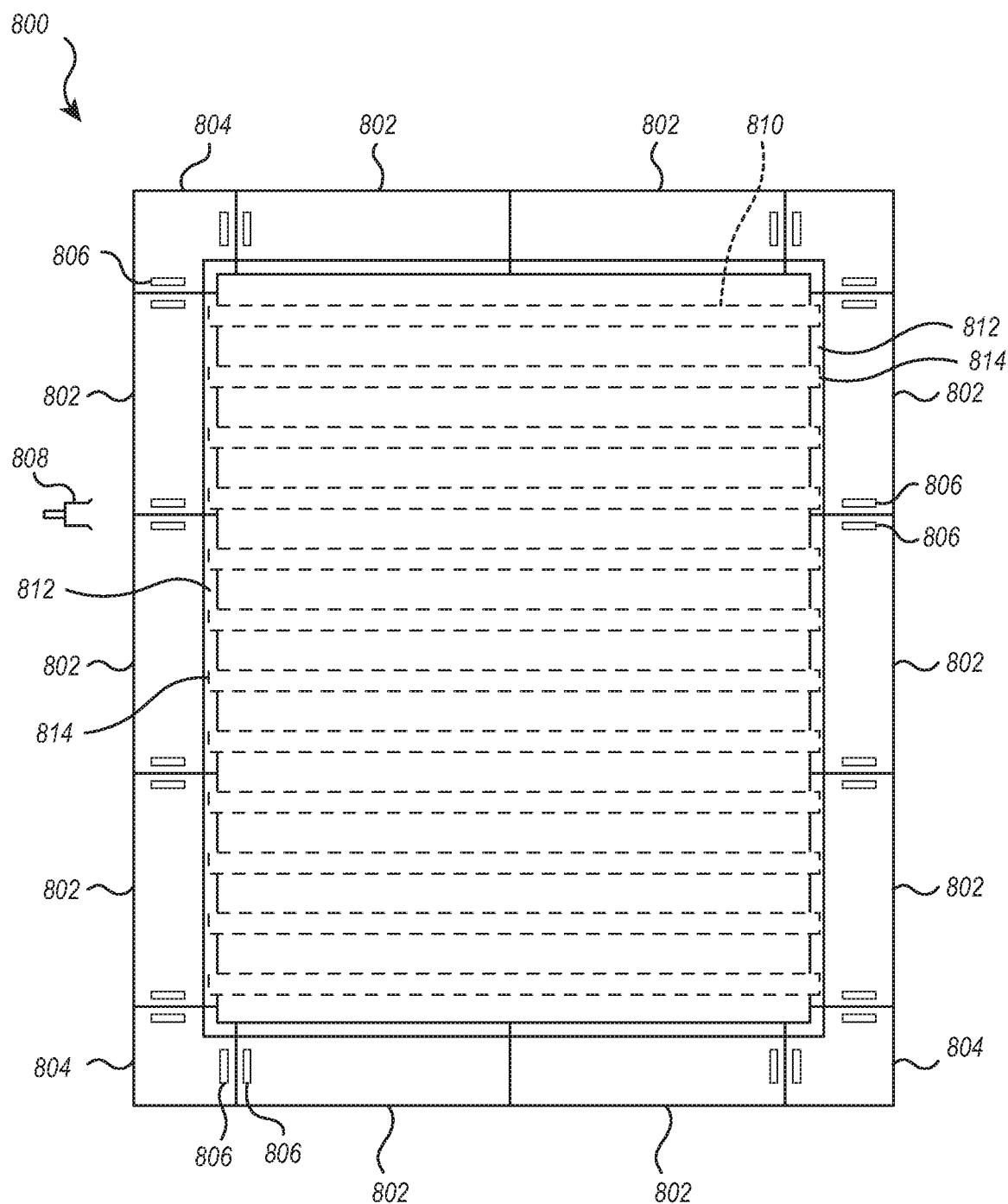
FIG. 34A illustrates a schematic top plan view of an embodiment of a modular bed frame according to one or more implementations of the present disclosure.
Figure 34B:
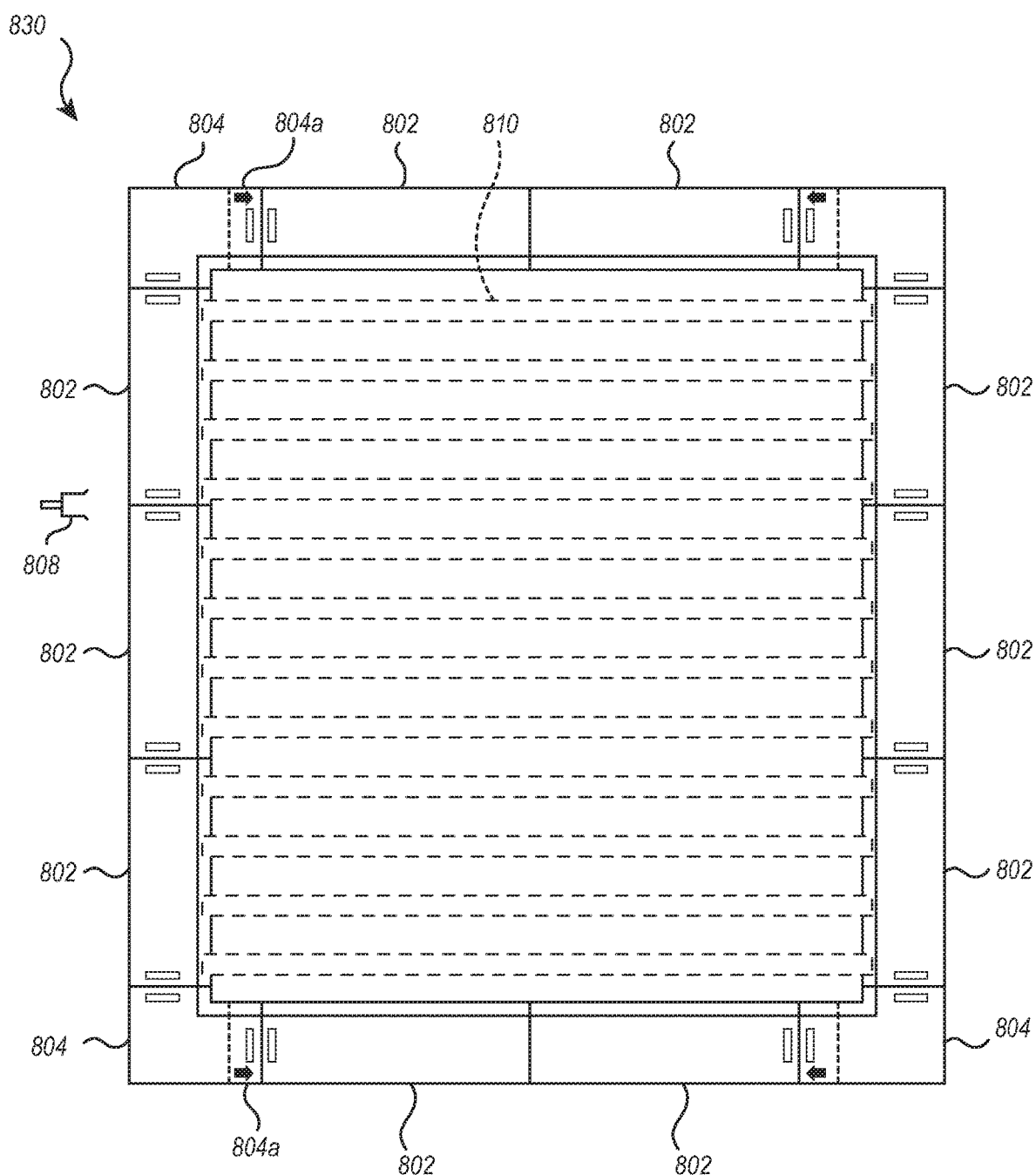
FIG. 34B illustrates a schematic top plan view of the bed frame of FIG. 34A in an extended position according to one or more implementations of the present disclosure.

The bed frame upon which the mattresses of the present invention rest can be a variety of different forms. FIG. 34A is one possible embodiment of an adjustable bed frame 800 that can be adjusted for use in connection with different sized mattresses to form different sized beds without replacing the frame. Adjustable bed frame 800 is comprised of adjustable, telescoping corners 804, which are selectively connected to one or more base modules 802 that have a uniform shape and size and that can be added to or removed from the frame system. In the example of FIG. 34A, the bed frame 800 is a smaller bed frame, which is adjusted by extending the telescoping corners 804 to form a larger bed frame 830, as shown in FIG. 34B. The telescoping corner ends 804 can be extended in the direction of the arrows 804*a* as shown in FIG. 34B, to create a larger frame. In some embodiments, the inclusion of telescoping corners 804 alone may be sufficient to extend a bed frame 800 to a desired size, while in other embodiments the addition or removal of base modules 802 can be used in addition to, or instead of, telescoping corners 804 to adjust the size of the bed frame 800. The telescoping corners 804 may be extended and/or base modules 802 may be added to allow a user to create a bed frame capable of supporting various sizes of mattresses, such as those discussed above.

The base modules 802, as shown in FIGS. 34A and 34B, all have the same uniform size and configuration, such that there is uniformity and predictability in substituting base modules. The exterior facing side of the base modules 802 can have aesthetic attachment features to allow a user to selectively attach and remove various veneers or finish panels. The finish panels may include wood panels, metal panels, plastic panels, fabric panels, or the like. The aesthetic attachment features can comprise hook and loop fasteners, magnets, clips, hooks, snaps, buttons, or the like.

Additional base modules 802 can be added to or substituted from the original set of base modules 802 of FIG. 34A in order to increase or decrease the size of the bed frame 800 to a larger-size or smaller size bed frame to accommodate a different sized mattress. For example, base modules 802 can be removed from the bed frame 830, or bed frame 800, to form smaller beds.

The base modules 802 can be selectively secured together by couplers 808 inserted into slits 806 on associated base modules 802. The telescoping corners 804 can have slits 806 located at the telescoping corner ends 804, which can maintain the connection between a corner end 804 and a base module 802 by use of a coupler 808 inserted into corresponding slits 806 on the base module 802 and corner end 804. This coupling mechanism can allow for the telescoping corners 804 to be extended without having to detach them from adjacent base modules 802.

In some embodiments, the telescoping corners 804 can include mechanisms which allow a user to extend a telescoping corner 804 and then lock it in place to maintain a specific size bed frame 800. The locking mechanism can engage automatically upon the telescoping corner 804 being extended to a particular length, or the locking mechanism can be engaged manually by the user. The locking mechanism can include button clips, ball lock pins, clamps, telescoping clamps, twist lock clamps, or the like.

The bed frame 800 has extendable, e.g., telescoping slats 810 that extend when bed frame 800 is adjusted to be smaller or larger, as needed. Slats 810 may be identical to or similar to the slats discussed previously herein. Slats 810 are configured to selectively mount within the securing edge 812 of the frame 800. Securing edge 812 may be an example of a securing component for retaining (e.g., selectively retaining) a slat in contact with the bed frame 800. Securing edge 812 may be similar to one or more features of the securing compartments described above, such as a securing edge. For example, securing compartments 100 having a securing edge 102, as described in previous embodiments relating to the lid, etc. may have features to be used in securing edge 812 of FIGS. 34A-B. In some embodiments, the portion of the frame 800 comprising the securing edge 812 can also include a plurality of securing compartments, such as securing compartments 100 as previously described herein. Edge 812 may be an elongate groove or notch or a series of compartments configured to receive and retain individual slats in certain embodiments of edge 812.

The slats 810 can have similar retention member components at ends 814 of slats 810 to the retention members discussed with respect to FIG. 5B above, such that slats 810 are received by and retained on the bed frame 800. The adjustable bed frame 800 can be conveniently extended and configured to accommodate different mattress sizes. The bed frame 800 can have a variety of different forms, e.g., similar to bases 12, or in the form of metallic rails or similar configurations.

Bed frame 800 can be made from any of the materials discussed above, such as polymer, wood, fiberglass, metal, alloys, composites, carbon fiber, and combinations thereof, or the like. The base modules 802 comprising the adjustable bed frame 800 can comprise any of the aforementioned materials and can all be uniform in length. For example, the length of a base module can range from about 15.0" to about 35.0", or from about 20.0" to about 30.0", or from about 22.5" to about 28.5".

Figure 35:
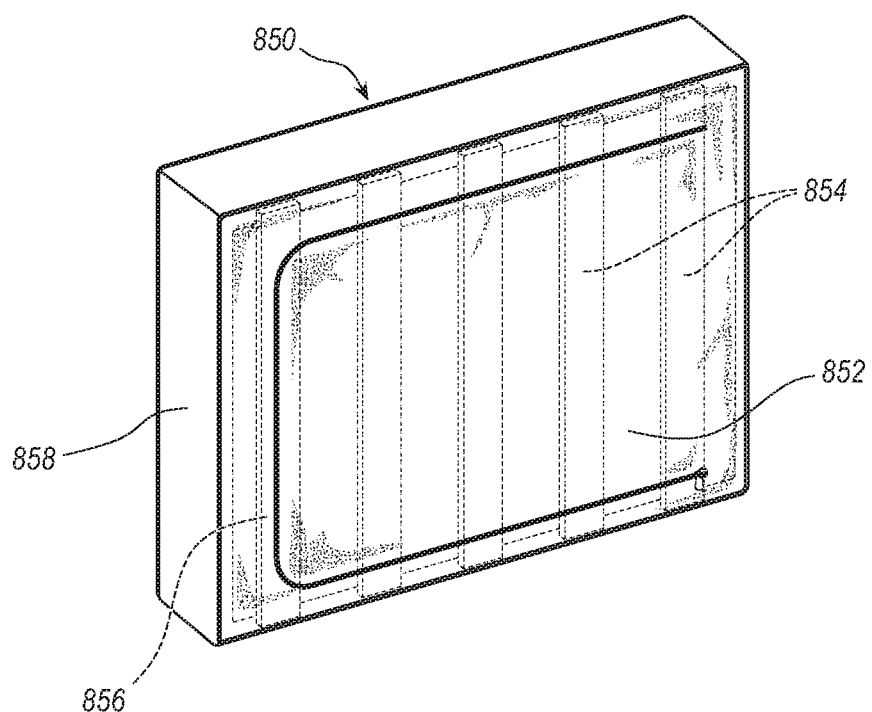
FIG. 35 illustrates a mattress system according to one or more implementations of the present disclosure.

In one embodiment using the adjustable frame 800, a mattress system 850 as shown in FIG. 35 can be mounted onto the adjustable bed frame 800. The mattress system 850 is comprised of a mattress 852 integrally-formed with a spring system 854, which in the embodiment of FIG. 35 is a plurality of slats 856 molded integrally with the mattress 852 to form a mattress/spring assembly. The integrated mattress/slats in FIG. 35 are positioned within a cover 858, which may be a mattress topper, a mattress casing, a shipping cover, or a variety of different covers such as those discussed above for example.

The mattress 852 of system 850 may be comprised of a foam material, for example, while the integrated slats of system 850 may be comprised of the same foam material formed in a different density or hardness. Optionally, different materials may be integrally-molded to form the integrated mattress/spring assembly of FIG. 35.

One or more slats 856 form a spring system 854 that supports the mattress 852 on a bed frame, such as adjustable bed frame 800. Thus, in one embodiment the slats 856, either within cover 858 or with cover 858 removed, are selectively mounted onto respective securing edges 812 of adjustable frame 800. Thus, slats 856 and mattress 852 can be integrally-formed as a mattress/spring assembly in the form of a single molded member. The resulting single molded member can be selectively mounted onto the adjustable frame 800 as a mattress/spring assembly. Cover 858 is selectively mounted on the mattress/spring assembly to form mattress system 850.

Following are some further example embodiments of the invention. These are presented only by way of example and are not intended to limit the scope of the invention in any way.

Embodiment 1

A furniture spring system, comprising a lid configured to provide a seating surface, the lid comprising a frame comprising two opposing frame members and a retention member associated with at least one of the two opposing frame members; a slat extending between the two opposing frame members, the slat comprising an elongate body having a first end and a second end and a catch disposed at the first end or second end; wherein the catch engages the retention member to retain the slat to the frame and the catch is configured to slide back-and-forth relative to the retention member as a portion of the elongate body between the first end and the second end elastically flexes downward and upward in response to forces intermittently pushing downward on the slat during use.

Embodiment 2

The furniture spring system as recited in Embodiment 1, wherein the frame comprises one or more securing compartments formed into a top surface of each of the two opposing frame members.

Embodiment 3

The furniture spring system of any of Embodiments 1-2, wherein the catch comprises a hooked end and the catch extends downwardly into one of the one or more securing compartments to retain the slat to the frame.

Embodiment 4

The furniture spring system of any of Embodiments 1-3, wherein the retention member is configured to prevent the catch from disengaging the retention member, the retention member is disposed above the securing compartment and the catch, the retention member being configured to prevent the catch from lifting up and out of the securing compartment as the portion of the slat elastically flexes downward and upward in response to forces intermittently pushing downward on the slat during use.

Embodiment 5

The furniture spring system of any of Embodiments 1-4, wherein the retention member comprises a bore extending upward from one of the two opposing frame members.

Embodiment 6

The furniture spring system of any of Embodiments 1-5, wherein the catch comprises an elongate opening extending through the elongate body into a terminal end of the first or second end of the slat and the bore extends upward through the elongate opening to retain the slat to the frame.

Embodiment 7

The furniture spring system of any of Embodiments 1-6, wherein the retention member is configured to prevent the catch from disengaging from the frame, the retention member comprising a fastener inserted into the bore, the retention member configured to prevent the catch from lifting up and off of the bore as the middle portion of the slat elastically flexes downward and upward in response to forces intermittently pushing downward on the slat during use.

Embodiment 8

The furniture spring system of any of Embodiments 1-7, wherein the retention member is configured to limit a back-and-forth sliding distance of the catch relative to the retention member such that flexion of the slat is limited by the retention member.

Embodiment 9

The furniture spring system of any of Embodiments 1-8, wherein the spring system is configured to be mounted on a base frame of a furniture base.

Embodiment 10

A furniture spring system, comprising a frame comprising two opposing frame members, and a retention member disposed on at last one of the two opposing frame members, and elongate slat extending between the two opposing frame members, the slat comprising an elongate body having an upper surface, a lower surface, a first end, a second end, and a flexible middle portion extending between the first end and the second end, and a catch disposed at the first end or the second end, the catch engaging the retention member to retain the slat to the lid frame.

Embodiment 11

The furniture spring system of Embodiment 10, wherein the catch is configured to slide back-and-forth relative to the retention member as the middle portion elastically flexes downward and upward in response to forces intermittently pushing downward on the slat during use.

Embodiment 12

The furniture spring system of any of Embodiments 10-11, wherein the lower surface of the slat is an arcuate surface such that the middle portion is thicker than the first and second ends of the slat.

Embodiment 13

The furniture spring system of any of Embodiments 10-12, wherein the spring system is configured to be mounted on a base frame of a furniture base.

Embodiment 14

A furniture assembly, comprising a transverse member and a base member, the base member comprising a storage base and a lid configured to be mounted on a top of the storage base, such that the lid covers a storage cavity formed within the storage base, the lid comprising a frame with opposing frame members having one or more retention members, and one or more slats, each slat having an elongate member and one or more catches that engage the one or more retention members of the frame.

Embodiment 15

The furniture assembly of Embodiment 14, wherein the engagement of the retention members with the catches limits a vertical distance of flexion of the slats such that the slats do not extend further into the storage cavity than the vertical distance of flexion, thus protecting objects disposed in the storage cavity during use.

Embodiment 16

The furniture assembly of any of Embodiments 14-15, wherein each slat of the lid comprises an arcuate profile along a longitudinal axis thereof.

Embodiment 17

The furniture assembly of any of Embodiments 14-16, wherein each of the one or more catches of each sat is disposed on an end of the slat.

Embodiment 18

The furniture assembly of any of Embodiments 14-17, further comprising a retention plate disposed above each end of each slat, the retention plate being configured to prevent the one or more catches from disengaging the retention members of the lid when the slats flex downward during use.

Embodiment 19

The furniture assembly of any of Embodiments 14-18, wherein the one or more catches are configured to move back-and-forth relative to the retention members as the slats flex downward and upward during use.

Embodiment 20

A furniture spring system comprising, a lid configured to be mounted onto a base frame of a furniture base, the lid configured to provide a seating surface, the lid comprising, a frame comprising two opposing frame members, and a plurality of retention members associated with each of the two opposing frame members, a plurality of slats extending between the two opposing frame members, each of the slats comprising an elongate body having a first end and a second end and first and second catches disposed at the first end and second end, respectively, of the elongate body, wherein each catch engages a retention member to retain the corresponding slat to the frame, and wherein each catch of a slat is configured to slide back-and-forth relative to the corresponding retention member as a portion of the elongate body between the first end and the second end elastically flexes downward and upward in response to forces intermittently pushing downward on the slat during use.

Embodiment 21

A modular mattress system, comprising a plurality of mattress modules configured to form a first modular mattress of a first selected geometry and being reconfigurable to form a second modular mattress of a second selected geometry, each of the mattress modules having a width (x) and a length (y), wherein the length (y) is substantially equal to two times the width (x); a bed casing (e.g., a rigid bed casing) configured to secure the plurality of mattress modules to form a completed mattress; and a mattress topper sized and shaped to substantially cover the completed mattress and provide additional cushioning to a user.

Embodiment 22

The furniture spring system of Embodiment 21, wherein the second modular mattress also comprises one or more additional mattress modules having a length (y') that is substantially equal to a length of the second selected geometry.

Embodiment 23

The furniture spring system of any of Embodiments 21-22, wherein the second modular mattress comprises a greater quantity of mattress modules than that of the first modular mattress.

Embodiment 24

The furniture spring system of any of Embodiments 21-23, wherein the bed casing (e.g., a rigid bed casing) is adjustable to selectively fit the first selected geometry and the second selected geometry.

Embodiment 25

The furniture spring system of any of Embodiments 21-24, wherein the bed casing also comprises veneer side panels selectively secured to the bed casing by magnets.

Embodiment 26

The furniture spring system of any of Embodiments 21-25, wherein the modular mattress system includes a casing applied to the plurality of mattress modules, wherein the casing is sized and shaped to compensate for missing length and/or width needed to form a standard size mattress.

Embodiment 27

A modular mattress system comprising, a plurality of mattress modules configured to form a first modular mattress of a first selected geometry and being reconfigurable to form a second modular mattress of a second selected geometry, each of the mattress modules having a width (x) and a length (y), wherein the length (y) is equal to two times the width (x), a bed casing configured to secure the plurality of mattress modules to form a completed mattress; and a mattress topper sized and shaped to cover the completed mattress and provide additional cushioning to a user.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A furniture spring system, comprising:
   a lid configured to provide a seating surface, the lid comprising:
   a frame comprising two opposing frame members; and
   a retention member associated with at least one of the two opposing frame members; a slat extending between the two opposing frame members, the slat comprising:
   an elongate body having a first end and a second end; and
   a catch disposed at the first end or second end;
   wherein the catch engages the retention member to retain the slat to the frame;
   wherein the catch is configured to slide back-and-forth relative to the retention member as a portion of the elongate body between the first end and the second end elastically flexes downward and upward in response to forces intermittently pushing downward on the slat during use;
   wherein the frame comprises one or more securing compartments formed into a top surface of each of the two opposing frame members.

2. The spring system of claim 1, wherein:
   the catch comprises a hooked end; and
   the catch extends downwardly into one of the one or more securing compartments to retain the slat to the frame.

3. The spring system of claim 2, wherein the retention member is configured to prevent the catch from disengaging the retention member, the retention member is disposed above the securing compartment and the catch, the retention member being configured to prevent the catch from lifting up and out of the securing compartment as the portion of the slat elastically flexes downward and upward in response to forces intermittently pushing downward on the slat during use.

4. The spring system of claim 1, wherein the retention member comprises a bore extending upward from one of the two opposing frame members.

5. The spring system of claim 4, wherein: the catch comprises an elongate opening extending through the elongate body into a terminal end of the first or second end of the slat; and the bore extends upward through the elongate opening to retain the slat to the frame.

6. The spring system of claim 5, wherein the retention member is configured to prevent the catch from disengaging from the frame, the retention member comprising a fastener inserted into the bore, the retention member configured to prevent the catch from lifting up and off of the bore as the middle portion of the slat elastically flexes downward and upward in response to forces intermittently pushing downward on the slat during use.

7. The spring system of claim 1, wherein the retention member is configured to limit a back-and-forth sliding distance of the catch relative to the retention member such that flexion of the slat is limited by the retention member.

8. The spring system of claim 1, wherein the spring system is configured to be mounted on a base frame of a furniture base.

9. A furniture spring system, comprising:
   a frame comprising two opposing frame members; and
   a retention member disposed on at least one of the two opposing frame members; an elongate slat extending between the two opposing frame members, the slat comprising:

an elongate body having an upper surface, a lower surface, a first end, a second end, and a flexible middle portion extending between the first end and the second end; and a catch disposed at the first end or the second end, the catch engaging the retention member to retain the slat to the frame, wherein the frame comprises one or more securing compartments formed into a top surface of each of the two opposing frame members.

10. The furniture spring system of claim 9, wherein the catch is configured to slide back-and-forth relative to the retention member as the middle portion elastically flexes downward and upward in response to forces intermittently pushing downward on the slat during use.

11. The furniture spring system of claim 9, wherein the lower surface of the slat comprises an arcuate surface such that the middle portion is thicker than the first end and the second end of the slat.

12. The furniture spring system of claim 9, wherein the spring system is configured to be mounted on a base frame of a furniture base.

13. A furniture assembly comprising:
a transverse member;
a base member, the base member comprising:
a storage base; and
a lid configured to be mounted on a top of the storage base, such that the lid covers a storage cavity formed within the storage base, the lid comprising:
a frame with opposing frame members having one or more retention members, and
one or more slats, each slat having an elongate member and one or more catches that engage the one or more retention members of the frame; and
a retention plate disposed above each end of each slat, the retention plate being configured to prevent the one or more catches from disengaging the retention members of the lid when the slats flex downward during use.

14. The furniture assembly of claim 13, wherein the engagement of the retention members with the catch limits a vertical distance of flexion of the slats such that the slats do not extend further into the storage cavity than the vertical distance of flexion, thus protecting objects disposed in the storage cavity during use.

15. A furniture assembly as recited in claim 13, wherein each slat of the lid comprises an arcuate profile along a longitudinal axis thereof.

16. A furniture assembly as recited in claim 13, wherein each of the one or more catches of each slat is disposed on an end of the slat.

17. A furniture assembly as recited in claim 13, wherein the one or more catches are configured to move back-and-forth relative to the retention members as the slats flex downward and upward during use.

18. A furniture spring system, comprising:
a lid configured to be mounted onto a base frame of a furniture base, the lid configured to provide a seating surface, the lid comprising:
a frame comprising two opposing frame members; and
a plurality of retention members associated with each of the two opposing frame members;
a plurality of slats extending between the two opposing frame members, each of the slats comprising:
an elongate body having a first end and a second end; and first and second catches disposed at the first end and second end, respectively, of the elongate body;
wherein each catch engages a retention member to retain the corresponding slat to the frame;
wherein each catch of a slat is configured to slide back-and-forth relative to the corresponding retention member as a portion of the elongate body between the first end and the second end elastically flexes downward and upward in response to forces intermittently pushing downward on the slat during use, and
wherein the frame comprises one or more securing compartments formed into a top surface of each of the two opposing frame members.

19. A furniture spring system, comprising:
a lid configured to provide a seating surface, the lid comprising:
a frame comprising two opposing frame members; and
a retention member associated with at least one of the two opposing frame members;
a slat extending between the two opposing frame members, the slat comprising:
an elongate body having a first end and a second end; and
a catch disposed at the first end or second end;
wherein the catch engages the retention member to retain the slat to the frame;
wherein the catch is configured to slide back-and-forth relative to the retention member as a portion of the elongate body between the first end and the second end elastically flexes downward and upward in response to forces intermittently pushing downward on the slat during use; and
wherein the retention member comprises a bore extending upward from one of the two opposing frame members.

20. A furniture spring system, comprising:
a frame comprising two opposing frame members; and
a retention member disposed on at least one of the two opposing frame members; an elongate slat extending between the two opposing frame members, the slat comprising:
an elongate body having an upper surface, a lower surface, a first end, a second end, and a flexible middle portion extending between the first end and the second end; and
a catch disposed at the first end or the second end, the catch engaging the retention member to retain the slat to the frame;
wherein the lower surface of the slat comprises an arcuate surface such that the middle portion is thicker than the first end and the second end of the slat.

21. A furniture spring system, comprising:
a frame comprising two opposing frame members; and
a retention member disposed on at least one of the two opposing frame members; an elongate slat extending between the two opposing frame members, the slat comprising:
an elongate body having an upper surface, a lower surface, a first end, a second end, and a flexible middle portion extending between the first end and the second end; and
a catch disposed at the first end or the second end, the catch engaging the retention member to retain the slat to the frame;
a retention plate disposed above each end of the elongated slat, the retention plate being configured to prevent the catch from disengaging the retention member when the slat flexes downward during use.

22. A furniture spring system, comprising:
- a lid configured to provide a seating surface, the lid comprising:
  - a frame comprising two opposing frame members; and
  - a retention member associated with at least one of the two opposing frame members; and
- a slat extending between the two opposing frame members, the slat comprising:
  - an elongate body having a first end and a second end;
  - a catch disposed at the first end or second end; and
  - the first end and the second end of the elongate body having a hole or a slot therein;
- wherein the catch engages the retention member to retain the slat to the frame;
- wherein the catch is configured to slide back-and-forth relative to the retention member as a portion of the elongate body between the first end and the second end elastically flexes downward and upward in response to forces intermittently pushing downward on the slat during use; and
- wherein the retention member comprises a protrusion configured to engage in the hole or the slot in the slat to retain the slat in place.

\* \* \* \* \*